(12) United States Patent
Hodge et al.

(10) Patent No.: US 10,445,805 B2
(45) Date of Patent: Oct. 15, 2019

(54) ORDERING, CUSTOMIZATION, AND MANAGEMENT OF A HIERARCHY OF KEYS AND LOCKS

(71) Applicant: HODGE PRODUCTS, INC., San Diego, CA (US)

(72) Inventors: Anthony A. Hodge, San Diego, CA (US); Zachary Hodge, San Diego, CA (US)

(73) Assignee: HODGE PRODUCTS, INC., San Diego, CA (US)

( * ) Notice: Subject to any disclaimer, the term of this patent is extended or adjusted under 35 U.S.C. 154(b) by 0 days.

(21) Appl. No.: 16/058,403

(22) Filed: Aug. 8, 2018

(65) Prior Publication Data
US 2019/0050925 A1    Feb. 14, 2019

Related U.S. Application Data

(60) Provisional application No. 62/542,709, filed on Aug. 8, 2017.

(51) Int. Cl.
| | | |
|---|---|---|
| *G06Q 30/00* | (2012.01) | |
| *G06Q 30/06* | (2012.01) | |
| *G06F 3/0481* | (2013.01) | |
| *G06F 3/0482* | (2013.01) | |
| *G06F 3/0484* | (2013.01) | |
| *G06F 3/0485* | (2013.01) | |

(52) U.S. Cl.
CPC ....... *G06Q 30/0621* (2013.01); *G06F 3/0482* (2013.01); *G06F 3/0485* (2013.01); *G06F 3/04817* (2013.01); *G06F 3/04847* (2013.01); *G06Q 30/0643* (2013.01)

(58) Field of Classification Search
CPC .............. G06Q 30/00; G06Q 30/0601; G06Q 30/0641; G06Q 30/0643
See application file for complete search history.

(56) References Cited

U.S. PATENT DOCUMENTS

| | | | |
|---|---|---|---|
| 2003/0167213 A1 | 9/2003 | Jammes et al. | |
| 2007/0145126 A1* | 6/2007 | Erlank | G06Q 30/06 235/381 |
| 2008/0053167 A1* | 3/2008 | Basche | E05B 37/025 70/22 |

(Continued)

OTHER PUBLICATIONS

Bryson, John R., Michael Taylor, and Richard Cooper. "Competing by design, specialization and customization: Manufacturing locks in the west midlands (UK)." Geografiska Annaler: Series B, Human Geography 90.2 (2008): 173-186. (Year: 2008).*

(Continued)

*Primary Examiner* — Christopher B Seibert
(74) *Attorney, Agent, or Firm* — Procopio, Cory, Hargreaves & Savitch LLP

(57) ABSTRACT

Ordering, customizing, and managing a hierarchy of keys and locks. In an embodiment, a keying tree is graphically generated to comprise a key representation and at least one lock representation. The key representation represents at least one master key, as a root node, and comprises a key-name input, a key-quantity input, and a key-deletion input. The at least one lock representation represents at least one locking device, as at least one leaf node, and comprises a lock-name input, a lock-build input, a lock-quantity input, and a lock-deletion input.

21 Claims, 49 Drawing Sheets

(56) References Cited

U.S. PATENT DOCUMENTS

| | | |
|---|---|---|
| 2009/0256676 A1 | 10/2009 | Piccirillo et al. |
| 2009/0271295 A1* | 10/2009 | Hodge ............... G06Q 30/0601 |
| | | 705/26.1 |
| 2011/0199204 A1* | 8/2011 | Dionis ................. E05B 45/005 |
| | | 340/506 |
| 2015/0145680 A1* | 5/2015 | Favier ................ E05B 73/0017 |
| | | 340/572.9 |
| 2016/0049032 A1 | 2/2016 | Ranchod |
| 2017/0262920 A1* | 9/2017 | Hodge ............... G06Q 30/0601 |
| 2019/0012632 A1* | 1/2019 | Favier ............. G06K 19/07758 |

OTHER PUBLICATIONS

International Search Report and Written Opinion for International Patent Application No. PCT/US2018/045830 dated Oct. 18, 2018, 15 pages.

\* cited by examiner

300

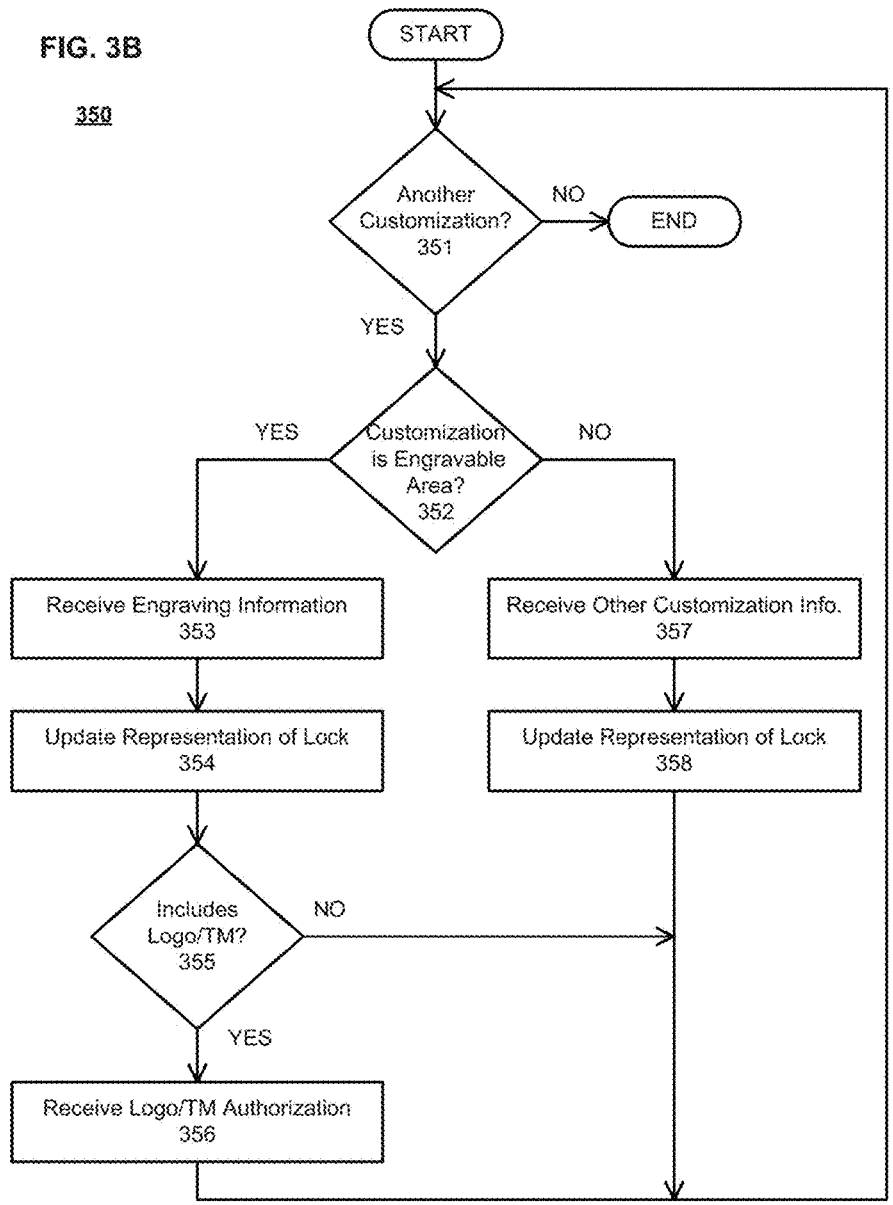

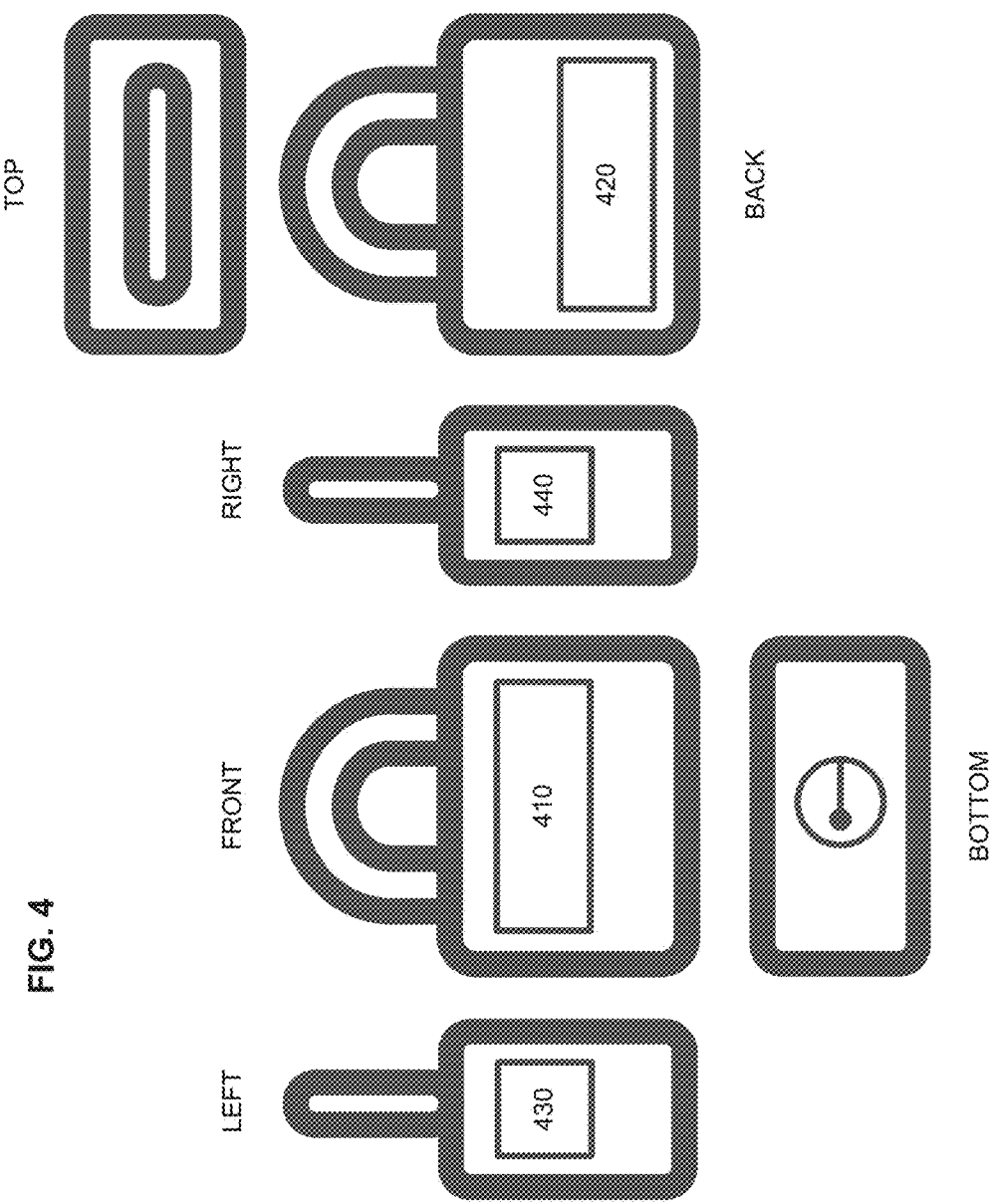

| QTY | COLOR | KA | KD | KDMK | KAMK | IN SETS OF | AREAS TO BE ENGRAVED | COMMENTS |
|---|---|---|---|---|---|---|---|---|
| 5 | RED | | | | X | 1 SET OF 5 | 1 & 3 FOR TEXT & LOGO | |
| 10 | YLW | | | X | | 1 SET OF 10 | | |
| 10 | GRN | | | | X | 1 SET OF 10 | | |
| 10 | BLU | | X | | | 1 SET OF 10 | | |
| 10 | BLK | | | | | | | |
| 10 | TEAL | | | | | | | |
| 10 | PURP | | | | | | | |
| 10 | ORJ | | | | | | | |

FIG. 5

ORDERING, CUSTOMIZATION, AND MANAGEMENT OF A HIERARCHY OF KEYS AND LOCKS

CROSS-REFERENCE TO RELATED APPLICATIONS

This application claims priority to U.S. Provisional Patent App. No. 62/542,709, filed on Aug. 8, 2017—the entirety of which is hereby incorporated herein by reference.

This application is also related to U.S. patent application Ser. No. 15/610,103, filed on May 31, 2017, which is a continuation of U.S. patent application Ser. No. 13/950,157, filed on Jul. 24, 2013, and issued as U.S. Pat. No. 9,710,840 on Jul. 18, 2017, which is a division of U.S. patent application Ser. No. 12/427,621, filed on Apr. 21, 2009, and issued as U.S. Pat. No. 8,521,600 on Aug. 27, 2013, which claims priority to U.S. Provisional Patent App. No. 61/047,168, filed on Apr. 23, 2008 (collectively, "the related patent applications")—the entireties of all of which are hereby incorporated herein by reference.

BACKGROUND

Field of the Invention

The embodiments described herein are generally directed to lock management, and, more particularly, to ordering, customizing, and/or managing a hierarchy of keys and/or locks.

Description of the Related Art

While the related patent applications describe improved methods for ordering keyed locks, conventionally, there is no easy method for ordering engravings on such locks and managing and ordering a hierarchy of keys and locks. Rather, current methods for ordering engraved or keyed locks are complex, inefficient, and/or confusing.

SUMMARY

Accordingly, systems, methods, and non-transitory, computer-readable media are disclosed for the ordering, customization, and/or management of a hierarchy of keys and/or locks (e.g., engravable or non-engravable locks).

In an embodiment, a method is disclosed that comprises using at least one hardware processor to generate a graphical user interface comprising a graphical representation of a keying tree, wherein the graphical representation of the keying tree comprises: a key representation, representing at least one master key, as a root node of the keying tree, wherein the key representation comprises a key-name input for naming the key representation, a key-quantity input for changing an order quantity of the at least one master key, and a key-deletion input for deleting the key representation from the graphical representation of the keying tree; and at least one lock representation, representing at least one locking device, as at least one leaf node of the keying tree, wherein the at least one lock representation comprises a lock-name input for naming the lock representation, a lock-build input for specifying the at least one locking device, a lock-quantity input for changing an order quantity of the at least one locking device, and a lock-deletion input for deleting the at least one lock representation from the graphical representation of the keying tree. One or both of the key representation and the at least one lock representation may further comprise a duplication input for duplicating the respective representation within the graphical representation of the keying tree and/or a move input for moving the respective representation between different positions within the graphical representation of the keying tree. In addition, the key representation may comprise an expandable and collapsible menu that comprises one or more of the key-name input, the key-quantity input, and the key-deletion input, and/or the at least one lock representation may comprise an expandable and collapsible menu that comprises one or more of the lock-name input, the lock-build input, the lock-quantity input, the lock-deletion input, and/or a list of one or more lock entries.

Each of the one or more lock entries may represent a separate unit of the at least one locking device, and the one or more lock entries are equal in number to the specified order quantity of the at least one locking device. In addition, each of the one or more lock entries may be expandable and collapsible, and, when expanded, each of the one or more lock entries may comprise a description of one or more attributes of the unit represented by that lock entry and a key-quantity input for changing an order quantity of keys for the unit represented by that lock entry and/or a scrollable image region with one or more inputs by which a user can scroll through a plurality of images of the unit represented by that lock entry. The method may further comprise: in response to a user interaction with the lock-quantity input to increment the order quantity of the at least one locking device, automatically adding a new lock entry to the list and naming the new lock entry according to a predefined naming scheme; or, in response to a user interaction with the lock-quantity input to decrement the order quantity of the at least one locking device, automatically removing an existing lock entry from the list.

The method may further comprise: receiving a user selection of the lock-build input of the at least one lock representation; and, in response to the user selection of the lock-build input, generating a graphical user interface comprising one or more inputs for selecting and customizing the at least one locking device represented by the at least one lock representation. After receiving a selection and customization of the at least one locking device, the at least one locking representation may be updated to comprise an image of the selected and customized at least one locking device. In addition, the method may comprise replacing a default icon of the lock-build input with the image of the selected and customized at least one locking device.

The at least one lock representation may comprise a plurality of lock representations as a plurality of leaf nodes of the keying tree. In addition, the graphical representation of the keying tree may comprise a plurality of key representations, including two or more key representations as child nodes of the key representation as the root node. The graphical user interface may comprise an add-lock input for each of the plurality of key representations, and the method may further comprise, in response to a user interaction with the add-lock input for one of the plurality of key representations, adding a lock representation as a child node of the one key representation within the graphical representation of the keying tree. The graphical user interface may further comprise an add-subgroup input for each of the plurality of key representations, and the method may further comprise, in response to a user interaction with the add-subgroup input for one of the plurality of key representations, adding first and second new key representations as child nodes of the one key representation, moving any existing lock representations that are child nodes of the one key representation to child nodes of the first new key representation within the graphical representation of the keying tree, and adding a new lock representation as a child node of the second new key representation within the graphical representation of the keying tree. The graphical user interface may further comprise an add-key input for each of a plurality of levels of key representations in the graphical representation of the keying tree, and the method may further comprise, in response to a user interaction with the add-key input for one of the plurality of levels of key representations, adding a new key representation within the one level of key representations, and adding a new lock representation as a child node of the new key representation within the graphical representation of the keying tree.

The graphical user interface may further comprise a checkout input, and the method may further comprise: in response to a user interaction with the checkout input, generating a graphical user interface comprising one or more inputs for purchasing all of the keys and locks represented in the graphical representation of the keying tree; and, in response to completion of the purchase, initiating manufacture of one or more keys for each key representation and one or more locks for each lock representation, in the graphical representation of the keying tree, according to an access-control hierarchy indicated by the keying tree.

In another embodiment, a method is disclosed that comprises using at least one hardware processor to: receive a selection of an image of a lock via a user interface comprising a plurality of images of locks, wherein each of the plurality of images of locks represents a lock model; in response to the selection of the image of the lock, add a base image of the lock to a lock channel within the user interface, and display an animation that depicts the base image of the lock unfolding into a two-dimensional representation of a plurality of surfaces of the lock; receive engraving information for at least one engravable area on the plurality of surfaces; receive a quantity of the lock to be purchased; and generate an order for the received quantity of locks having the received engraving information. The two-dimensional representation of the plurality of surfaces of the lock may comprise visual representations of one or more engravable areas on the plurality of surfaces, wherein receiving engraving information for at least one engravable area on the plurality of surfaces comprises: receiving a selection of one of the one or more engravable areas via the user interface; receiving engraving information comprising one or more of text and an image; associating the received engraving information with the selected engravable area; and updating the two-dimensional representation to add a visual depiction of the received engraving information to the selected engravable area. The user interface may be a single webpage, may be embedded within a single webpage, may be a plurality of webpages, or may be embedded across a plurality of webpages.

The method may further comprise using the at least one hardware processor to: for each of one or more attributes, receive customized attribute information, comprising a selection of the attribute to be applied to the lock, via the user interface, and update the two-dimensional representation to add a visual depiction of the selected attribute to one or more of the plurality of surfaces; wherein the generated order is for the received quantity of locks having the received engraving information and the received customized attribute information. The one or more attributes may comprise at least one of a body color of the lock, a lock bumper, a lock cover, and a text format.

The method may further comprise using the at least one hardware processor to: generate a plurality of groups; and, for each of the plurality of groups, add a base image of a lock to one of a plurality of slots in the lock channel, display an animation that depicts the base image of the lock unfolding into a two-dimensional representation of a plurality of surfaces of the lock, receiving engraving information for at least one engravable area on the plurality of surfaces, and receive a quantity of the lock to be purchased within the group; wherein each of the plurality of slots in the lock channel represents a different one of the plurality of groups than any other one of the plurality of slots in the lock channel; and wherein the order is generated for the received quantity of locks having the received engraving information for each of the plurality of groups.

The method may further comprise using the at least one hardware processor to, for each of the plurality of groups, receive a selection of an image of a lock via the user interface comprising the plurality of lock images, wherein the base image of the lock added to the one slot in the lock channel corresponds to the selected image of the lock.

The method may further comprise using the at least one hardware processor to receive one or more keying options for the lock, wherein the order is generated for the received quantity of locks, configured according to the one or more keying options. The one or more keying options may comprise one of: keyed-alike, such that all of the quantity of locks are configured to be unlocked using a same key; keyed-different, such that each of the quantity of locks is configured to be unlocked using a different key than any other one of the quantity of locks; keyed-alike-master-keyed, such that all of the quantity of locks are configured to be unlocked using both a same key and a master key; and keyed-different-master-keyed, such that each of the quantity of locks is configured to be unlocked using both a different key than any other one of the quantity of locks and a master key.

Any of the disclosed methods may be embodied in executable software modules of a processor-based system, such as a server and/or mobile device, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A and 3B illustrate a process for ordering locks, according to an embodiment;

FIG. 4 illustrates a user interface for selecting an engraving area, according to an embodiment;

FIG. 5 illustrates a table for specifying an order of locks, configured into a plurality of lock groups (e.g., each with their own keying, engraving, etc.), according to an embodiment;

DETAILED DESCRIPTION

In an embodiment, systems, methods, and non-transitory computer-readable media are disclosed for the ordering, customization, and/or management of locks or a hierarchy of locks (anywhere from a simple hierarchy, comprising a single set of one or more keys and one or more locks, to a complex hierarchy, comprising numerous sets of key and locks related according to a complex keying tree). After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
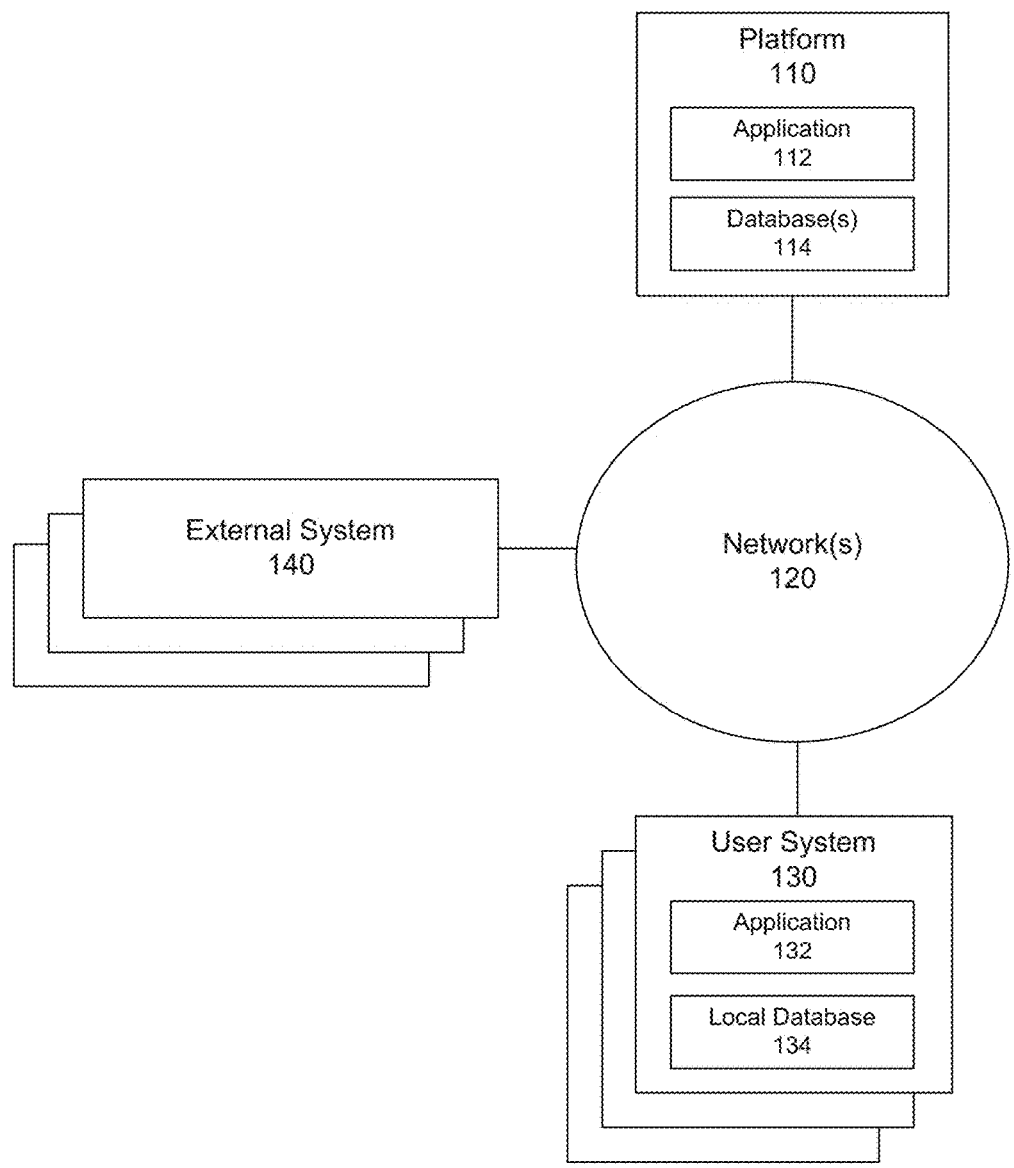
FIG. 1 illustrates an example infrastructure, in which one or more of the processes described herein, may be implemented, according to an embodiment.

FIG. 1 illustrates an example system for the ordering, customization, and/or management of a hierarchy of keys and/or locks, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., websites, apps, other platforms, etc.) via one or more networks 120.

Network(s) 120 may comprise the Internet, and platform 110 may communicate with user system(s) 130 through the Internet using standard transmission protocols, such as Hypertext Transfer Protocol (HTTP), HTTP Secure (HTTPS), File Transfer Protocol (FTP), FTP Secure (FTPS), SSH FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like. For example, user system 130 may comprise a user's handheld mobile device or personal computer. Alternatively or additionally, user system 130 may comprise an electronic ordering kiosk provided in a shopping center (e.g., shopping mall), merchant's store (e.g., hardware store, homewares store, etc.), or other facility (e.g., U.S. General Services Administration (GSA) purchasing office, school, college, etc.), for usage by visitors to the facility. However, it should be understood that, regardless of whether user system 130 is a user's personal device or a public electronic ordering kiosk, the functionality may be implemented in the same manner.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™ IBM™, Microsoft SQL™, Access™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the functions, processes, or methods of the application described herein.

1.2. Example Processing Device

Figure 2:
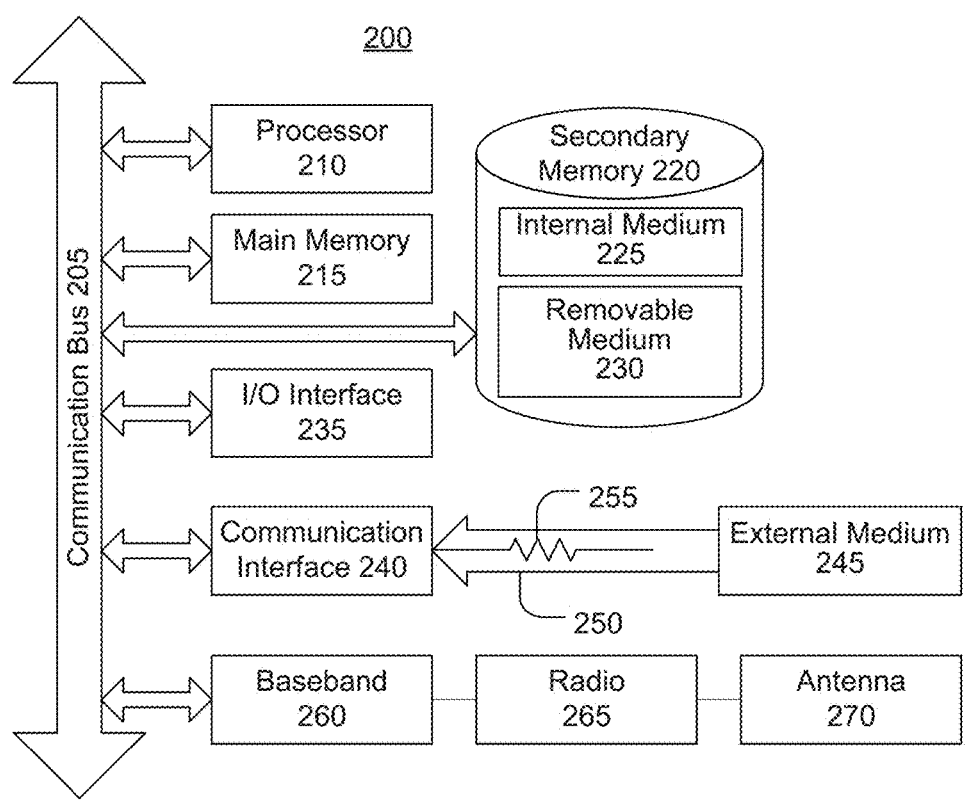
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for the ordering, customization, and/or management of a hierarchy of locks will now be described in detail. It should be understood that the described processes may be embodied in one or more software modules that are executed by one or more hardware processors (e.g., processor 210), e.g., as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Introduction

In an embodiment, the application may be a single-page application, in which a user is guided through a series of steps without any page transitions between steps (i.e., within a single page). For example, the user interface may be a webpage that updates, in real time, in response to user selections, without redirection to a different webpage between steps. The series of steps or certain steps within the series may be different, depending on whether the user is seeking to purchase non-keyed lock(s) or keyed lock(s) and/or engravable lock(s) or non-engravable lock(s). In addition, all or part of the application may be embeddable, such that, for example, the user interface(s) may be embedded within a variety of different host environments.

2.2. Ordering Process

Figure 3A:
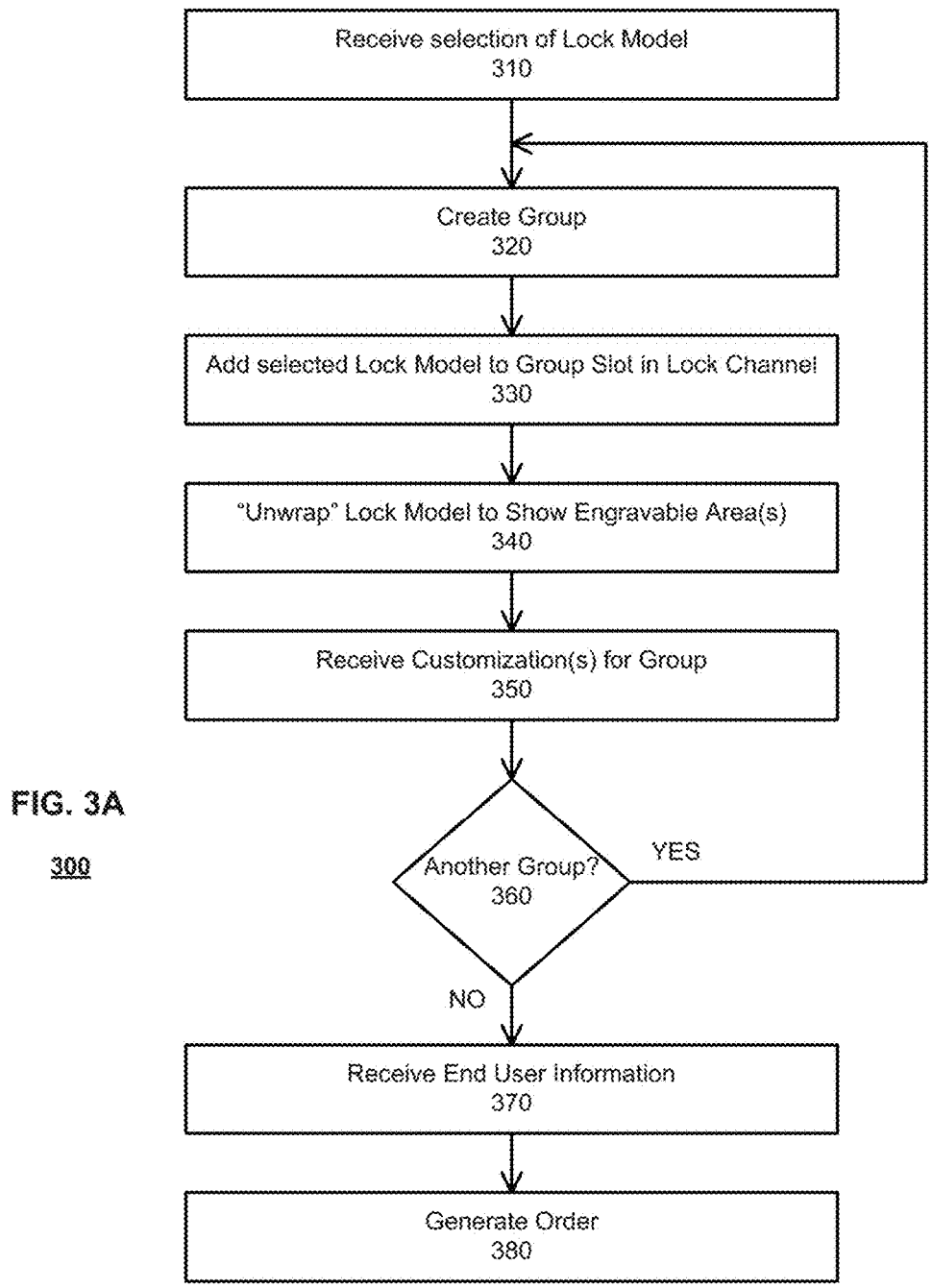

FIG. 3A illustrates a process 300 for ordering engraved locks, according to an embodiment. Process 300 may be implemented by the application (e.g., server application 112 and/or client application 132). While process 300 is illustrated with a certain arrangement of steps, process 300 may be implemented with fewer, more, or different steps and a different arrangement or ordering of steps.

In step 310, a selection of a lock model is received. For example, the application may provide a user interface comprising representations of a plurality of available lock models. In an embodiment, the available lock models may be displayed in a grid format, with rows and columns of selectable entries. Each grid entry may comprise an image that is a visual depiction of a particular one of the plurality of available lock models. In addition, each grid entry may comprise attributes of the depicted lock model, including, without limitation, a name or other identifier of the depicted lock model, a number of engravable areas on the depicted lock model, a price of the depicted lock model, available body color(s) for the depicted lock model (e.g., a grid of swatches representing each available body color positioned near the image), and/or the like. In an embodiment, the set of available lock models, depicted in the grid, may be filtered according to one or more user-specified criteria. These criteria may comprise values for one or more attributes of the lock models. For example, a user may specify a number of engravable areas, a price or price range, and/or a body color, and the set of available lock models, depicted in the grid, may be reduced to only those lock models having the specified number of engravable areas, those lock models having a price matching the specified price or within the specified price range, and/or those lock models that are available in the specified body color, respectively. When a user selects one of the available lock models (e.g., by clicking, touching, or otherwise interacting with the image depicting that lock model), process 300 proceeds to step 320.

In step 320, a user may create a new group for the selected lock model. If no prior groups have been created, a default initial lock group may be automatically created. The groups allow a user to break a purchase of the selected lock model down into discrete, separately-customizable sets of locks. In an alternative embodiment, step 320 may occur before step 310, such that each group may contain locks of a different lock model than the locks in other groups. In either case, a group may be represented as a slot in a lock channel. In an embodiment, the lock channel is a component of the user interface that, for each group created in step 320, displays a "live" preview image of a representative lock of the selected lock model. The lock channel may comprise a separate slot for each group created in step 320. The live preview image of the representative lock includes a visual representation of each of its attribute(s), including any customized attributes. Each slot in the lock channel may also comprise textual information, such as textual descriptions of any attributes, pricing information, and/or the like.

In step 330, a representation of the selected lock model is added to the lock channel within the user interface. Specifically, the representation of the selected lock model is added to a slot in the lock channel assigned to the group to which the selected lock model is associated. In an embodiment, when the selected lock model is added to the lock channel, it may be animated, so that the image of the selected lock model within the grid appears to move from the grid, across the user interface, to its assigned slot in the lock channel, such that the image of the selected lock model from the grid "becomes" the live preview image of the representative lock within the slot of the lock channel. Alternatively, the live preview image of selected lock model may simply appear in the slot of the lock channel as the live preview image of the representative lock.

The "live preview image" may be a graphical representation of the product (e.g., lock) that automatically updates, in real time, as a user customizes its attributes (e.g., adds attributes, removes attributes, modifies attributes, etc.). Preferably, the user is not required to utilize a "refresh," "reload," or "update" input to update the live preview image after a customization. The live preview image visually reflects any attributes that have been added or customized by a user. Attributes may include, without limitation, color, shape, size, engraved logo, engraved text including formatting of the engraved text (e.g., bold, italics, underline, text size, font, line spacing, text color, etc.), lock add-ons (e.g., padlock bumper, padlock cover, etc.), accessories (e.g., keys), and/or the like. The user interface may comprise one or more inputs for adding, removing, and/or modifying attributes of the selected lock model, and automatically update in response to a user interaction with the input(s), for example, without a page transition.

In an embodiment, the visual representations of user-specified attributes are combined with a base image of the selected lock model or portion of the selected lock model to produce a composite image. Thus, the composite image is a visual representation of how a lock of the selected lock model will look with the user-specified attributes. In this manner, a user can see how the lock, to be purchased, will look, regardless of what user-specific customizations (i.e., attributes) the user adds. Accordingly, an image of any lock can be produced, regardless of whether or not that lock yet exists, and for virtually infinite combinations of attributes.

In step 340, the live preview image of the selected lock model, within the lock channel, may "unwrap" within the lock channel, or within a "lock pad" or other portion of the user interface outside of the lock channel, to simultaneously show all engravable areas on the lock model. This may be an animated process whereby the live preview image of the representative lock within the associated group's slot in the lock channel appears to unfold into its various surfaces (e.g., front, back, left side, right side, top, and bottom surfaces). The lock pad may be a primary portion of the user interface, separate from the lock channel, which allows the user to interact with a representative lock for a particular group. The lock pad may comprise the live preview image of the lock along with one or more inputs for specifying attributes of the lock.

FIG. 4 illustrates an example "unwrapped" live preview image of a selected lock model. As illustrated, the live preview image shows the front, left, right, back, top, and bottom surfaces of the representative lock. It should be understood that the live preview image may be a single image comprising all of the surfaces, or a set of multiple images each representing a different surface. In addition, the live preview image may comprise fewer, more, or different perspectives than those illustrated, such as skewed perspectives. In the illustrated example, there are four engravable areas 410 (on the front surface), 420 (on the back surface), 430 (on the left side surface), and 440 (on the right side surface). However, it should be understood that different lock models may have more, fewer, and different sets of engravable areas, different sizes of engravable areas, more than one engravable area on a single surface, and/or the like. In any case, each engravable area may be visually distinguished (e.g., by a visual border) and selectable.

In step 350, customization(s) are received for the group of locks. Specifically, the user interface may comprise one or more inputs for adding, modifying, and removing customizable attributes (e.g., engravings, colors, add-ons, etc.) for the locks within the group. In an embodiment, the visual depictions of the customized attributes, are applied, in real time (e.g., as they are customized by the user), to each surface of the unwrapped live preview image that is affected by the attribute. For example, a change in the body color for a group of locks may result in each surface in the unwrapped live preview image, within the slot of the lock channel associated with the group, being changed to the selected body color. In contrast, the addition of an engraving to one engravable area would only result in an update to a single surface (i.e., the surface comprising the engravable area). It should be understood that the customized attributes are depicted in the live preview image in addition to any non-customizable attributes.

A more detailed embodiment of step 350 is illustrated in FIG. 3B. In step 351, if all customizations have been added (i.e., "NO" in step 351, e.g., as indicated by a user operation, such as a selection of an input that adds the group or entire lock channel to a virtual shopping "cart"), step 350 ends. Otherwise (i.e., "YES" in step 351), if the customization is an engraving to an engravable area (i.e., "YES" in step 352, e.g., as determined by the user selecting an engravable area, such as one of engravable areas 410-440), engraving information is received in step 353. On the other hand, if the customization is another type of customization (e.g., selection of a body color, add-on, etc., as determined by the user selecting an input associated with the particular customization), the other customization information is received in step 357.

In an embodiment, in step 353, a user may specify text and/or an image (e.g., logo) to be engraved in any number of the available engravable areas on the selected lock model for the group. For example, when a user selects one of the available engravable areas in the unwrapped live preview image (e.g., by clicking, touching, or otherwise interacting with a depiction of the engravable area on a visually represented surface of the representative lock, such as visual depictions 410-440), an input may prompt the user to enter the text and/or specify (e.g., upload) an image. The user may enter the text and/or upload an image (e.g., representing a logo) using one or more text inputs and upload inputs, respectively, within the user interface. The user may also specify the attributes of the text (e.g., font, size, color, bold, italics, underline, etc.) and/or image (e.g., image size, aspect ratio, crop region, etc.).

In an embodiment, the manner in which engraving information is received may depend on whether a keyed lock or a non-keyed lock is being purchased. If a keyed lock is being purchased, the user interface may provide the user with three options (e.g., as one or more inputs) for configuring the engravings: (1) spreadsheet upload; (2) fillable PDF upload; and (3) online table population. If the user selects (1) spreadsheet upload or (2) fillable PDF upload, the user interface may provide an input for uploading a spreadsheet or PDF file. In such an embodiment, the uploading of the spreadsheet and/or PDF file represents step 353 for all of the engravable areas for which the user provides data within the file. The spreadsheet file and/or PDF file may also be configured to accept any other customizable attribute for the group and/or a purchase quantity for the group (i.e., the number of locks in the group). In an embodiment, in which the manner in which engraving information is received does not depend on whether a keyed or non-keyed lock is being purchased, these three options for configuring the engravings may be provided regardless of the type of lock being purchased.

Otherwise, if a non-keyed lock is being purchased, the user interface may provide the user with a different set of three options (e.g., as one or more inputs) representing three types of engravings: (1) text; (2) logo; and (3) text and logo. Alternatively, a choice of one of the three types of engravings may also be provided if a keyed lock is being purchased. In addition, to receiving the text and/or logo to be engraved on each selected engravable area, if option (2) logo or option (3) text and logo is selected, it can be automatically determined in step 355 that the engraving(s) include a logo or trademark.

In step 354, the application updates the live preview image of the selected lock model using the engraving information received in step 353. As discussed above, the engraving information may be added as a visual depiction to the live preview image, in real time, without transitioning to a new page. For instance, the engraving information may be overlaid on a base image of the selected lock model (which may itself be a composite image), at a position corresponding to the selected engravable area, to produce a composite image which is used as the live preview image. In other words, the live preview image automatically reacts (i.e., is updated) in response to the engraving information received or edited in step 353.

In step 355, it may be determined whether a logo or trademark has been received in step 353 (e.g., by the user selecting an input specifying that a logo or trademark has been included in the engraving information received in step 353, automatically if an image is uploaded in step 353, etc.). If so (i.e., "YES" in step 355), process 300 proceeds to step 356. Otherwise, if a logo or trademark has not been provided in step 353 (i.e., "NO" in step 355), process 300 returns to step 351.

In step 356, a logo or trademark authorization may be received. Step 356 may comprise prompting the user to input authorization information (e.g., a physically or electronically signed form with user-specified information) into one or more inputs of the user interface. The authorization information provides the operator of the application with permission to use the logo or trademark for the purposes of producing the lock (e.g., engraving a pre-manufactured lock) once it has been ordered. In an embodiment, step 356 comprises the user uploading a logo and/or trademark within a Portable Document Format (PDF) form, or uploading a logo and/or trademark which is overlaid on a PDF comprising the authorization information. This provides a record of the authorization, in order to avoid any legal issues that may arise regarding the use of the logo and/or trademark for the engraving and sale process.

In step 357, a user may specify other customizable attributes of the group, such as body color, add-ons, and/or the like. Specifically, the user may utilize one or more inputs within the user interface (e.g., within the slot of the lock channel associated with the group) to add or change attributes of the locks in the group.

In step 358, the application updates the live preview image of the selected lock model using the customized attribute information received in step 357. In addition, the application may update textual information, detailing the customized attributes, within the slot associated with the group in the lock channel. Step 358 may be similar or identical to step 354, and returns the process to step 351.

Not all attributes may be capable of visual depiction, in which case step 358 may solely involve updating textual information in the slot associated with the group in the lock channel (i.e., not the live preview image), or performing no update at all. For example, the user may specify the quantity of locks to be purchased in the group as an attribute of the group. Specifically, the user interface may comprise an input (e.g., textbox, drop-down menu, etc.) which receives an integer that is typed or otherwise specified by the user. A separate input may be provided for each group (e.g., within the group's slot in the lock channel), such that the user can specify separate purchase quantities for each group. In an alternative embodiment, the quantity of locks for each group may be visually indicated through a card-stacking effect, such as showing a number of locks (equal to or representative of the quantity) stacked on top of each other within the group's slot in the lock channel. In some implementations, there may be a minimum order quantity (e.g., one, ten, fifty, etc.) for a particular lock model. If the selected lock model is associated with a minimum order quantity, the application may prevent the user from specifying a purchase quantity less than the associated minimum order quantity.

Returning to FIG. 3A, in step 360, a user may add additional groups (i.e., "YES" in step 360), in which case, process 300 returns to step 320 to create another group. Otherwise, if the user is finished adding and editing groups (i.e., "NO" in step 360), process 300 proceeds to step 370.

In step 370, end user information may be received. The end user information may comprise an intended usage. For example, the user interface may comprise one or more inputs which prompt the user to specify whether the selected lock model is intended to be used for personal/home use or business/commercial use (e.g., one radio button for personal/home use and one radio button for business/commercial use).

In an embodiment, the end user information may also comprise purchase information (e.g., name, credit card information, billing address, shipping address, account information, etc.). For instance, the selected lock model, as customized by the user (e.g., with the user-specified attributes, including engravings), may be added to a "cart" of a host e-commerce platform for "checkout." The precise behavior of the cart and checkout process will depend on the particular implementation and design goals. For example, one implementation may direct the user from the cart to a checkout process, whereas another implementation may send information regarding the customized lock model to a dynamic quote solution (e.g., hosted by an external system 140) to obtain a quoted price for the customized lock model prior to checkout.

In an embodiment, pricing information may be provided within the user interface (e.g., listed in each slot of the lock channel for a particular group of locks, listed in the cart or elsewhere during the checkout process, etc.). The pricing information may be broken down into groups and/or line items, with each line item including, without limitation, the cost of the base locks in the group, the cost of add-ons (e.g., user-added attributes) for the group, upsell features (e.g., preset combination fee) for the group, and/or the like.

In an embodiment, purchased engraved locks (with or without logos or trademarks, whether keyed or non-keyed) are registered with the manufacturer (e.g., Master Lock Company™) of the selected lock model. In addition, if the purchase is for business/commercial use, as specified by the user in the user interface, the purchased engraved locks may be registered or otherwise associated with the user's business. Otherwise, if the purchase is for personal/home use, the purchased engraved locks may be registered with the operator of the application.

In step 380, an order is generated for the customized lock model. The precise behavior of this order-generation process will depend on the particular implementation and design goals (e.g., the manufacturer's available purchasing methods).

In one embodiment of step 380, order generation may comprise automatically populating an order form (e.g., PDF form) provided by the manufacturer of the purchased locks or generating an order form for the manufacturer. For example, the order form may comprise the PDF order form of the Master Lock Company™. An order form may be generated for each group of locks or a single order form may be generated for all groups of locks.

In an alternative embodiment of step 380, in which the manufacturer provides an API for electronically submitting purchasing orders, such that populating or generating an order form is not necessary, order generation may comprise automatically submitting the purchase order via the API of the manufacturer. The purchase order may comprise information that identifies, for each group of locks being purchased, the lock model, all attributes (e.g., engravings, body color, etc.), keying information, registration information, and/or the like.

As mentioned above, process 300 may be implemented with more, fewer, or a different combination or ordering of steps than those illustrated in FIGS. 3A and 3B. For example, in an alternative embodiment in which authorization to use the logo and/or trademark is not a concern or simply ignored, steps 355 and 356 may be omitted, i.e., step 354 may return directly to step 351. Furthermore, if the lock model selected in step 310 does not support engraving (i.e., has no engravable areas), the application may skip steps 352-356 entirely (i.e., the process proceeds directly from step 351 to step 357).

2.3. Group Specification Interface

As discussed with respect to steps 310-360 of process 300, the selected lock model or a plurality of selected lock models may be broken down into distinct groups of locks to be purchased. The user may specify, through the user interface, different engraving information and/or attributes for each group, including different text, logos, engravable areas, body colors, fonts, and/or the like, for each group.

In an embodiment, the user interface may provide a table for breaking down the order for the selected lock model(s) into groups. Alternatively, the table may be uploaded as a spreadsheet or PDF file, as described with respect to step 353 in FIG. 3B. Each row (or column) in the table may represent a single group of locks and may comprise an identifier (e.g., name, model or serial number, Stock Keeping Unit (SKU), etc.) of the lock model for the group and attributes for the group, including engraving information for the group (e.g., selected engravable areas, engraving text, logos, patterns, sequences, etc.), a body color for the group, and/or the like. For groups of keyed locks, the table may also comprise one or more keying options. The keying options may include, without limitation, Keyed Alike (KA), Keyed Different (KD), Keyed Different Master Keyed (KDMK), and Keyed Alike Master Keyed (KAMK). FIG. 5 illustrates an example table (for seventy-five locks of a selected lock model, distributed across eight groups), which may be provided in the user interface, a spreadsheet, or a fillable PDF file, according to an embodiment.

In an embodiment, the lock channel is a right-aligned sidebar or tray within the user interface. However, in alternative embodiments, the lock channel may be a left-aligned sidebar or tray, or a centered bar or tray at or near the bottom or top of the screen. In any of these embodiments, the sidebar or tray may comprise one or more slots that are each filled with a representative image (e.g., composite image of the base lock model combined with visual depictions of any attributes specified by the user for the group) of a group of locks. For example, if ten groups have been created by the user, the sidebar or tray may comprise ten slots, with each slot associated with a different one of the ten groups than any of the other slots and containing a representative image of the locks within the associated group. If the user does not manually break the order into a plurality of groups of locks, the application may automatically generate a default group, and the sidebar or tray may comprise a single slot associated with the default group.

In an embodiment, customizable attributes, including engraving information (e.g., text and/or logo) in one or more selected engravable areas, can be applied to the selected lock model(s) in the lock channel in one or more of the following manners: (1) globally to the entire order; (2) collectively to a specific group of locks; and (3) individually to a specific lock. Accordingly, engraving information may be applied to one or more engravable areas on the selected lock models for the order, group, or individual lock. In addition, engravings for an individual lock or group of locks may be matched to the hard-stamps for the keys to that lock or lock group.

In an embodiment, engraving information (e.g., text) can be specified by the user in the form of patterns or sequences to obviate the need for tedious data entry. For example, in an order for one hundred locks of the selected lock model, a user may break the locks into ten groups, with each group comprising ten locks, as illustrated in the table below. In this example, one hundred unique textual strings are provided in the form of a pattern.

| Set | Group | | | | | | | | | |
|---|---|---|---|---|---|---|---|---|---|---|
| | 1 | 2 | 3 | 4 | 5 | 6 | 7 | 8 | 9 | 10 |
| A | A1 | A2 | A3 | A4 | A5 | A6 | A7 | A8 | A9 | A10 |
| B | B1 | B2 | B3 | B4 | B5 | B6 | B7 | B8 | B9 | B10 |
| C | C1 | C2 | C3 | C4 | C5 | C6 | C7 | C8 | C9 | C10 |
| D | D1 | D2 | D3 | D4 | D5 | D6 | D7 | D8 | D9 | D10 |
| E | E1 | E2 | E3 | E4 | E5 | E6 | E7 | E8 | E9 | E10 |
| F | F1 | F2 | F3 | F4 | F5 | F6 | F7 | F8 | F9 | F10 |
| J | J1 | J2 | J3 | J4 | J5 | J6 | J7 | J8 | J9 | J10 |
| H | H1 | H2 | H3 | H4 | H5 | H6 | H7 | H8 | H9 | H10 |
| I | I1 | I2 | I3 | I4 | I5 | I6 | I7 | I8 | I9 | I10 |
| J | J1 | J2 | J3 | J4 | J5 | J6 | J7 | J8 | J9 | J10 |

It should be understood that other patterns are possible. For example incremental alphabetic characters may be used (e.g., A, B, C, . . . , Z, AA, AB, AC, . . . AZ, . . . ZZ, AAA, AAB, . . . ). In addition, users may add dynamic fields (e.g., by inputting a special character, string, or other reference that the application or a manufacturer can dynamically replace at or near the time that each lock is engraved or manufactured), such as a key number, employee name, and/or the like.

2.4. Keying Tree

In an embodiment, a keying tree can be used to specify keying options for one or more groups of locks to be purchased. For example, when a user selects a lock model from a grid (e.g., in step 310) or in response to another user operation (e.g., selection of a slot in the lock channel, selection of another input in the user interface, etc.), a keying tree may be displayed in the user interface. The keying tree may be in addition to or instead of the lock channel. The selected lock model may move from the grid to the keying tree in a similar or identical manner as the movement from the grid to the lock channel. Alternatively, the user interface may enable a user to drag a lock model from the grid to a node in the keying tree.

In an embodiment, the keying tree comprises a visual representation of a keying hierarchy of keys and locks. Each node in the keying tree may represent a group of locks, similar to a slot in the lock channel, and may comprise an image of a representative lock from the group. Each node may also be selectable and may be updated in response to customizations. Thus, the keying tree may operate in a similar manner as the lock channel, but visually illustrates the relationships between each group of locks with respect to a keying system.

Figure 6:
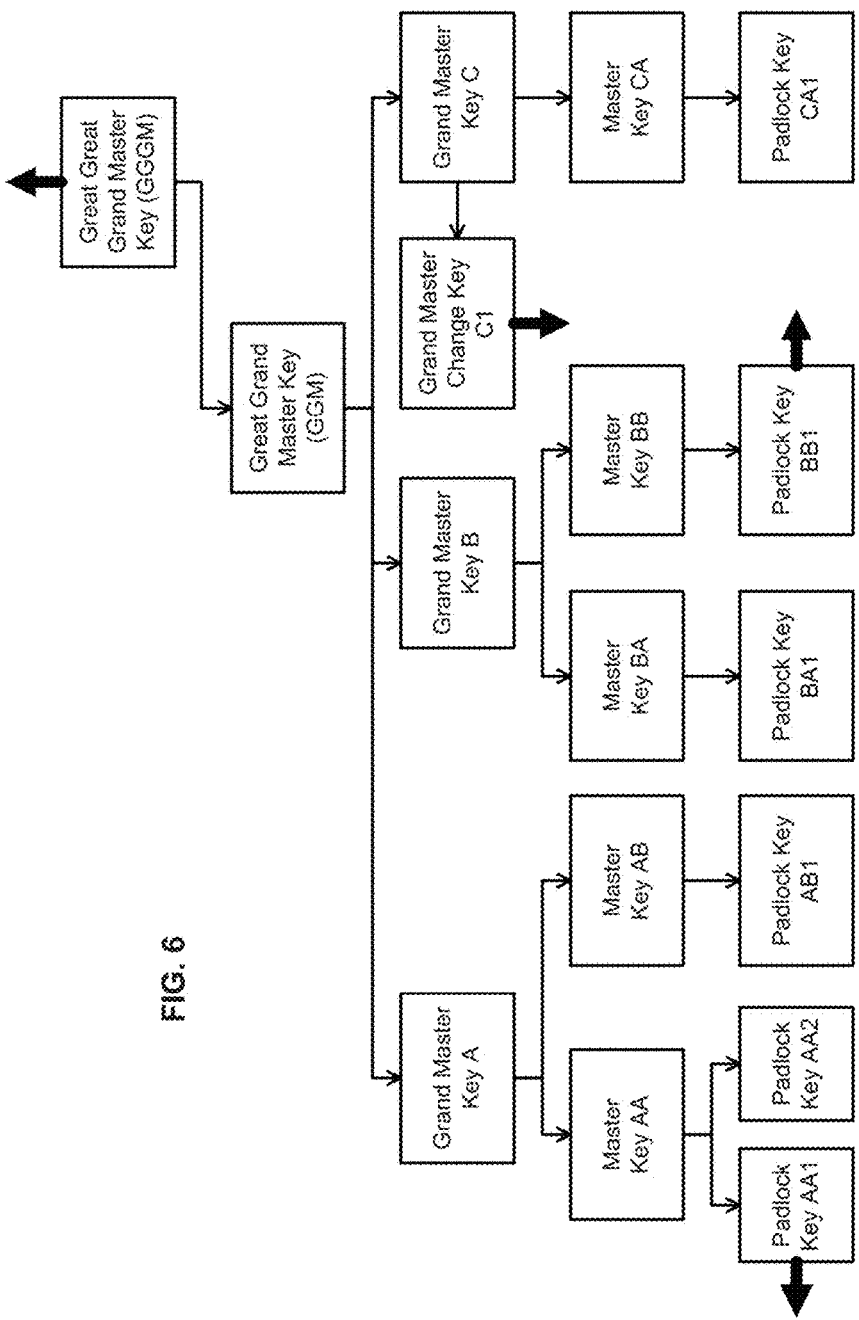
FIG. 6 illustrates a keying tree, according to an embodiment.

FIG. 6 illustrates an example of a keying tree, according to an embodiment. As illustrated, each node in the tree represents a key, lock, or set of locks, which can be assigned to or represent a group of locks to be purchased. The keying tree is a visual and logical model of a keying system with nodes and edges. Each node is connected to another node via an edge. Each edge represents a relationship between the connected nodes. Given an upper or ancestor node and a lower or descendant node, an edge from the ancestor node to the descendant node represents a unidirectional overlapping access right if the descendant is a key (i.e., the key represented by the ancestor node can open any lock that the key represented by the descendant node can open, but not vice versa) and direct access if the descendant is a lock or group of locks (i.e., the key represented by the ancestor node can open the lock or group of locks represented by the descendant node). It should be understood that access rights are inherited up the keying tree.

Within the keying tree, two or more nodes that share the same parent node are considered sibling nodes (e.g., in FIG. 6, Padlock Key AA1 and Padlock Key AA2 are sibling nodes). While sibling nodes share the same parent node, they may have unique attributes. For example, if the sibling nodes represent locks, the locks may have different engravings, colors, shackle lengths, styles, and/or other customizations, but are all opened by the same master key represented by their parent node. If the sibling nodes represent keys, they may have different stampings, labels, and/or the like, but the same overarching master key, represented by their parent node, has overlapping access rights with all of the keys represented by the sibling nodes.

In an embodiment, the application may graphically represent the keying tree in the graphical user interface, as discussed elsewhere herein. Alternatively, the application may store a representation of the keying tree in memory, but display representations of the keys and/or locks from the keying tree in a non-hierarchical manner (e.g., using the lock channel described elsewhere herein).

In an embodiment in which the keying tree is graphically represented in the graphical user interface, the graphical user interface may provide inputs for extending the keying tree both horizontally (e.g., by adding sibling nodes) and vertically (e.g., by adding ancestor nodes and/or descendant nodes). The graphical user interface may also provide the ability to moves nodes from one position to another position within the keying tree (e.g., via a drag-and-drop operation). In an embodiment, the graphical user interface may provide the user with the ability to swap nodes within the keying tree (e.g., by dragging and dropping one node onto another node). However, in such an embodiment, nodes may only be swapped if they represent the same type of entity (i.e., either both nodes represent a key or both nodes represent a lock).

3. Example Graphical User Interface

Figure 7A:
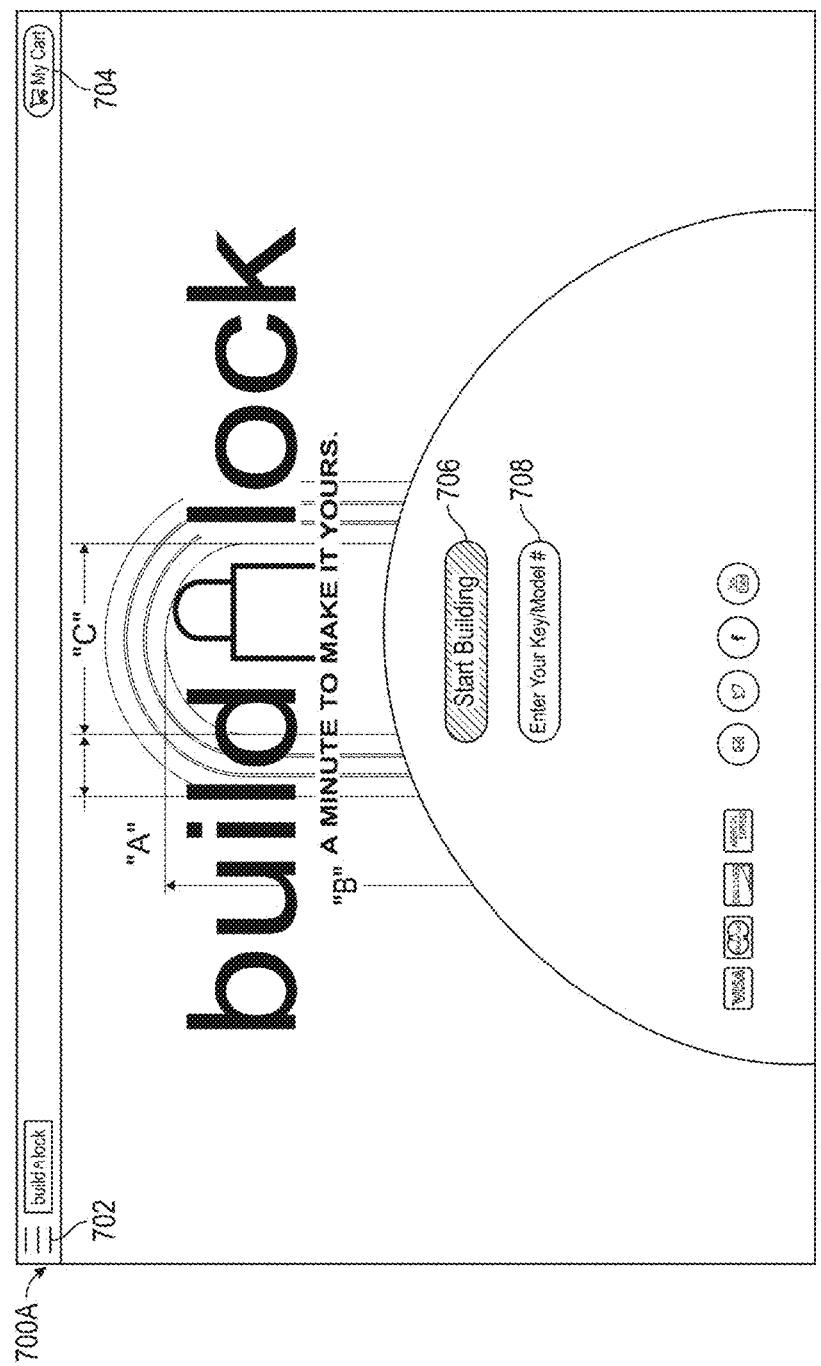
FIGS. 7A-7T illustrate an implementation of graphical user interfaces for an online ordering process, according to an embodiment.
Figure 7B:
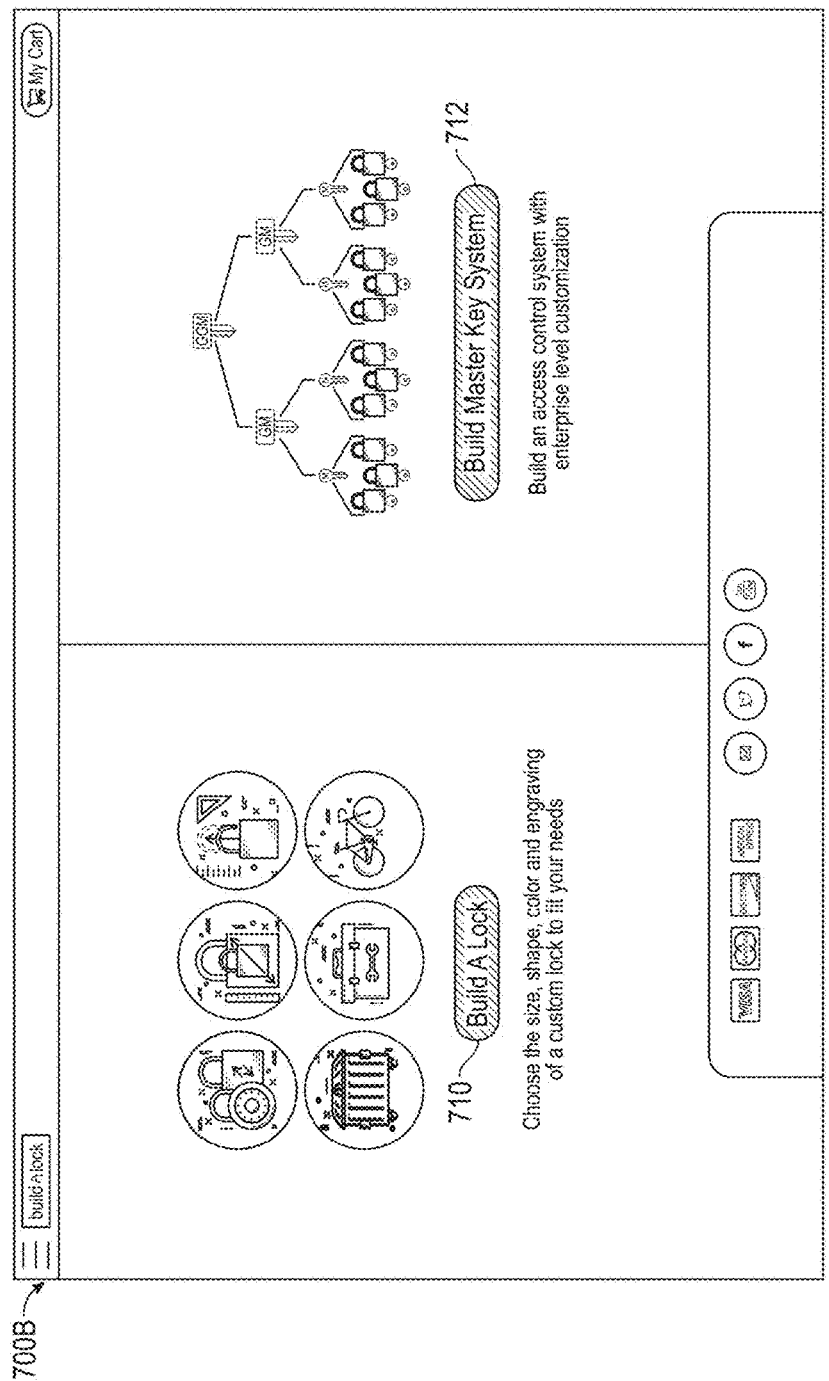
Figure 7C:
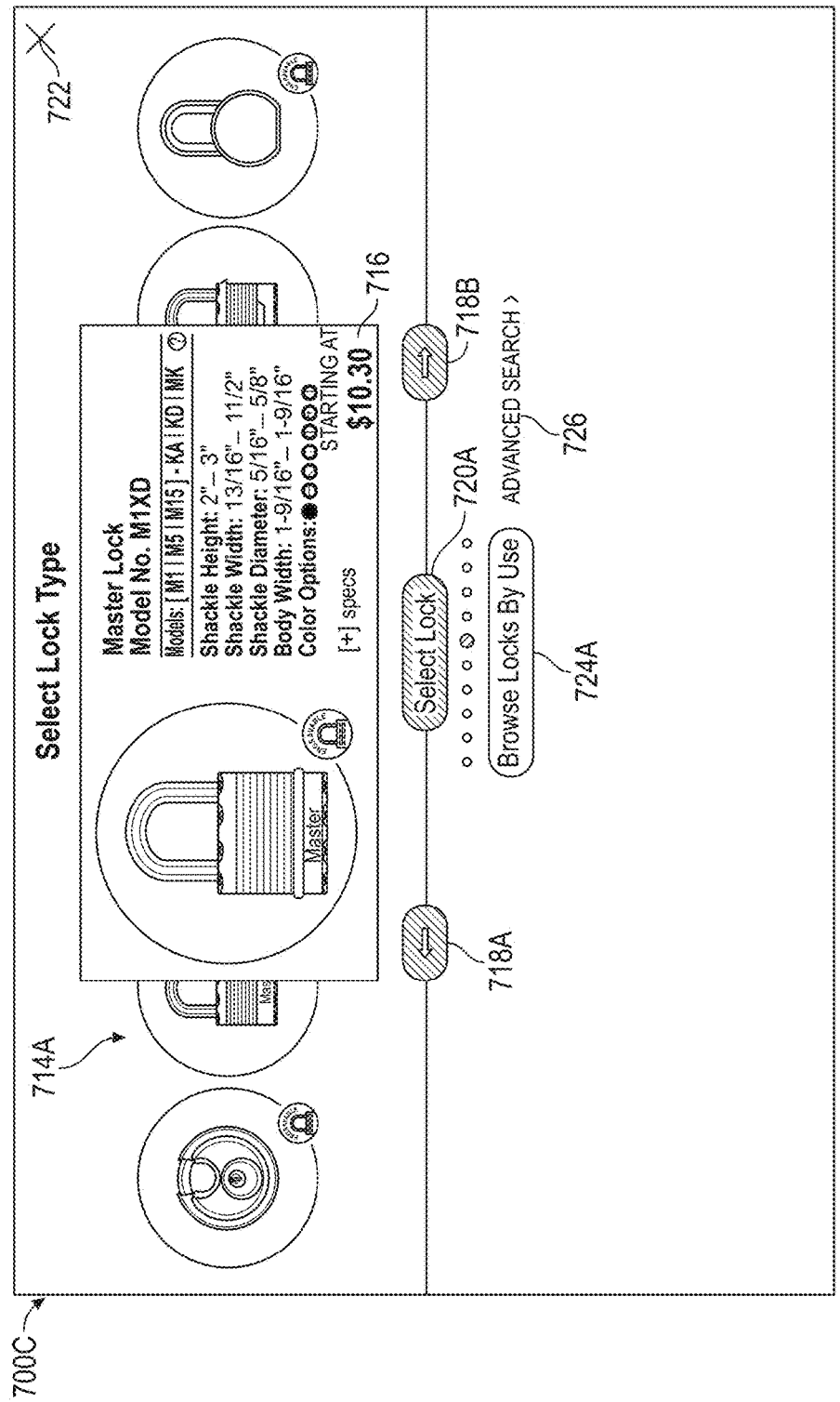
Figure 7D:
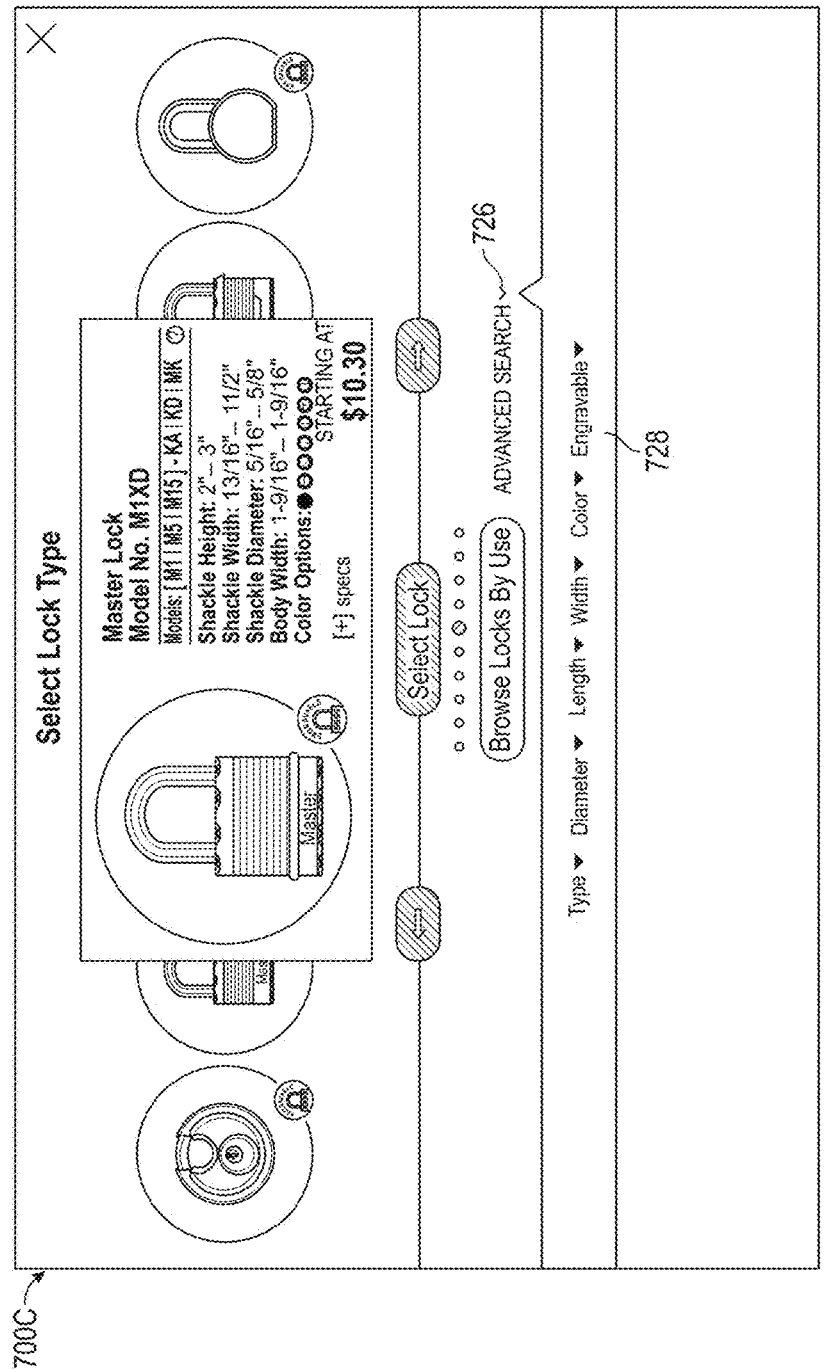
Figure 7E:
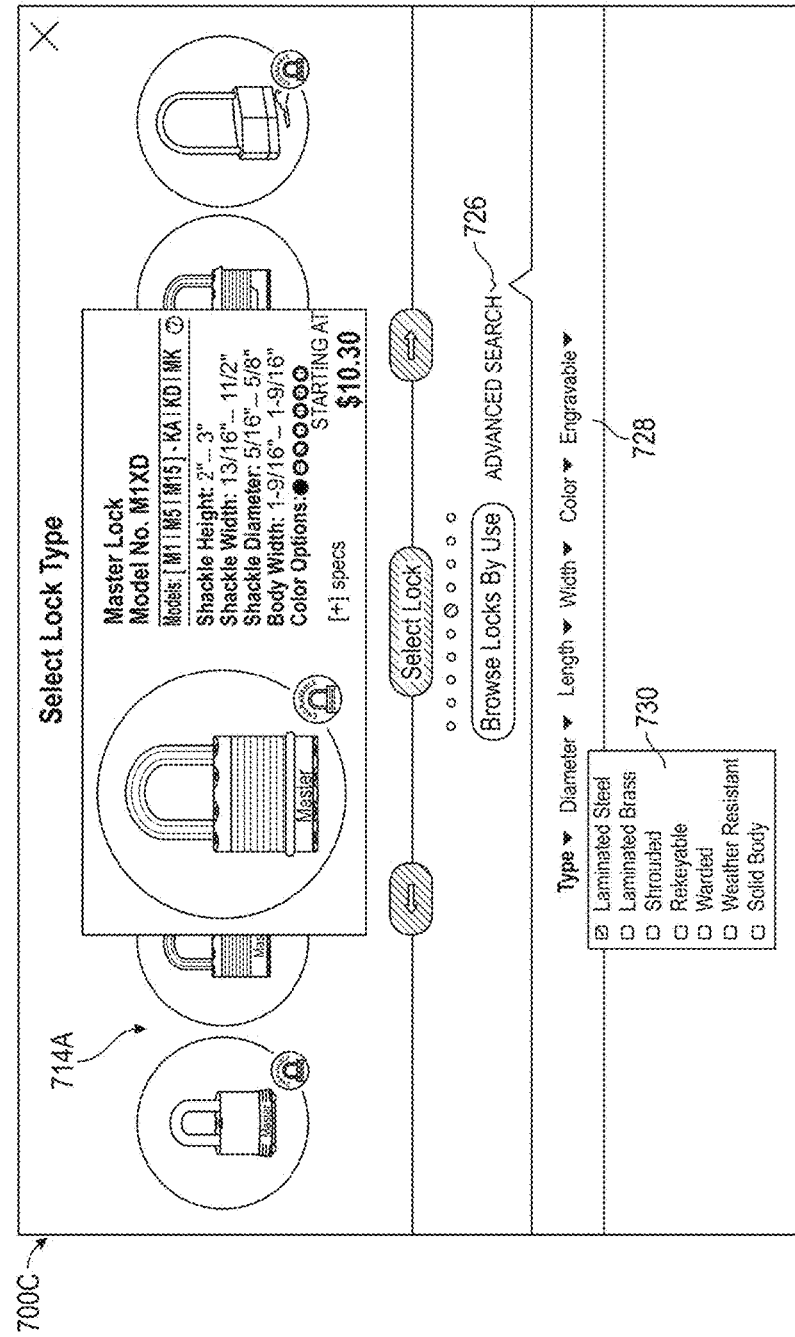
Figure 7F:
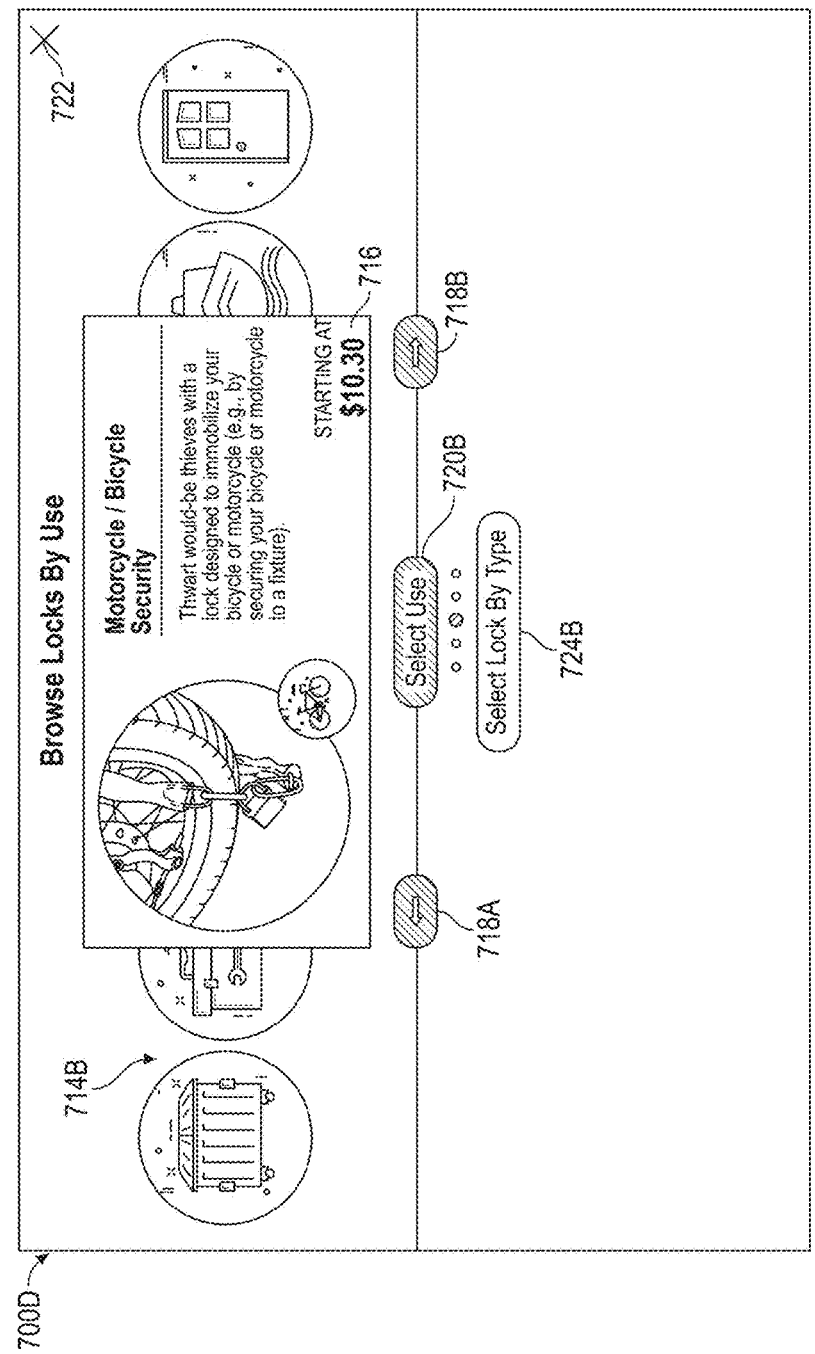
Figure 7G:
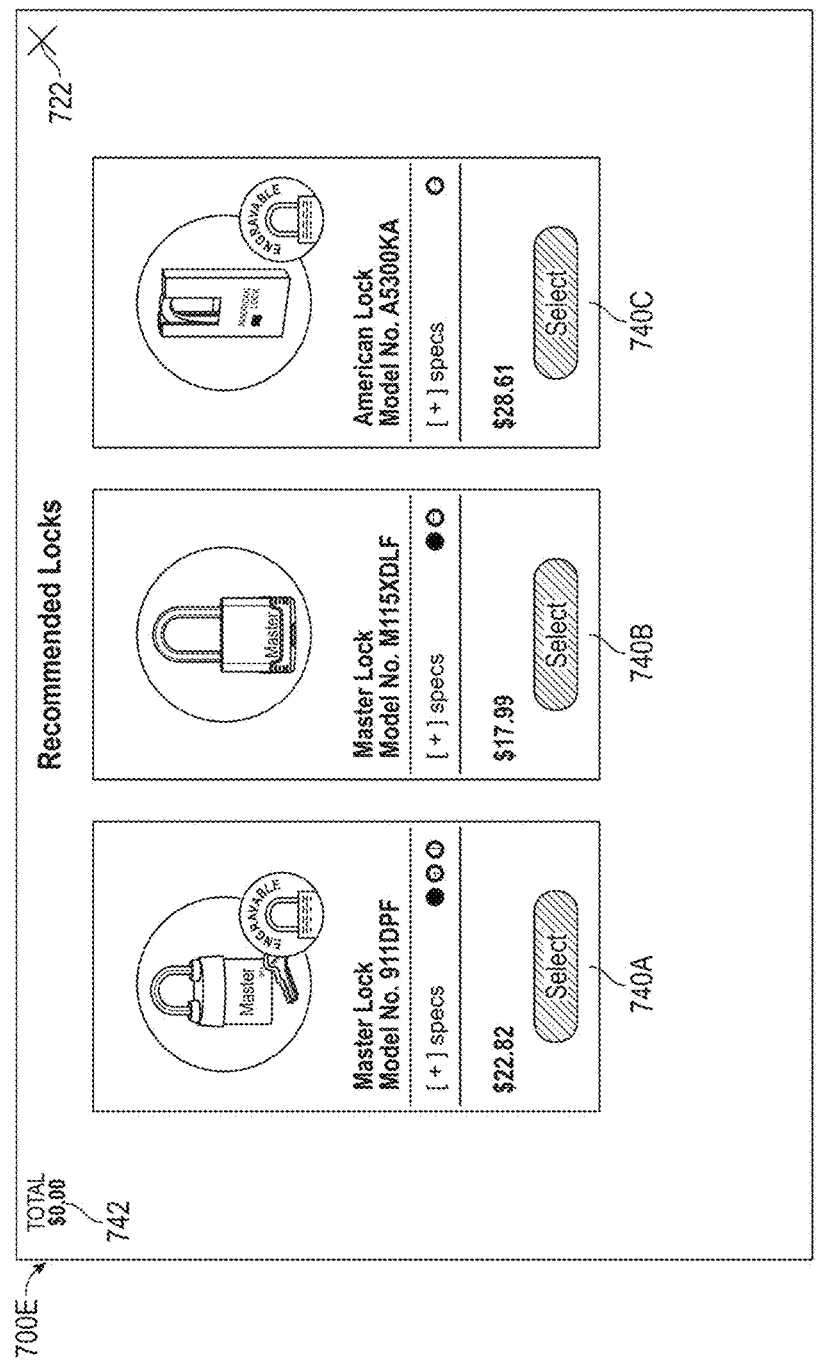
Figure 7H:
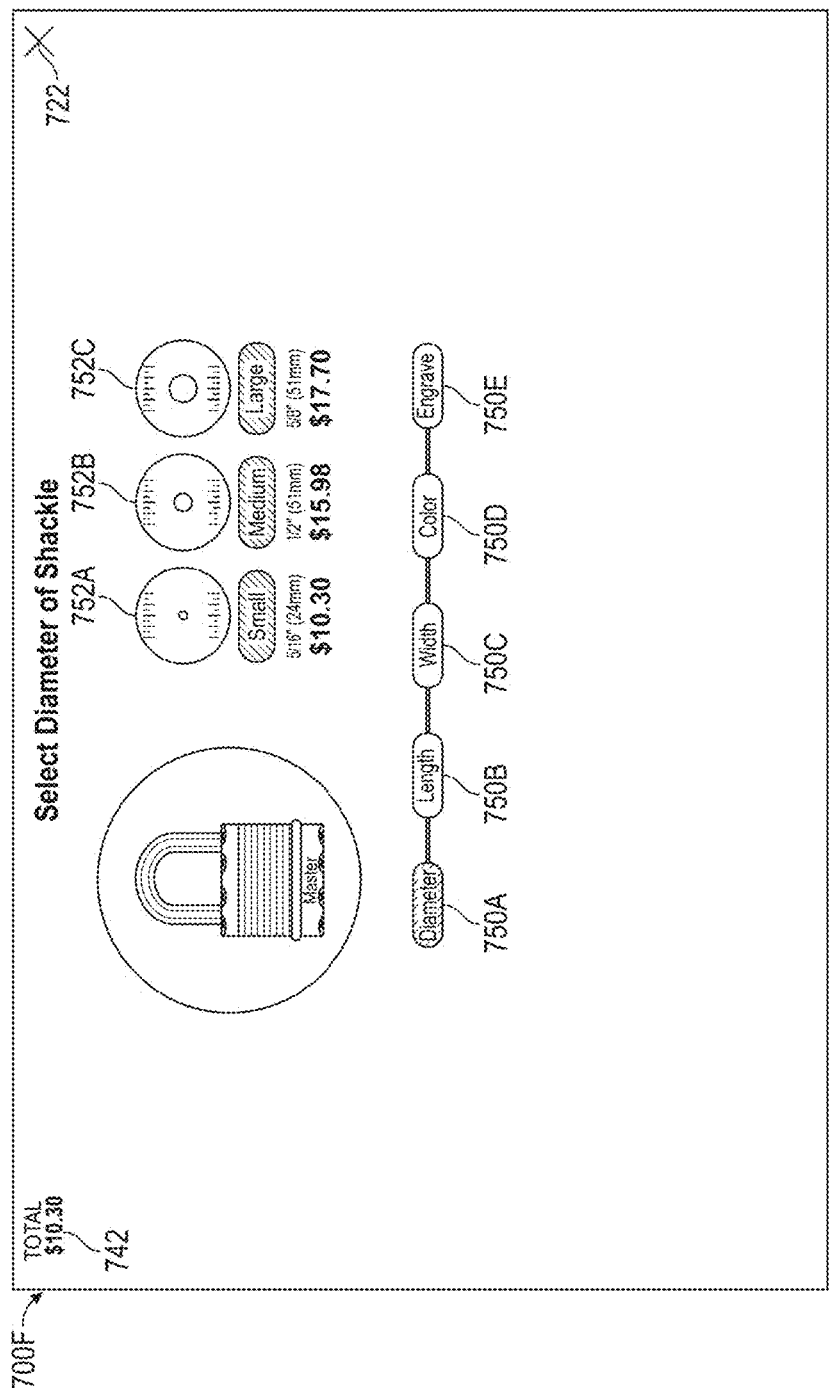
Figure 7I:
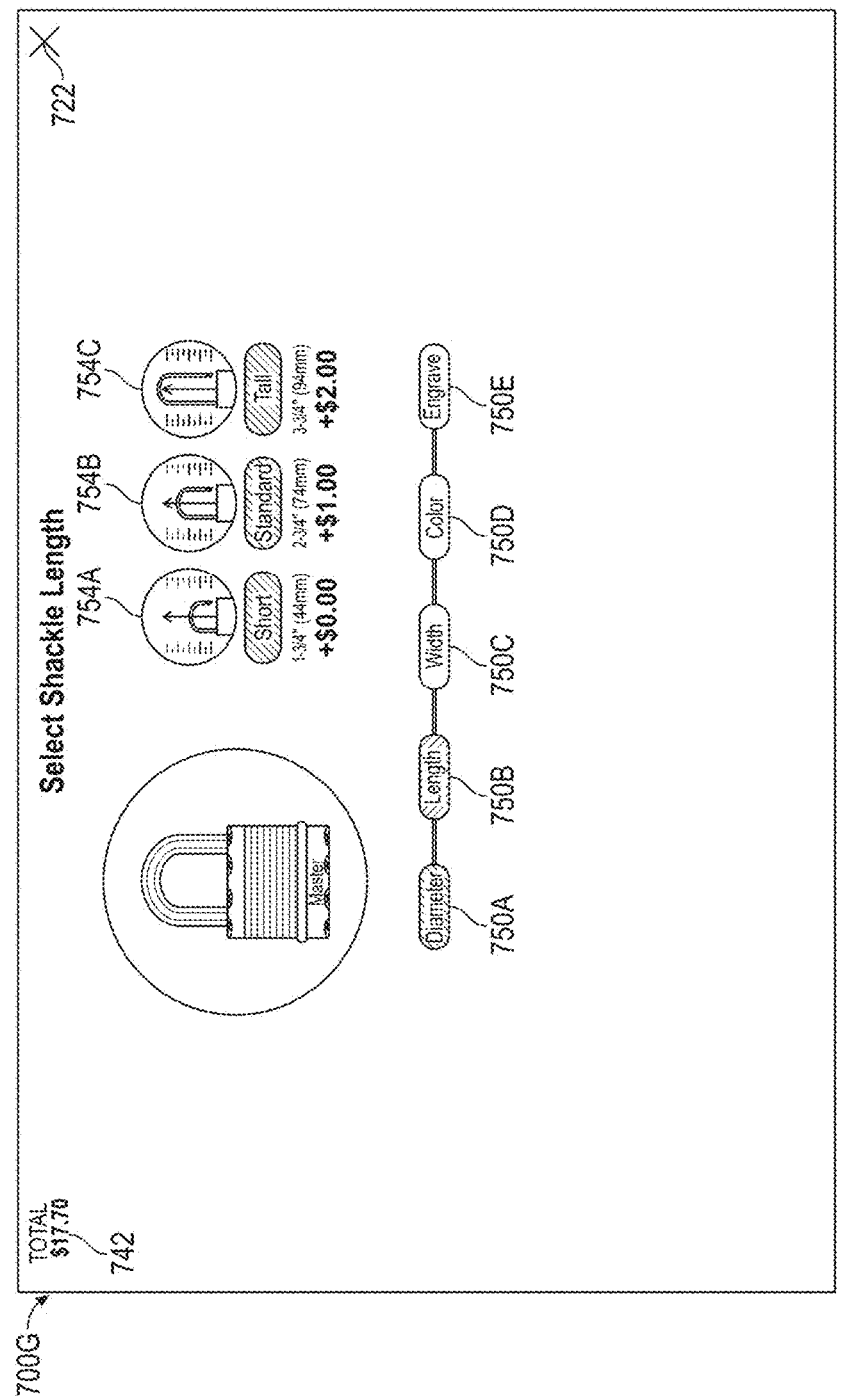
Figure 7J:
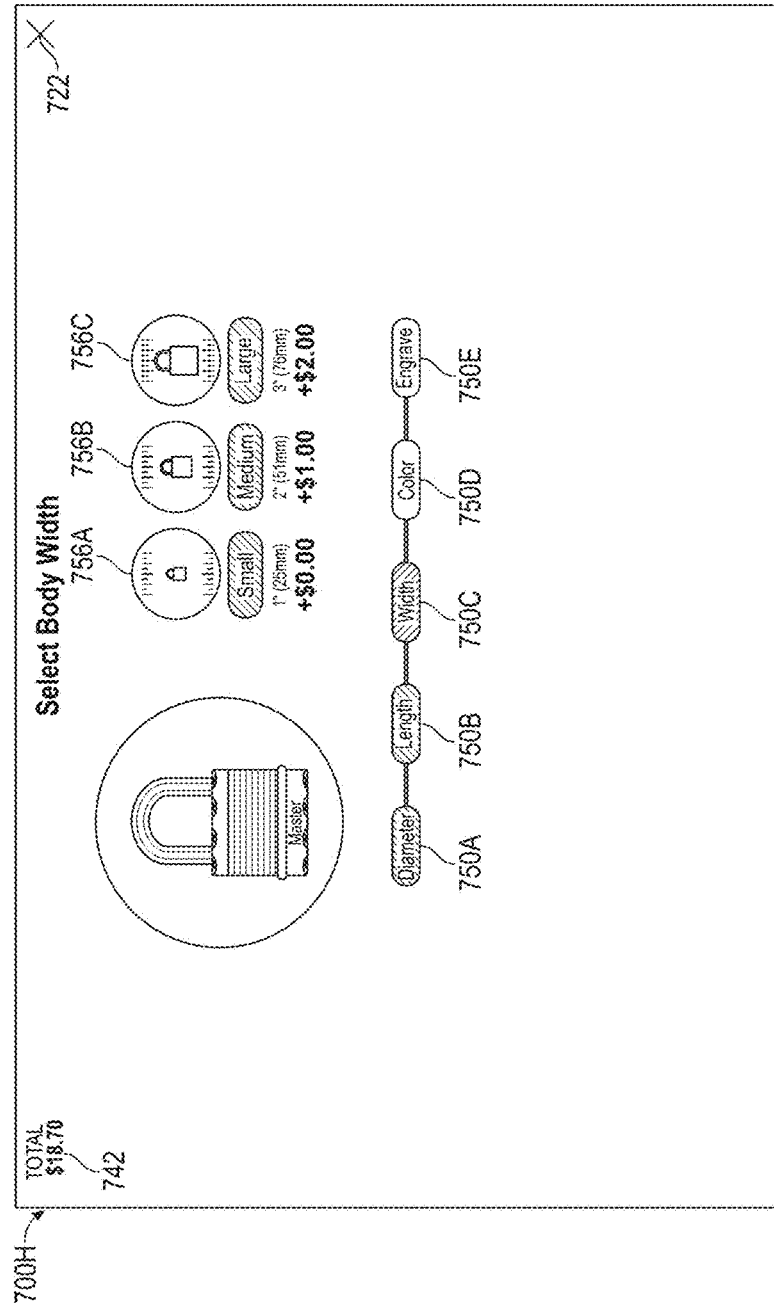
Figure 7K:
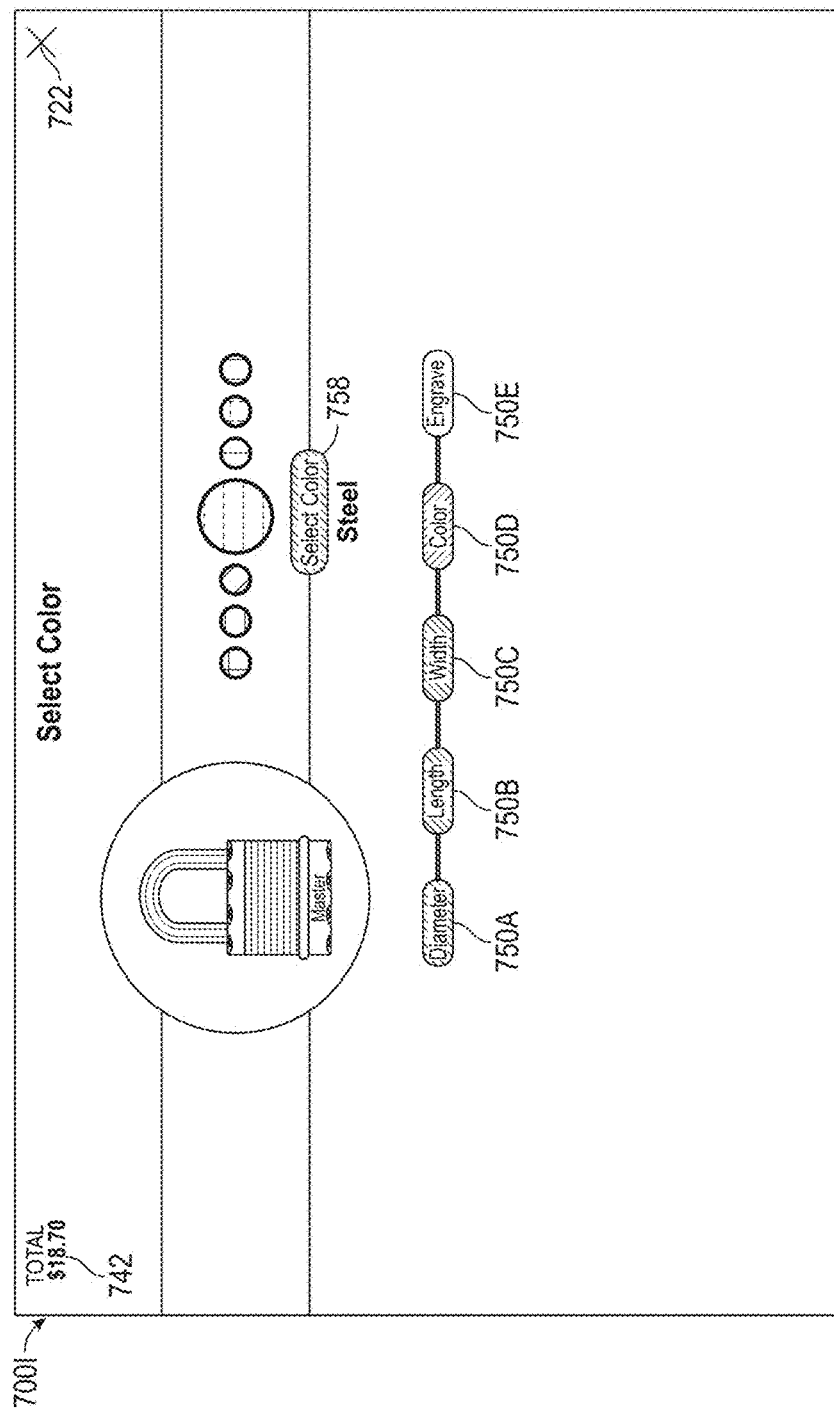
Figure 7L:
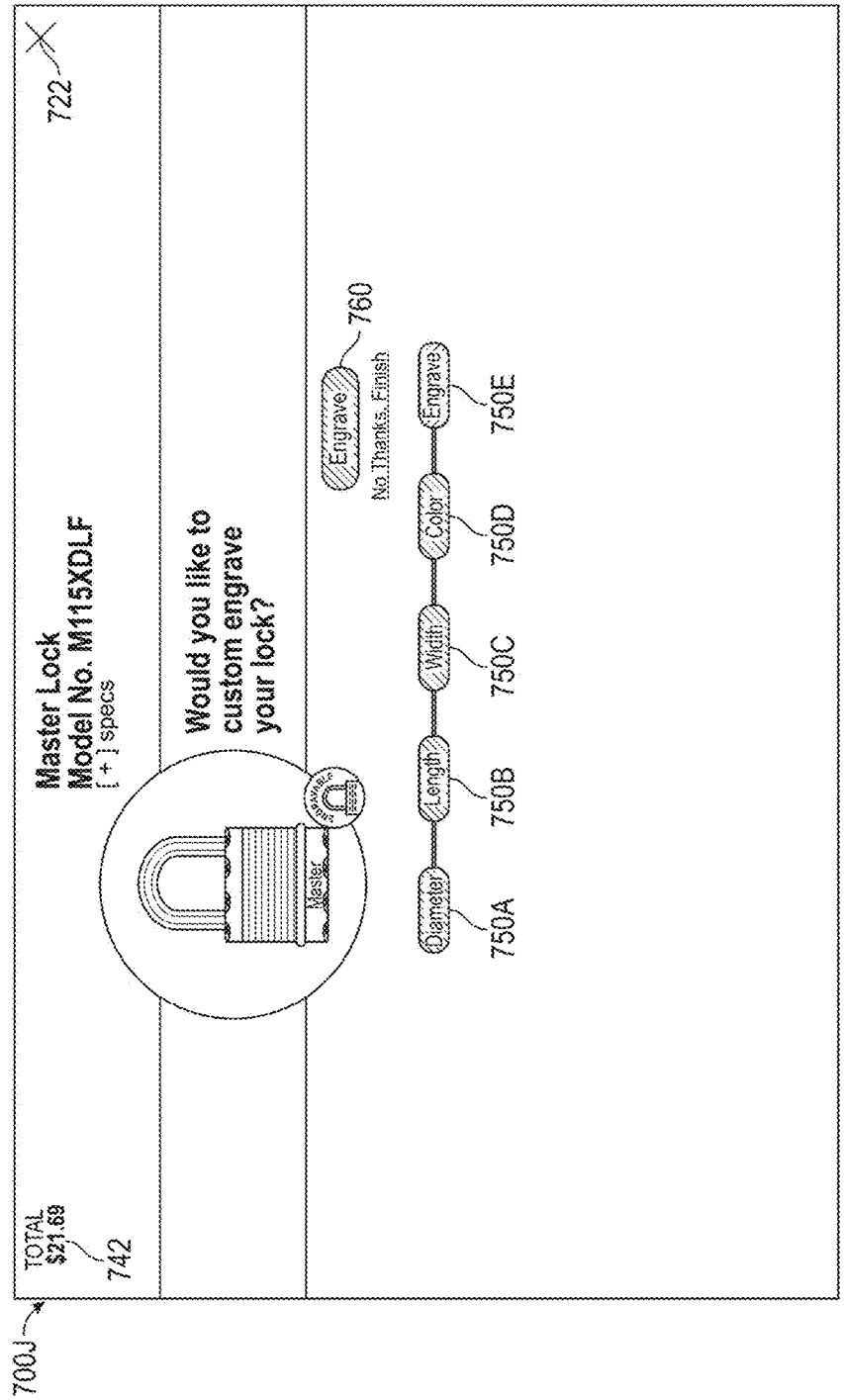
Figure 7M:
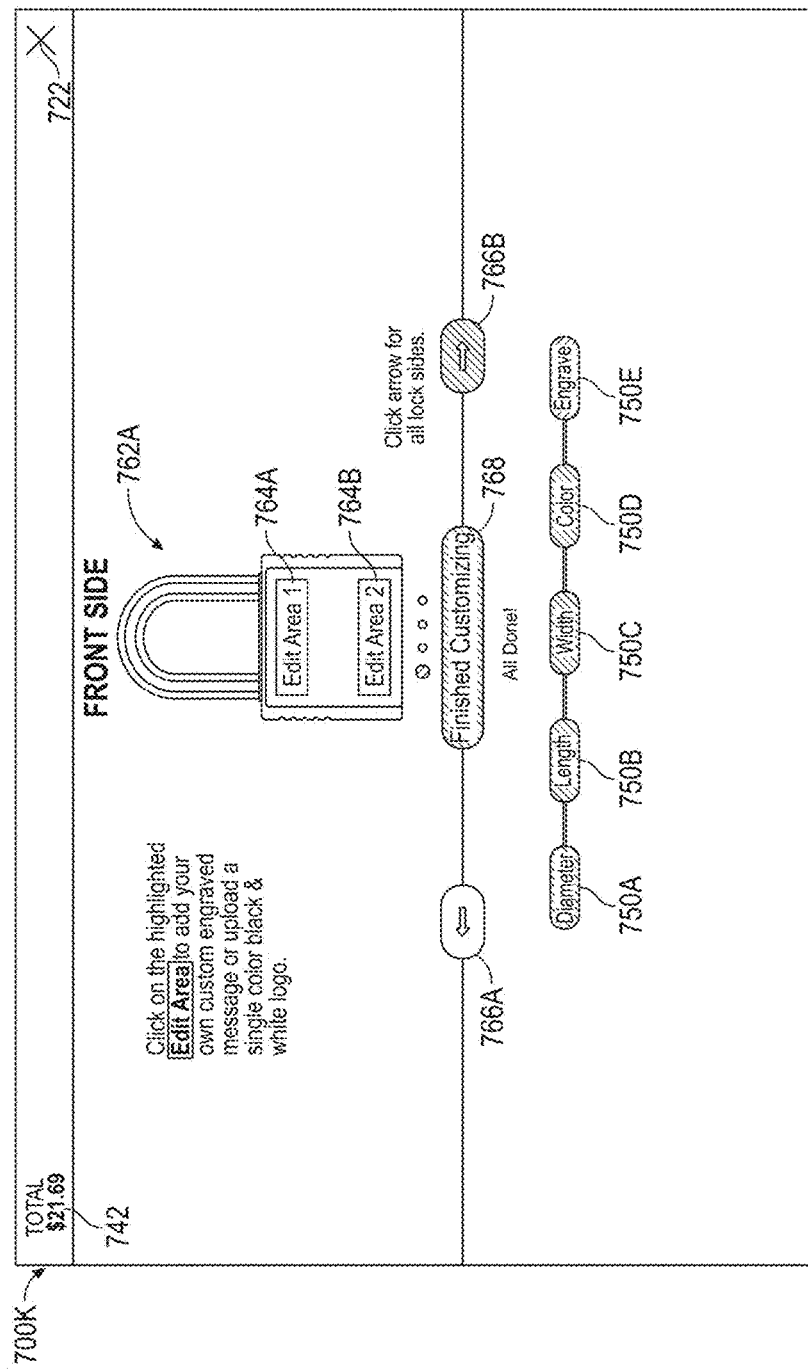
Figure 7N:
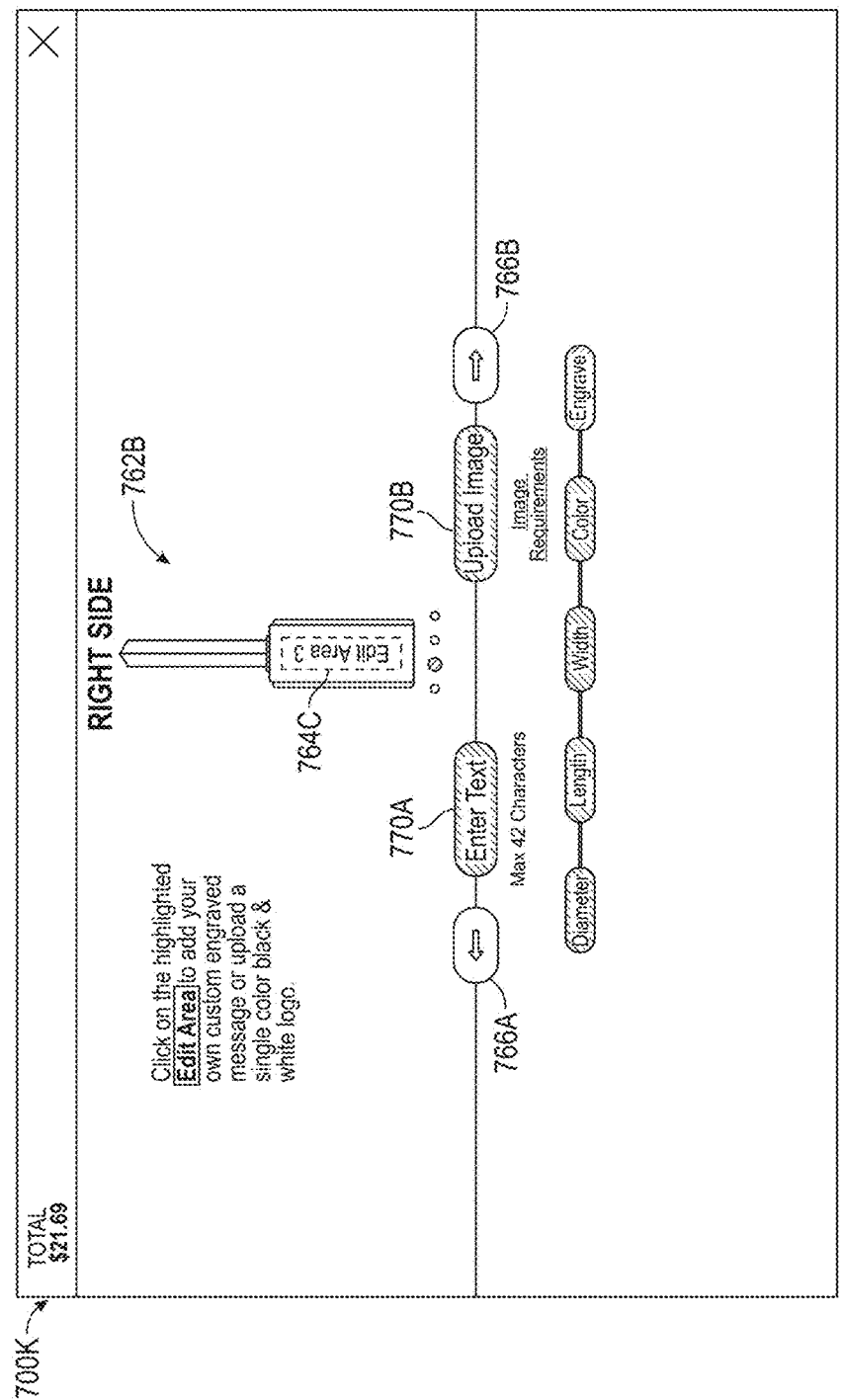
Figure 7O:
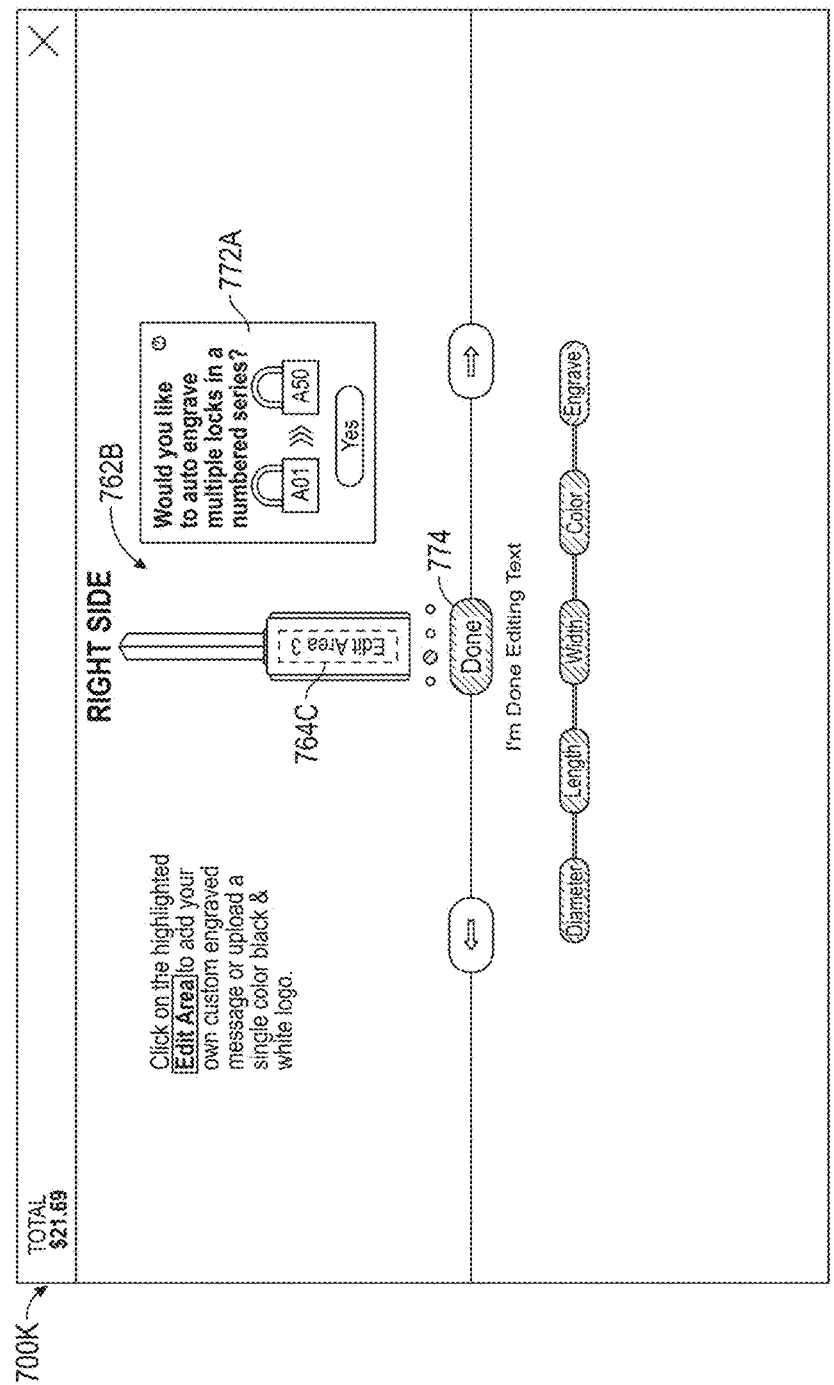
Figure 7P:
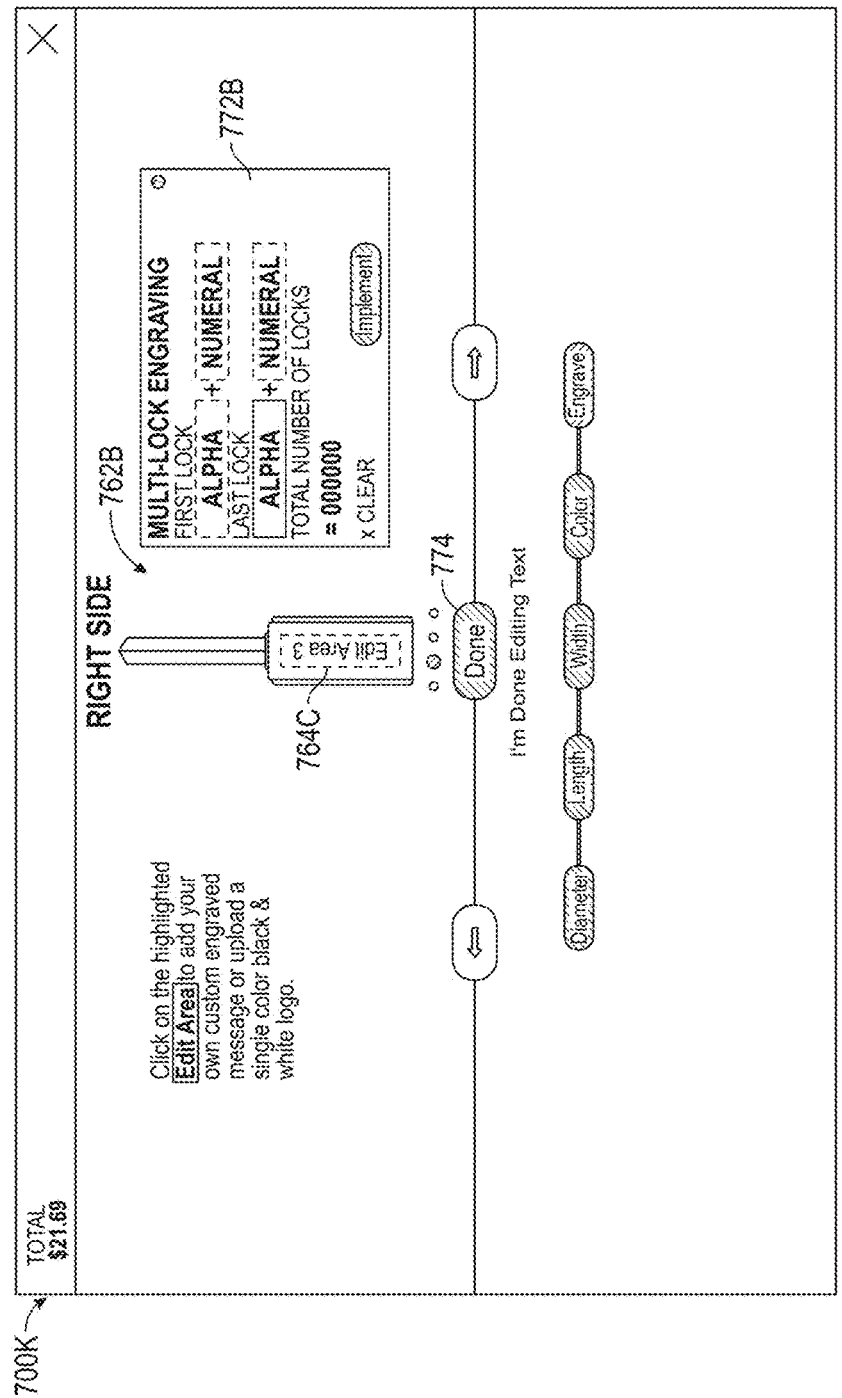
Figure 7Q:
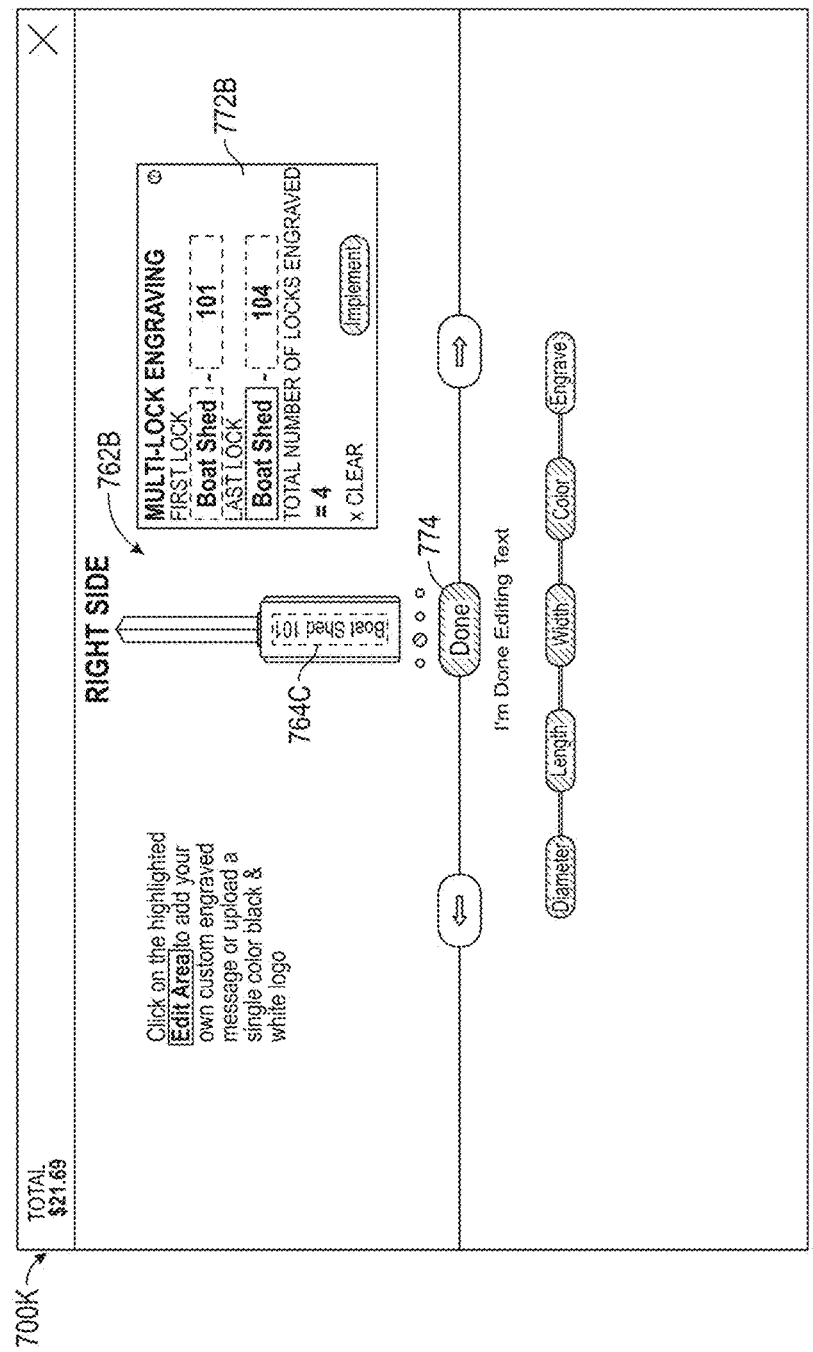
Figure 7R:
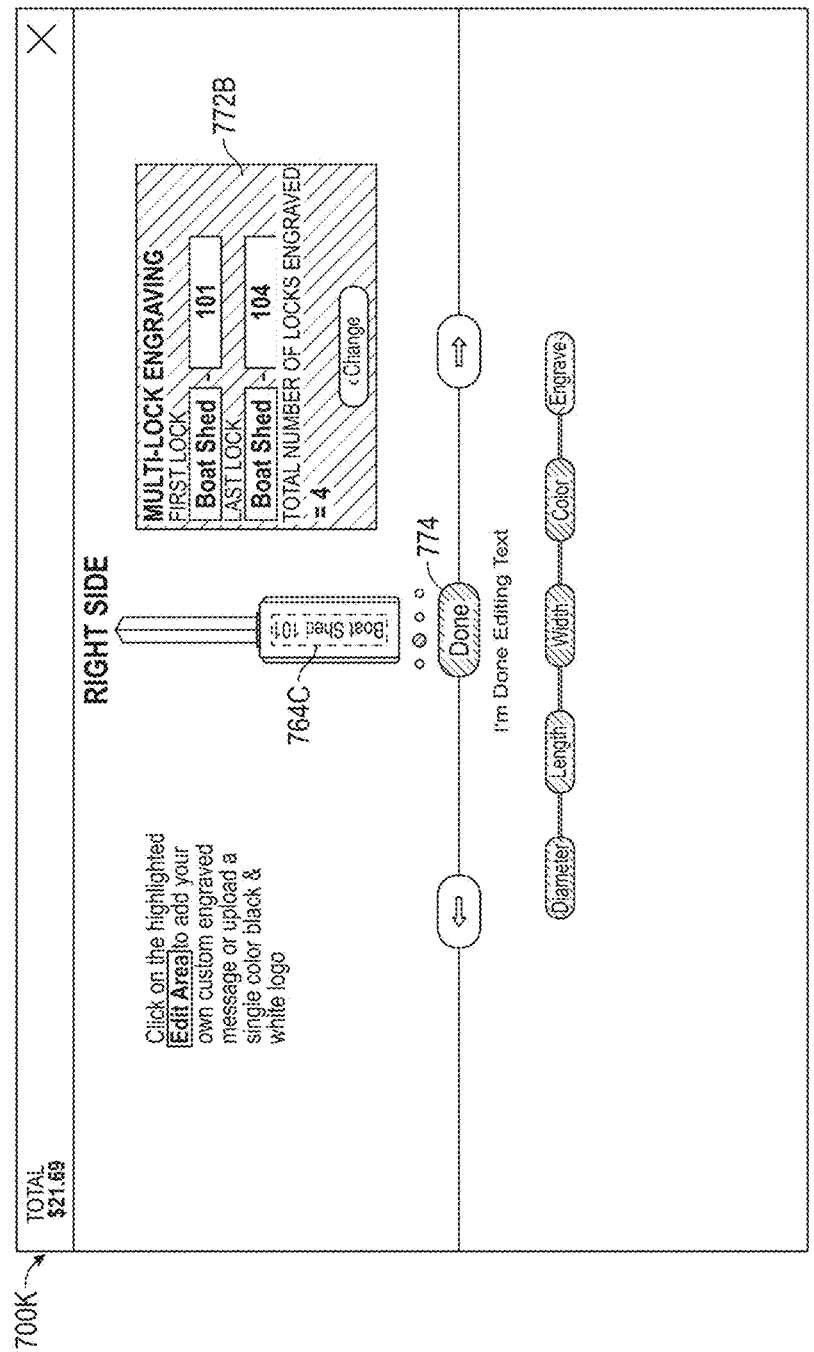
Figure 7S:
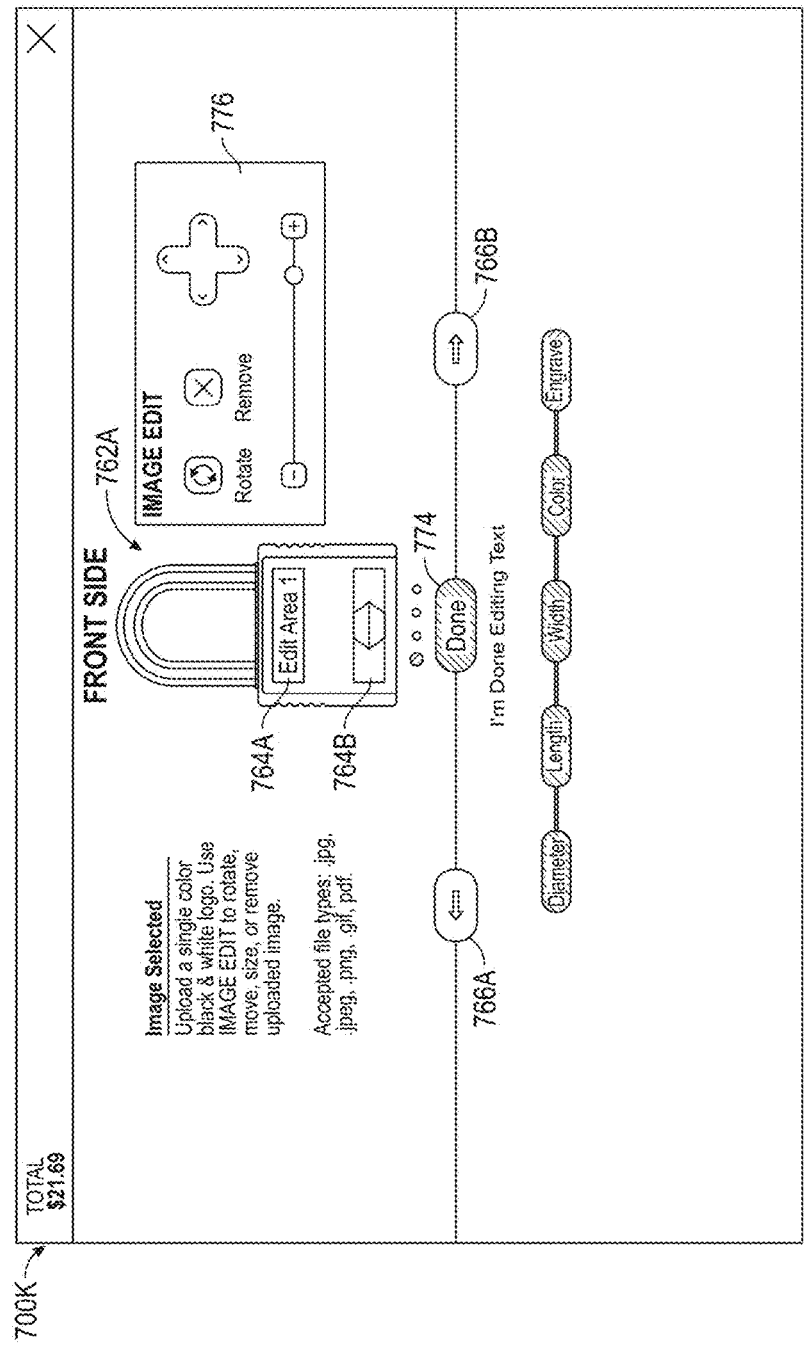
Figure 7T:
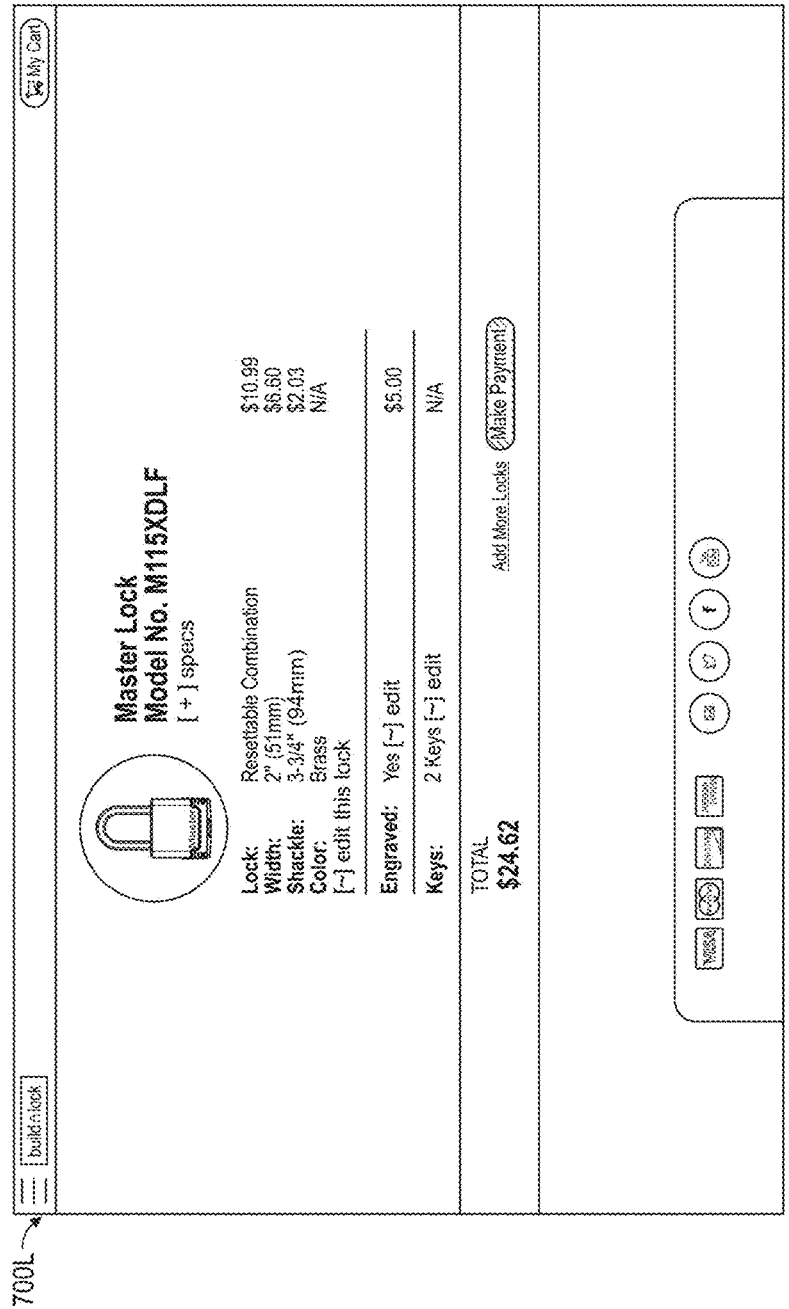

FIGS. 7A-7T illustrate an example embodiment of a set of ordering and customization screen(s) 700 within the graphical user interface of the application, which implements one or more of the disclosed features, according to an embodiment. While illustrated with a certain arrangement of graphical elements, screen(s) 700 may be implemented with more, fewer, or a different arrangement of graphical elements than those illustrated. As discussed elsewhere herein, screen(s) 700 may be implemented as a single page that is updated in real time without page transitions. Alternatively, screen(s) 700 could be implemented as multiple pages with page transitions in response to user interactions.

FIG. 7A illustrates a screen 700A for initiating an order, according to an embodiment. Screen 700A comprises a menu input 702, a cart input 704, a start-building input 706, and an identifier input 708. In the illustrated embodiment, screen 700A is a clean interface with a call-to-action that directs the user to either start building a lock or key system by selecting start-building input 706, or search for lock models based on a key identifier and/or model name using identifier input 708.

In an embodiment, menu input 702 comprises an icon that, when selected by a user, provides access to an application menu. For example, in response to the user's selection of menu input 702, the application may display an application menu (e.g., as a pop-up overlay or slide-out overlay on the current screen) that provides one or more inputs for navigating to other screens of the application's graphical user interface, accessing other functions of the application, and/or the like. The application menu may comprise inputs for signing in or out of the user's account, links for accessing screens related to a signed-in user's account (e.g., an account overview screen, a screen for reordering a prior order, an order history screen, a screen for accessing a saved key system or other project(s), a screen for submitting an application for credit, etc.), links to screen(s) for viewing information about the operator, a return policy, a privacy policy, news (e.g., related to new lock products, new application features, etc.), and/or support, and/or the like. Once the application menu has been opened or expanded by a user, menu input 702 may change to an "x" or other indication for closing or collapsing the application menu.

In an embodiment, cart input 704 comprises an icon that, when selected by a user, provides access to a virtual shopping "cart" associated with the user. For example, in response to the user's selection of cart input 704, the application may display information regarding the user's online shopping cart (e.g., as a pop-up overlay on the current screen, or as a separate dedicated screen). The information regarding the user's online shopping cart may comprise a list of items that the user has added to his or her shopping cart, including an image, description, and price of each item, a total price of all items in the shopping cart (e.g., including tax, shipping, etc.), one or more inputs for inputting and/or applying a promotional or discount code, one or more inputs for "checking out" or otherwise completing the transaction, and/or the like.

In an embodiment, start-building input 706 comprises an icon that, when selected by a user, provides access to a screen for building a lock or key system. For example, in the illustrated embodiment, selection of start-building input 706 directs the user to screen 700B in FIG. 7B.

In an embodiment, identifier input 708 comprises an icon that, when selected by a user, provides access to a screen for searching for a lock based on a key identifier and/or model name. Alternatively, identifier input 708 could comprise a search textbox for directly inputting the key identifier and/or model name, and initiating a search of lock models based on the input key identifier and/or model name. Embodiments of user interfaces and search functionality for searching lock models based on a key identifier and/or model name are described in the related patent applications.

FIG. 7B illustrates a screen 700B for building a lock or key system, according to an embodiment. Screen 700B comprises a build-a-lock input 710 and a build-a-key-system input 712.

In an embodiment, build-a-lock input 710 comprises an icon that, when selected by a user, provides access to a screen for building an individual lock to the user's specification. For example, in the illustrated embodiment, selection of build-a-lock input 710 directs the user to screen 700C in FIG. 7C or screen 700D in FIG. 7F for selecting a base lock model. The graphical user interface may enable a user to browse lock models based on type and/or use.

In an embodiment, build-a-key-system input 712 comprises an icon that, when selected by a user, provides access to a screen for building a key system. For example, in the illustrated embodiment, selection of build-a-key-system 712 directs the user to key-tree screen 800, illustrated in FIG. 8A. Thus, users (e.g., advanced business-to-business users) who know that they will need multiple locks have the option to build an entire hierarchical key system (e.g., for one or more commercial facilities).

FIG. 7C illustrates a screen 700C for selecting a lock model based on type, according to an embodiment. Screen 700C comprises a carousel 714A, a details frame 716, one or more scrolling inputs 718, a lock-selection input 720A, a close input 722, and a browse-by-use input 724A. Screen 700C may be implemented as an overlay (e.g., over screen 700B), which can be closed by selecting close input 722. This ensures that the user always has easy access to the backbone of the graphical user interface.

As illustrated, carousel 714A comprises a scrollable carousel of lock images, representing different base lock models that the user can select for customization and/or purchase. The user may scroll through the images, using scrolling inputs 718 (e.g., a left and right arrow) and/or swipe operations (e.g., in embodiments which support touch operations via a touch sensor), and select one of the lock images in carousel 714A.

In an embodiment, when a user selects one of the images of a base lock model and/or as the user scrolls a new base lock model to the center or other focus of carousel 714A, the graphical user interface responsively provides a details frame 716 for the selected base lock model. Details frame 716 may include an image of the lock model, a name or other identifier of the lock model, variations of the lock model, an indication of whether the lock model can be keyed alike, keyed differently, and/or used with a master key, a range of shackle heights, shackle widths, and/or shackle diameters available for the lock model, a range of body widths available for the lock model, color options available for the lock model, a price of the lock model, an input for additional information about the lock model (e.g., a link to a PDF of the lock model's full specification or manual), and/or the like.

In an embodiment, lock-selection input 720A comprises an icon that, when selected by a user, provides access to a screen for customizing the base lock model that is currently in the center or other focus of carousel 714A. For example, in the illustrated embodiment, selection of lock-selection input 720 directs the user to screen 700F, illustrated in FIG. 7H.

In an embodiment, browse-by-use input 724A comprises an icon that, when selected by a user, provides access to a screen with an alternative carousel 714B that comprises a scrollable carousel of different usage scenarios for locks (e.g., baggage, storage containers or lockers, bicycles, boats, doors, etc.). Screen 700D in FIG. 7F is one example of such a screen.

In an embodiment, screen 700C comprises an advanced-search input 726. When advanced-search input 726 is selected, the graphical user interface may display an advanced-search menu 728 (e.g., as pop-up overlay), as illustrated in FIG. 7D, according to an embodiment. Advanced-search menu 728 provides inputs for the user to search the available lock models based on a plurality of attributes, such as material type, shackle diameter, shackle length, body width, color, whether or not the lock model is engravable, and/or the like.

For example, FIG. 7E illustrates screen 700C after the user has selected an input for the material type within advanced-search menu 728, according to an embodiment. In this example, the user has selected "Laminated Steel" from a list 730 of different material types (e.g., represented as a plurality of labeled check boxes). In response, the graphical user interface has removed all representations of any lock, which is not made of laminated steel, from carousel 714A. As the user selects further attributes in advanced-search menu 728, more lock models will be excluded from carousel 714A. Thus, advantageously, the user may utilize advanced-search menu 728 to narrow down the number of locks, represented in carousel 714A, in order to facilitate his or her selection process.

FIG. 7F illustrates a screen 700D for selecting a lock model based on usage scenario, instead of type, according to an embodiment. As illustrated, screen 700D may be similar to screen 700C, except that carousel 714B comprises a scrollable carousel of icons or images representing different usage scenarios of locks. As with carousel 714A, a user may view a details frame 716 for the selected use. However, in this case, details frame 716 may include an image and name representing the usage scenario, a description of the usage scenario, a starting price of the cheapest lock model suitable for the usage scenario or a range of prices for the lock models suitable for the usage scenario (e.g., a lowest price, intermediate or median price, and/or highest price; the starting prices or price ranges for a plurality of tiers, such as low-cost, medium-cost, and high-cost tiers, etc.), and/or the like. Similarly to screen 700C, a user may scroll through carousel 714B using input(s) 718 and/or swipe operations, may close screen 700D using close input 722, and may return to or switch to screen 700C using browse-by-type input 724B.

In an embodiment, use-selection input 720B comprises an icon that, when selected by a user, provides access to a version of browse-by-type screen 700C that is unique to the usage scenario that is currently in the center or other focus of carousel 714B. For example, use-selection input 720B may direct the user to a browse-by-type screen 700C, in which the carousel 714A only comprises representations of lock models which are suitable for the selected usage scenario. For example, each lock model may be associated (e.g., in database 114) with one or more usage scenarios, and only those lock models associated with the selected usage scenario may be included in carousel 714A. As an example, if a user were to select bicycle security as the usage scenario in browse-by-use screen 700D, and then select use-selection input 720B in screen 700D, only locks that can be used or are recommended for bicycle security will be shown in the resulting browse-by-type screen 700C.

Alternatively, in an embodiment, use-selection input 720B comprises an icon that, when selected by a user, provides access to a screen with representations of lock models that are recommended for the selected usage scenario. FIG. 7G illustrates a screen 700E for providing such recommendations for a selected usage scenario, according to an embodiment. The number of recommendations may be limited to a certain number (e.g., three different lock models) to avoid overwhelming the user with too many options. Advantageously, this enables a user with little to no knowledge about locks to get a fast and efficient recommendation with little effort. As illustrated, screen 700E comprises three representations 740 of recommended lock models. Each representation comprises an image of a lock model, a name and/or other identifier of the lock model, color swatches representing the colors in which the lock model is available, an input for viewing additional information about the lock model, a base price of the lock model, and an input for selecting the lock model. In addition, the price of the selected lock model (e.g., including or excluding the price delta caused by a current customization option), the price delta caused by a current customization option, and/or the total price of the user's current shopping cart may be displayed in region 742. Notably, until at least one base lock model is added to the user's shopping cart (e.g., by selecting one of representations 740A, 740B, or 740C), the price in region 742 may remain zero.

Once a particular lock model is selected (e.g., via lock-selection input 720A in screen 700C, selection of a representation 740 in screen 700E, etc.), the graphical user interface may provide one or more screens for customizing the selected lock model. FIGS. 7H-7S illustrate one or more such screens for customizing a selected lock model, according to an embodiment. The screen(s) may comprise a customization wizard that walks the user through a customization process, while updating the price in region 742, any preview images of the selected lock model, any indications of selected attributes, and/or the like, in real time or near-real time, based on the selected customization options, as those customization options are selected. In an embodiment, the customization options include shackle diameter, shackle length, body width, color, and/or engravings. However, it should be understood that other embodiments may offer fewer, more, and/or different customization options and/or in a different order than shown in the illustrated wizard.

In an embodiment, each screen in the customization wizard comprises representations 750. Each representation 750 indicates one step in the customization process, and one of the representations 750 is highlighted or otherwise distinguished to indicate the current step in the customization process represented by the currently visible screen. Advantageously, this enables the user to visualize his or her progress within the customization process. In addition, each representation 750 may comprise an input for jumping to the step indicated by that representation. For example, representation 750A may comprise a link to screen 700F, representation 750B may comprise a link to screen 700G, representation 750C may comprise a link to screen 700H, representation 750D may comprise a link to screen 700I, and representation 750E may comprise a link to screen 700J. Alternatively or additionally, the customization wizard may automatically provide the next screen in the customization process in response to the user's completion of the step represented by a current screen (e.g., selection of one of the customization options within the current screen). It should be understood that different lock models may have different available customization options (e.g., different ranges of shackle diameter, shackle length, and/or body width, different colors, different engraving surfaces, no engraving surfaces, etc.). If the selected lock model is not available with a certain customization option, the representation 750 of that customization option may be excluded from representations 750. For example, if a particular lock model only comes in one color or is not engravable, "color" representation 750D may be excluded or "engrave" representation 750E may be excluded, respectively.

FIG. 7H illustrates a screen 700F for customizing a shackle diameter of a selected lock model, according to an embodiment. Notably, representation 750A is highlighted in screen 700F to indicate that the current step, in the customization process, is the selection of a shackle diameter. As illustrated, screen 700F comprises shackle-diameter representations 752 for selecting the desired shackle diameter. Initially, a default shackle diameter may be selected. Each representation 752 comprises an indication (e.g., small, medium, or large) and measure of the shackle diameter (e.g., in inches and/or millimeters) and a price of the lock model with the represented shackle diameter. In addition, screen 700F comprises an image of the selected lock model with the selected shackle diameter (e.g., in addition to any previously selected customization options). For instance, each time a new customization option is selected (e.g., by clicking on the customization option and/or mousing or hovering over the customization option), the application may automatically generate a composite image of the base lock model with the customization option (e.g., by combining a base image of the lock with an image of the customized shackle, color, engraving, or other attribute) in real time or near-real time. It should be understood that composite images may be cached (e.g., in database(s) 114), such that frequently used composite images do not need to be recreated for each use. Alternatively, database(s) 114 may store images for each possible combination of customized lock models, and the application may simply retrieve the stored image for a particular set of customizations to a particular lock model from database(s) 114.

FIG. 7I illustrates a screen 700G for customizing a shackle length of a selected lock model, according to an embodiment. Notably, representation 750B is highlighted in screen 700G to indicate that the current step, in the customization process, is the selection of a shackle length, and representation 750A is highlighted (e.g., in a different manner than representation 750B) in screen 700G to indicate that the preceding step has been completed. It should be understood that this distinctive highlighting of the current and completed steps may be present in each screen of the customization wizard that illustrates the user's progress through the customization process. As illustrated, screen 700G comprises shackle-length representations 754 for selecting the desired shackle length. Initially, a default shackle length may be selected. Each representation 754 comprises an indication (e.g., short, standard, or tall) and measure of the shackle length (e.g., in inches and/or millimeters) and a change to the price (e.g., shown in region 742) that will result from selection of the represented shackle length. In addition, screen 700G comprises an image of the selected lock model with the selected shackle length (e.g., as a composite image with any other previously selected customization options).

FIG. 7J illustrates a screen 700H for customizing a body width of a selected lock model, according to an embodiment. Notably, representation 750C is highlighted in screen 700H to indicate that the current step, in the customization process, is the selection of a body width, and representations 750A and 750B are highlighted in screen 700H to indicate that these preceding steps have been completed. As illustrated, screen 700H comprises width representations 756 for selecting the desired body width. Initially, a default body width may be selected. Each representation 756 comprises an indication (e.g., small, medium, or large) and measure of the body width (e.g., in inches and/or millimeters) and a change to the price (e.g., shown in region 742) that will result from selection of the represented body width. In addition, screen 700H comprises an image of the selected lock model with the selected body width (e.g., as a composite image with any other previously selected customization options).

FIG. 7K illustrates a screen 700I for customizing a color of a selected lock model, according to an embodiment. Notably, representation 750D is highlighted in screen 700I to indicate that the current step, in the customization process, is the selection of a body color, and representations 750A-750C are highlighted in screen 700I to indicate that these preceding steps have been completed. As illustrated, screen 700I comprises a line or carousel of selectable color swatches 758 for selecting the desired body color. Initially, a default color swatch may be selected. Each of the color swatches may comprise an input. When a user selects one of the color swatches, the selected color swatch may be highlighted or otherwise distinguished (e.g., enlarged relative to the unselected color swatches), and an image of the selected lock model may be updated to show the lock model with the selected body color (e.g., as a composite image with any other previously selected customization options). Although not shown, each color swatch 758, or just those color swatches 758 that would result in a price change, may indicate a change to the price (e.g., shown in region 742) that will result from the selection of the represented color.

FIG. 7L illustrates a screen 700J for initiating an engraving process for a selected lock model, according to an embodiment. Notably, representation 750E is highlighted in screen 700J to indicate that the current step, in the customization process, is specifying any engraving(s), and representations 750A-750D are highlighted in screen 700J to indicate that these preceding steps have been completed. As illustrated, screen 700J comprises an image of the selected lock model with the previously selected customization options (e.g., as a composite image), an identifier of the selected lock model (e.g., manufacturer name, model number, etc.), a prompt to engrave the selected lock model, one or more inputs 760 for initiating an engraving specification process and/or for ending the customization process, and/or an input for viewing a specification (e.g., downloading a PDF document) for the selected lock model. If the user chooses to end the customization process, the application may direct the user to a screen for initiating a checkout process (e.g., screen 700L in FIG. 7T). Otherwise, if the user chooses to initiate an engraving specification process, the application may direct the user to a screen for specifying one or more engravings on the selected lock model.

FIGS. 7M-7S illustrate a screen 700K for specifying one or more engravings on one or more surfaces of the selected and customized lock model. As illustrated in FIG. 7M, screen 700K comprises a representation 762 of a surface of the selected lock model with one or more editable areas 764 on the represented surface. In the case that more than one surface of the selected lock model is engravable, a user may scroll between representations 762 of each of the plurality of surfaces using input(s) 766 (e.g., left and right arrows). Surface representations 762 may consist of a representation of each engravable surface or all surfaces of the selected lock model. In an embodiment, when screen 700K is initially displayed, screen 700K may automatically cycle at least once through each surface representation 762 for all surfaces or all engravable surfaces of the selected lock model. For example, the front surface of the lock model may be displayed first, and then the lock model may be automatically virtually rotated to display a side surface, the back surface, and the other side surface, before returning to and stopping on a display of the front surface. The user may then scroll through the various surface representations 762 (e.g., using input(s) 766) to specify engravings for one or more of the represented surfaces. When the user is finished specifying all desired engravings (if any), the user may then select completion input 768 to finish the customization process and be directed to a screen for initiating the checkout process (e.g., screen 700L in FIG. 7T).

Each editable area 764 within the currently displayed representation 762 may be identified, for example, by a border and/or text. The user may select an editable area 764 (e.g., by clicking on it or touching it), and the selected editable area may be distinguished from any unselected editable areas (e.g., by a highlighted border). In addition, one or more inputs for entering content into the selected editable area may be displayed (e.g., in place of completion input 768).

FIG. 7N illustrates screen 700K after a user has rotated representation 762 to view a right-side surface of the selected lock model (e.g., by selecting right-arrow input 766B) and then selected editable area 764C, according to an embodiment. As illustrated, after a user has selected an editable area 764, completion input 768 is replaced with one or more content-entry inputs 770. In an embodiment, content-entry inputs 770 comprise an enter-text input 770A and an upload-image input 770B. Alternatively, the user could input text directly into each editable area 764, in which case only an upload-image input 770B may be displayed in place of or in addition to completion input 768.

FIG. 7O illustrates screen 700K after a user has selected enter-text input 770A in FIG. 7N, according to an embodiment. After the selection of enter-text input 770A, the corresponding editable area 764 (764C in this example) may become editable, such that the user may type text directly into the editable area 764. Although not shown, in an embodiment, the application may automatically rotate any editable area 764, if necessary, to make it easier to read (e.g., temporarily converting vertical editable areas 764 into horizontal editable areas 764 during input, and returning them to verticality after input). Alternatively, the entire surface representation (e.g., 762B) may be rotated to aid the user's perspective. As illustrated, when text is to be entered into the editable area 764, the application may add a pop-up frame 772A to screen 700K. Pop-up frame 772A invites the user to specify a naming scheme to be used to auto-engrave a plurality of lock units (e.g., if the user intends to purchase multiple units of the selected lock model), and comprises an input (e.g., a "Yes" icon) for initiating the specification of the naming scheme.

FIG. 7P illustrates screen 700K after a user has chosen to specify a naming scheme via pop-up frame 772A in FIG. 7O, according to an embodiment. In response to the user's selection, pop-up frame 772B is displayed. Pop-up frame 772B comprises inputs for specifying the naming scheme. In the illustrated example, the user may specify an alphanumeric prefix and a numeric suffix for a first and last lock unit. In an embodiment, the alphanumeric prefix may remain constant across all lock units, in which case the user may only input the alphanumeric prefix once (e.g., in an input for the first lock unit). However, the user may specify both a first numeric suffix for the first lock unit and a second numeric suffix for the last lock unit. Editable area 764C may be updated (e.g., in real time or near-real time) to reflect any input alphanumeric prefix in conjunction with the first numeric suffix. In addition, once a user inputs both numeric suffixes, the application may automatically calculate the quantity of units represented by the range of numeric suffixes and update a quantity of lock units to be purchased. Advantageously, this assures the user that the application understands the user's request and desired quantity of lock units.

FIG. 7Q illustrates screen 700K after a user has entered an alphanumeric prefix of "Boat Shed", a first numeric suffix of "101", and a second numeric suffix of "104". The alphanumeric prefix of "Boat Shed" will be consistent across all lock units. However, each lock unit will have a different numeric suffix, ranging from "101" to "104" (i.e., "101", "102", "103", and "104"). In response to the user's input, the application calculates the number of integers in the range of "101" to "104" (i.e., four), and accordingly updates the quantity in pop-up frame 772B to four. Alternatively or additionally, the user may be permitted to directly input the quantity in pop-up frame 772B, and the application may automatically fill in the second numeric suffix based on the specified quantity. Pop-up frame 772B may also comprise an input for indicating that the user has finished specifying the naming scheme. Once the user selects the input, the price in region 742 may be updated to reflect any change in the quantity of units to be ordered.

FIG. 7R illustrates screen 700K after a user has finished specifying the naming scheme, according to an embodiment. As illustrated, editable area 764C has been updated to reflect the first character string in the specified naming scheme. In an embodiment, the entire editable area 764C or the numeric suffix in editable area 764C may no longer be directly editable once a naming scheme has been specified. However, in such an embodiment, an input may be provided to cancel the naming scheme, such that any restrictions on direct input into editable areas 764C are removed once the input is selected. In any case, once a user has finished editing text within an editable area 764, the user may select done input 774. In response to selection of done input 774, pop-up frame 772 may disappear, and inputs 770 may reappear (while the editable area 764 remains selected) or completion input 768 may reappear (with no editable area 764 selected). It should be understood that the user may always change the naming scheme in an editable area 764, for example, by reselecting the editable area 764, reselecting enter-text input 770A for the selected editable area 764, and modifying the naming scheme using pop-up frame 772.

FIG. 7S illustrates screen 700K after a user has selected editable area 764B (initially illustrated in FIG. 7M), selected the upload-image input 770B for editable area 764B, and selected an image (e.g., via a file manager of the user's user system 130, online account, etc.), according to an embodiment. After selection of an image, the application displays the image in the corresponding editable area (e.g., 764B in this case), and adds a pop-up frame 776 to screen 700K. Initially, the selected image may be automatically sized to fit within the boundaries of the selected editable area 764.

As illustrated, pop-up frame 776 comprises inputs for editing the selected image within the selected editable area 764. The image-editing inputs in pop-up frame 776 may implement any standard image-editing functions, such as rotating the image (e.g., clockwise and/or counterclockwise), deleting the image from the selected editable area 764, moving the image horizontally and/or vertically within the selected editable area 764, enlarging and/or reducing the size of the image within the selected editable area 764, and/or the like. In an embodiment, the graphical user interface may prevent the user from enlarging or moving the image beyond the boundaries of the selected editable region 764.

FIG. 7T illustrates a checkout summary screen 700L, according to an embodiment. Screen 700L may be displayed, for example, in response to the selection of completion input 768 and/or any other input (e.g., in screens 700F-700K) that indicates that the user has finished customizing the selected lock model. Screen 700L comprises information about the user's order, including, without limitation, line items for the type(s) of lock model (e.g., with any corresponding cost), the shackle diameter and/or length (e.g., with any corresponding cost(s)), the body width (e.g., with any corresponding cost), the color (e.g., with any corresponding cost), whether or not engraving(s) have been specified (e.g., with any corresponding cost), the quantity of keys being ordered (e.g., with any corresponding cost), and/or the like. Screen 700L may also comprise additional information, including links to additional information, such as a full specification of each ordered lock model. In addition, screen 700L may comprise a total price of the ordered lock unit(s), an input for completing the checkout process (e.g., a link to a screen or pop-up overlay for entering payment and/or shipping information) and/or continuing to shop (e.g., selecting additional lock models and customization options, defining a keying tree, etc.), and/or the like.

Figure 8A:
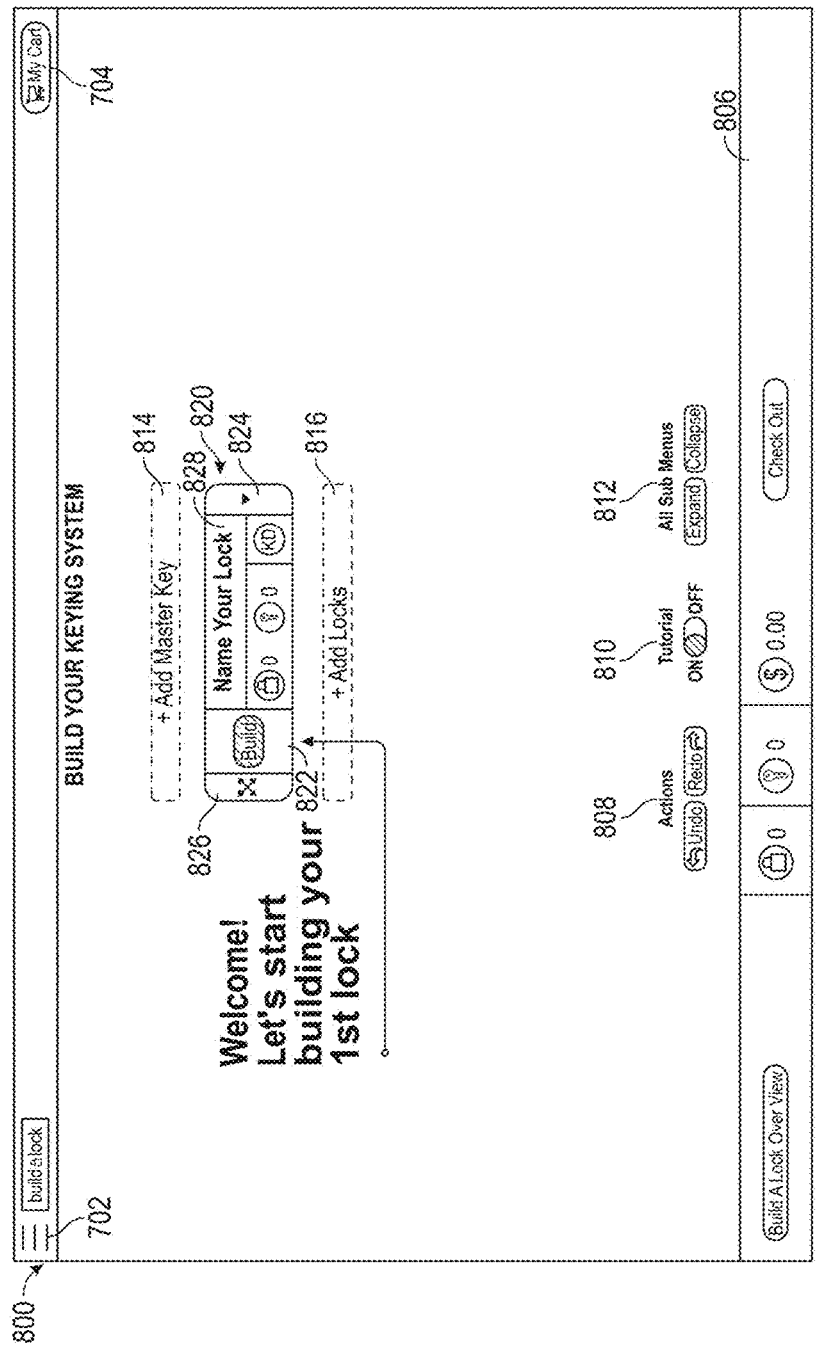
FIGS. 8A-8V illustrate an implementation of graphical user interfaces for an online ordering process for a hierarchy of locks, according to an embodiment.
Figure 8B:
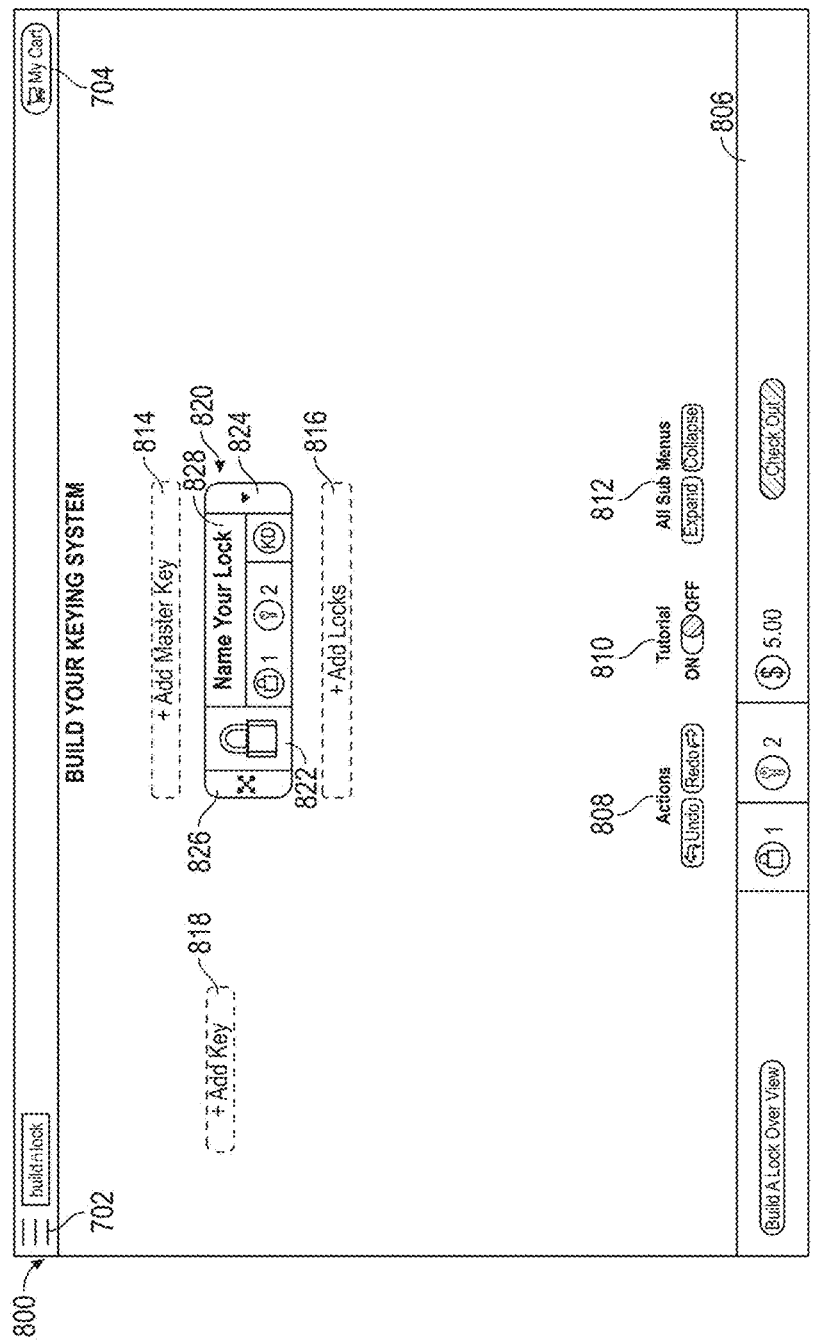
Figure 8C:
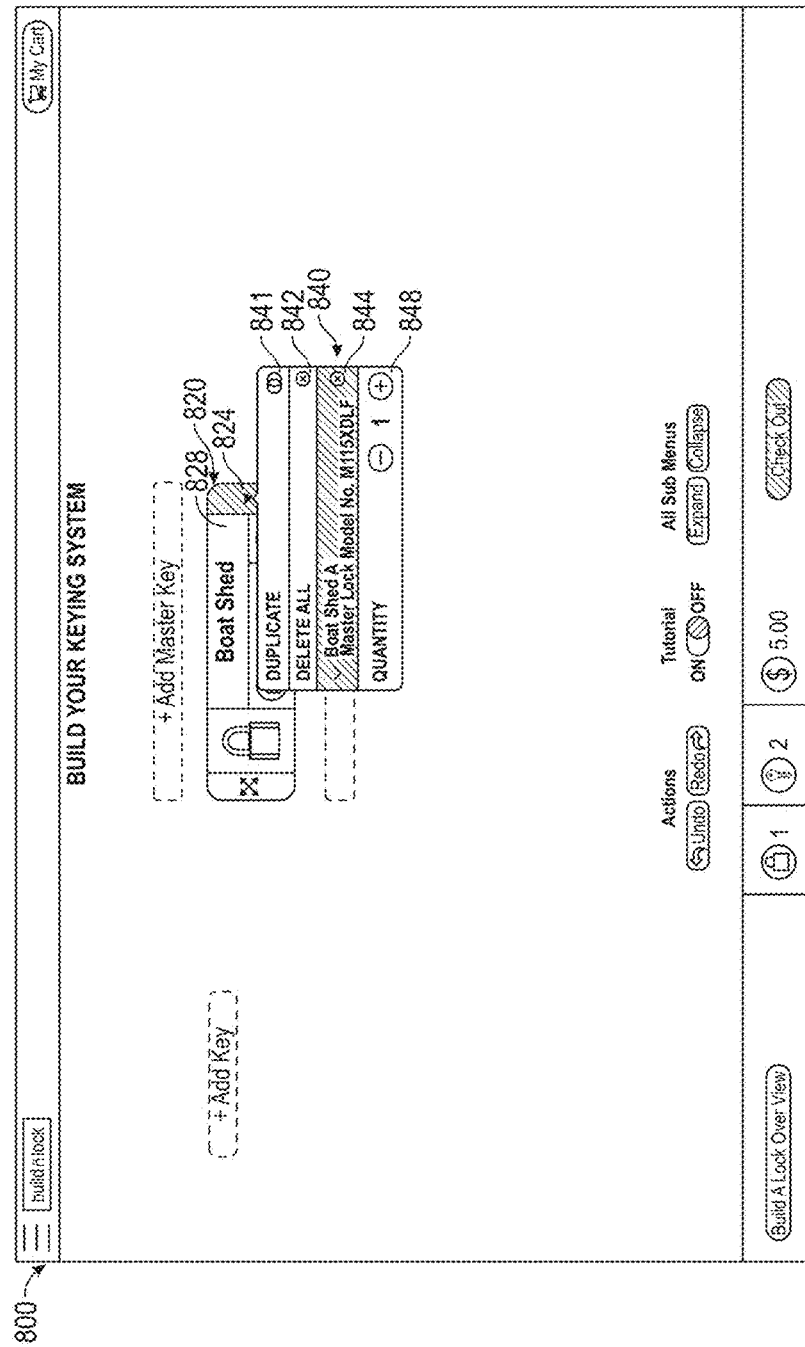
Figure 8D:
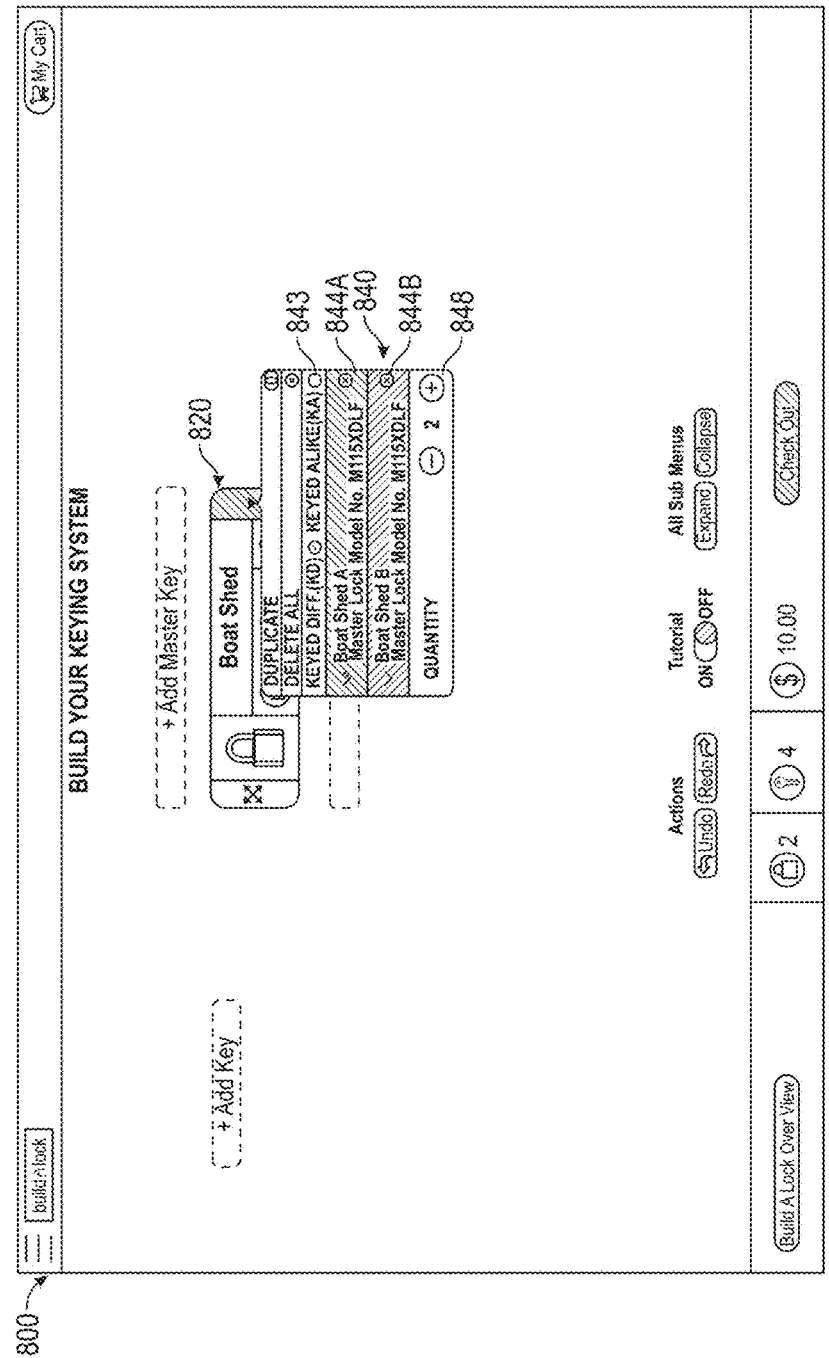
Figure 8E:
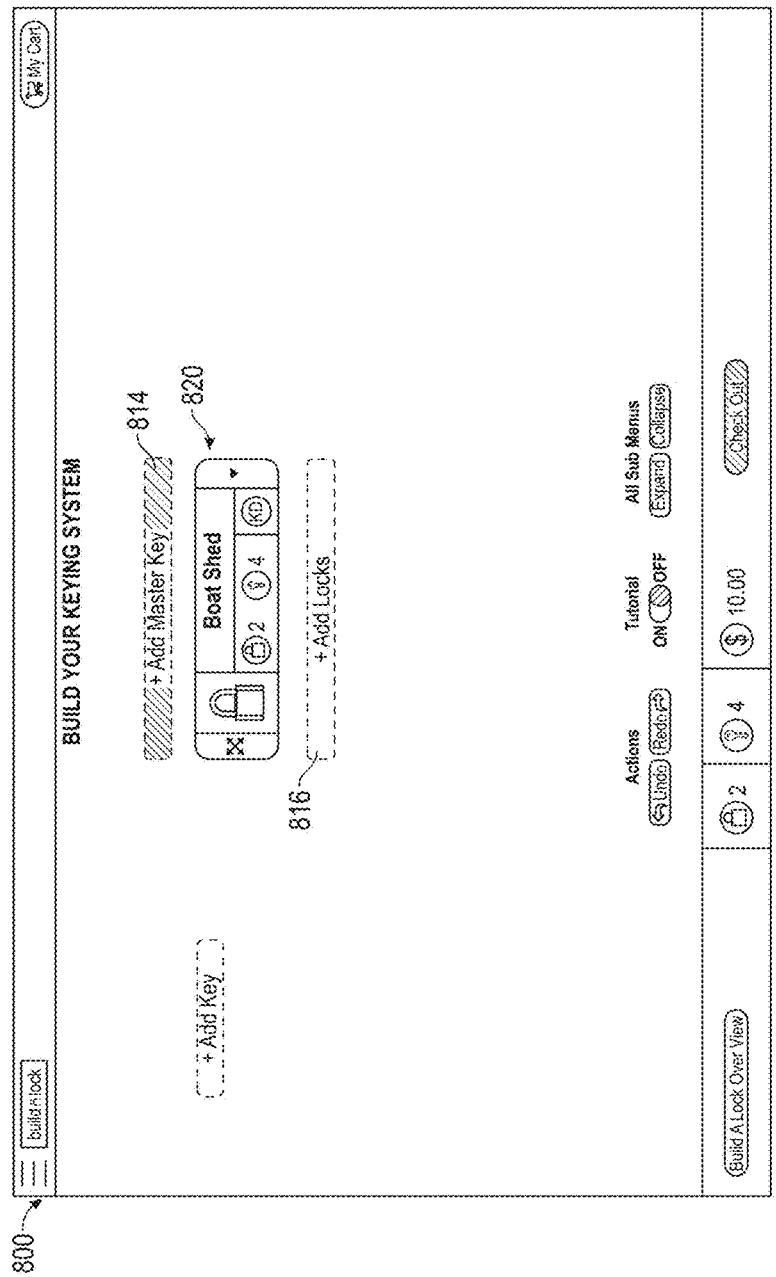
Figure 8F:
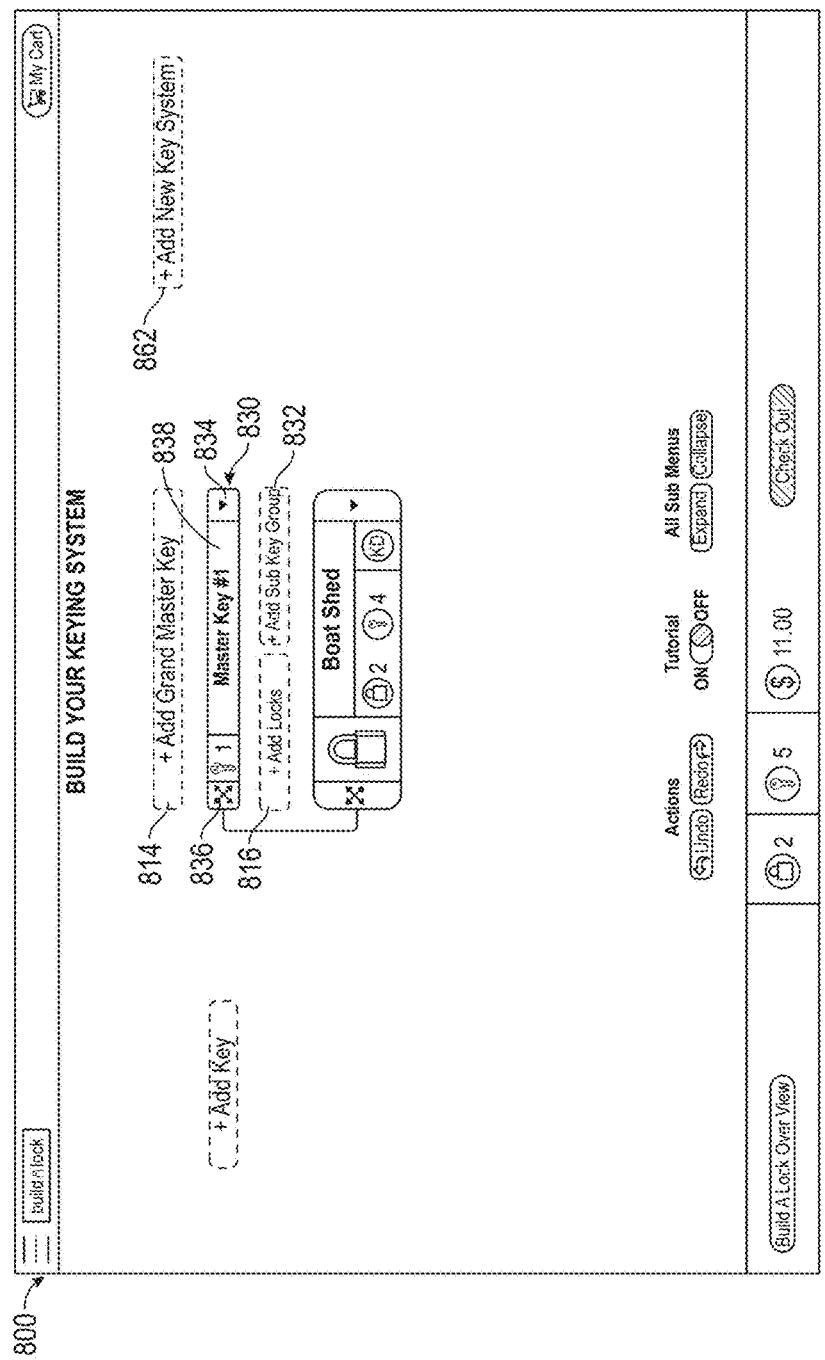
Figure 8G:
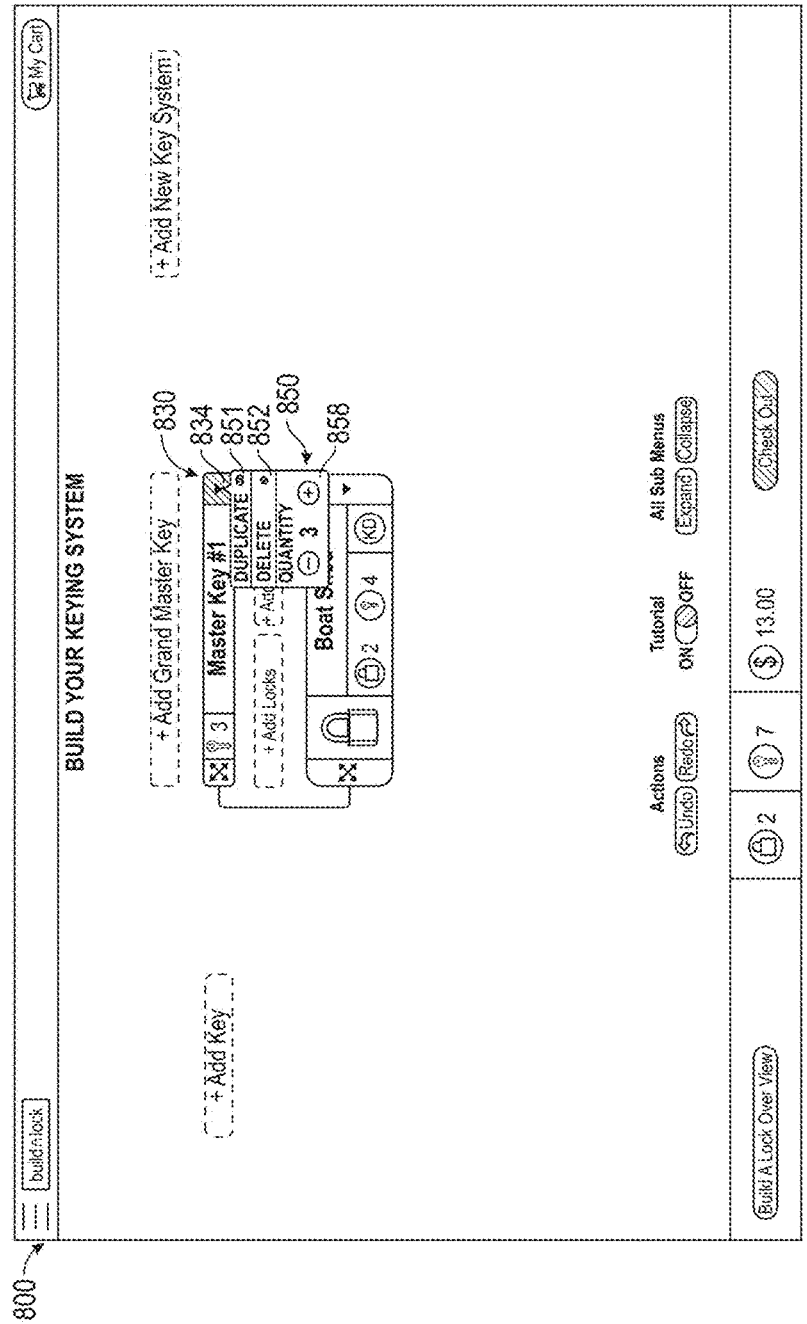
Figure 8H:
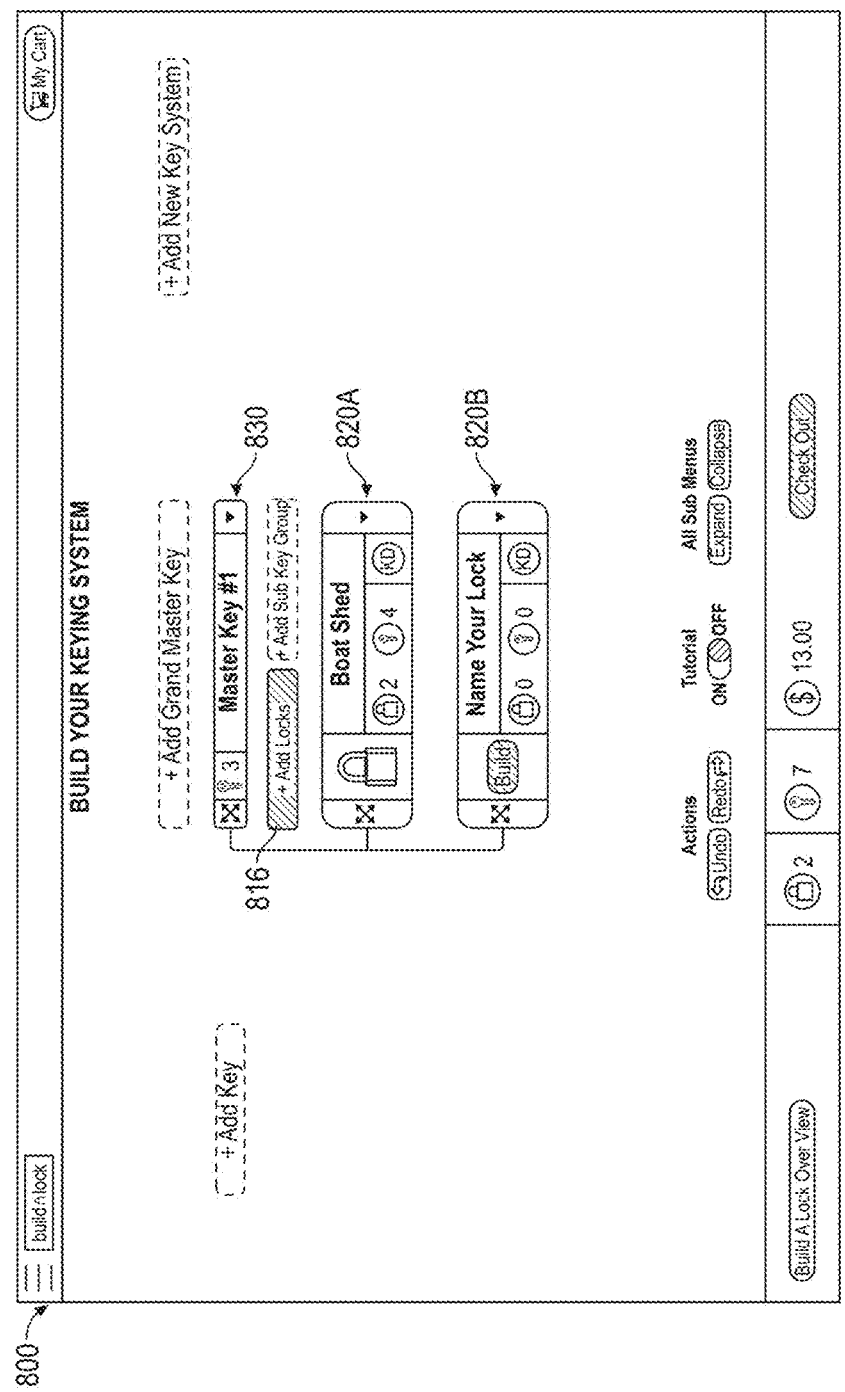
Figure 8I:
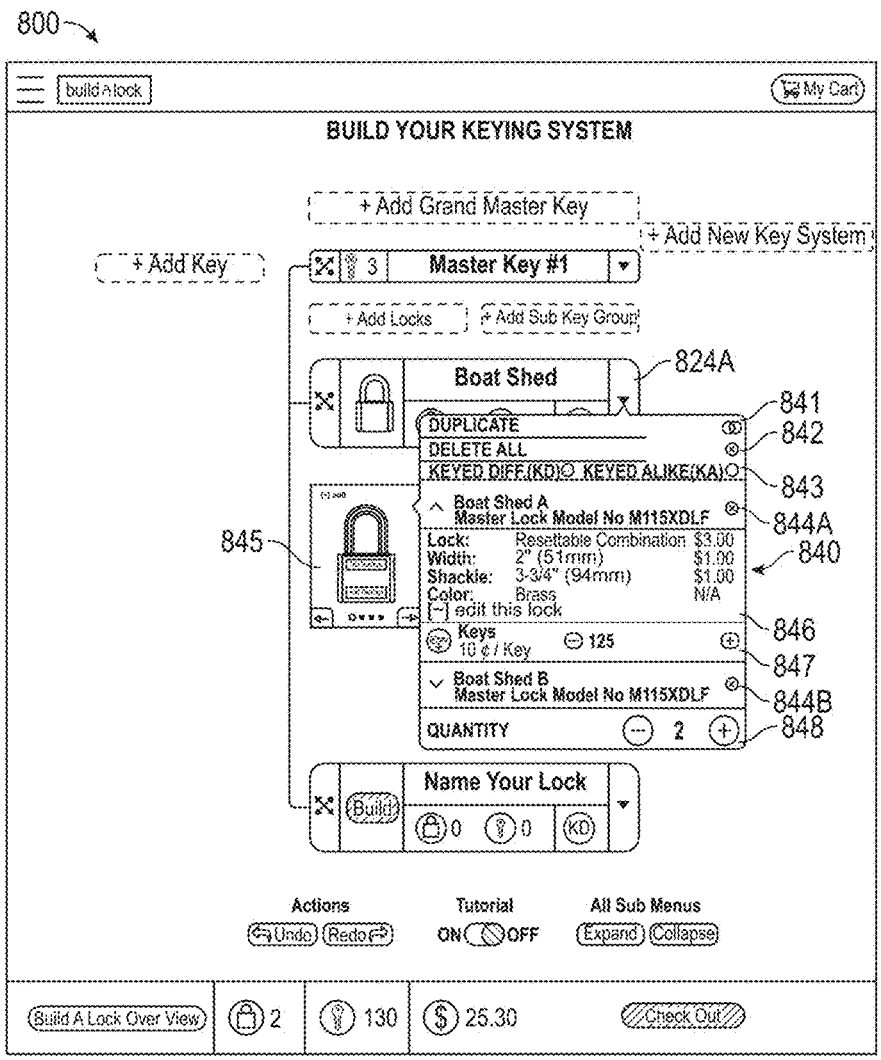
Figure 8J:
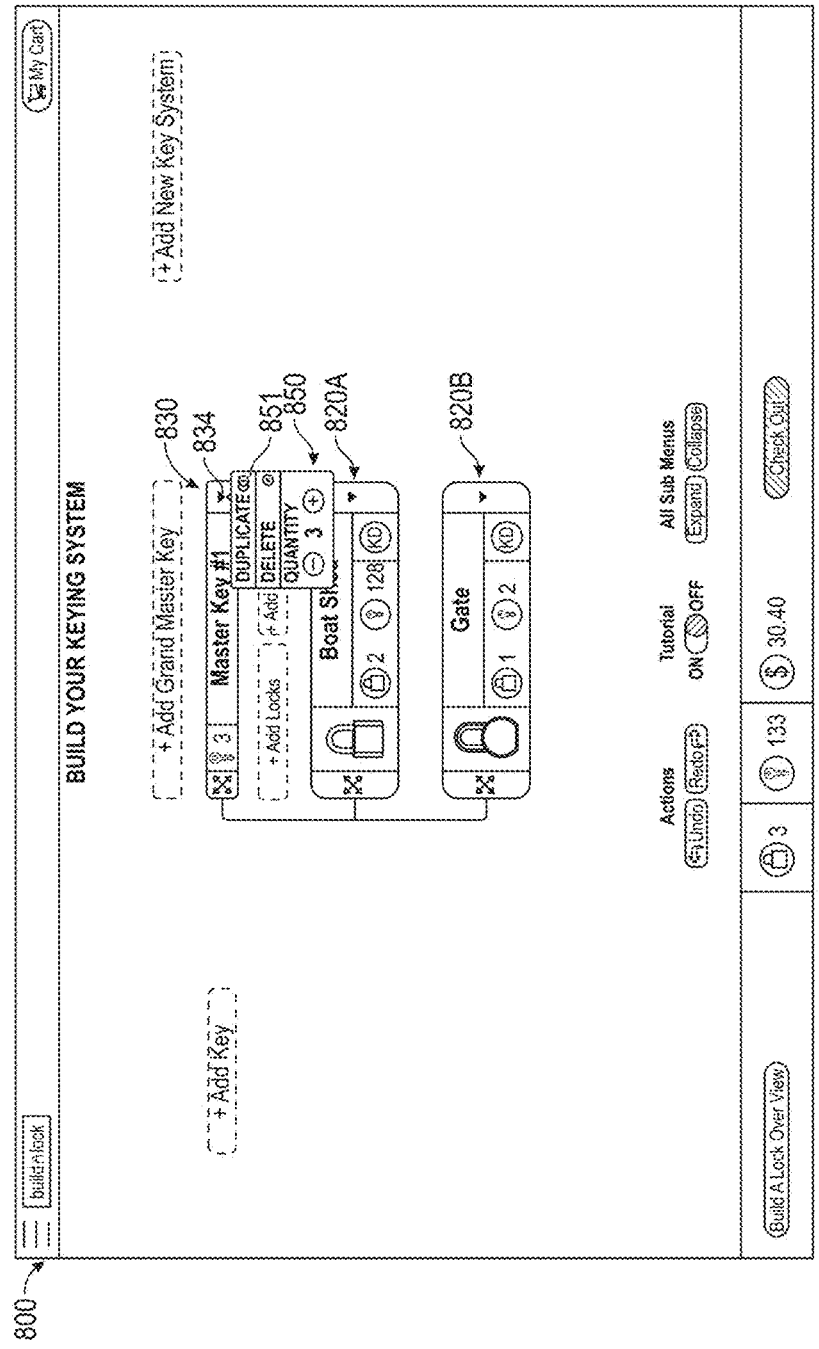
Figure 8K:
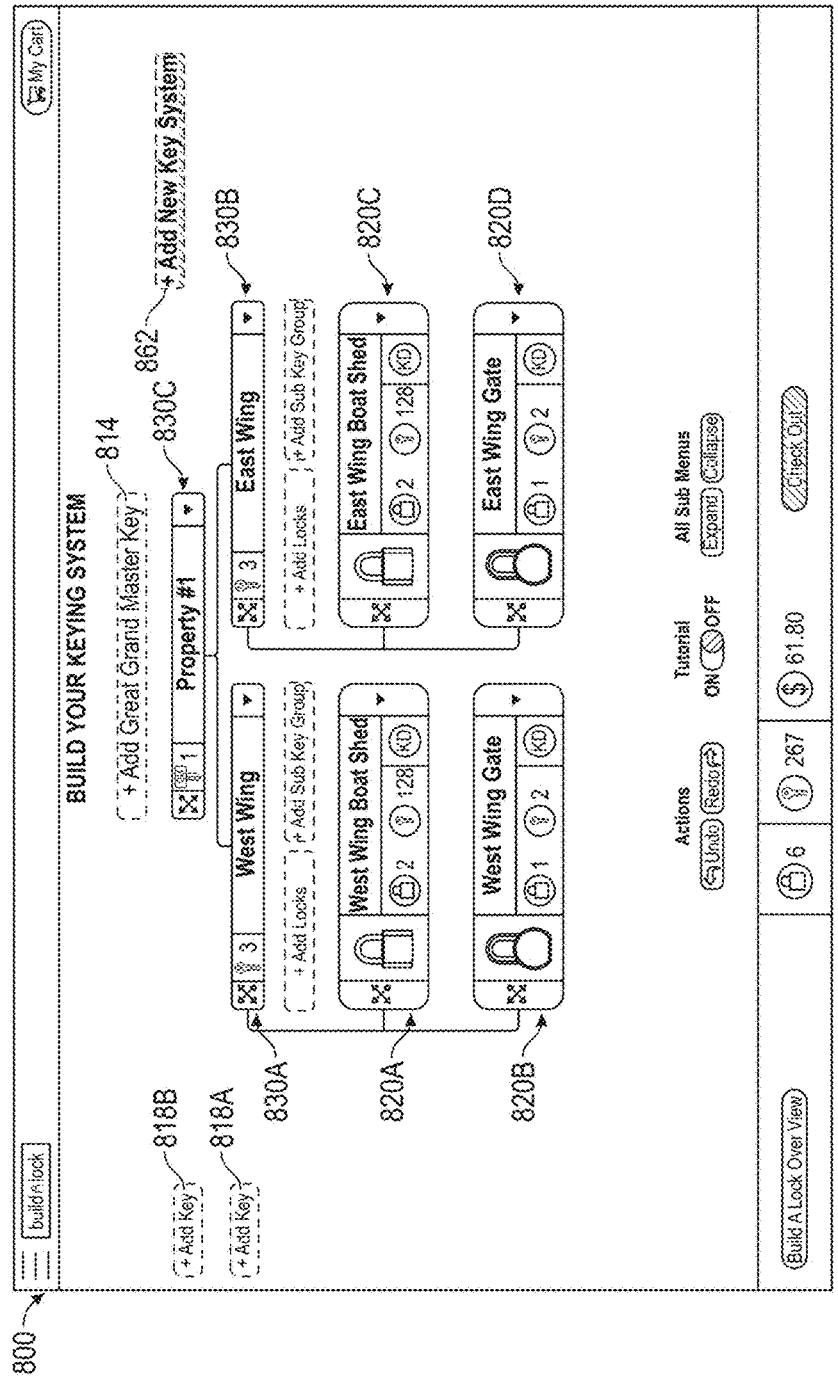
Figure 8L:
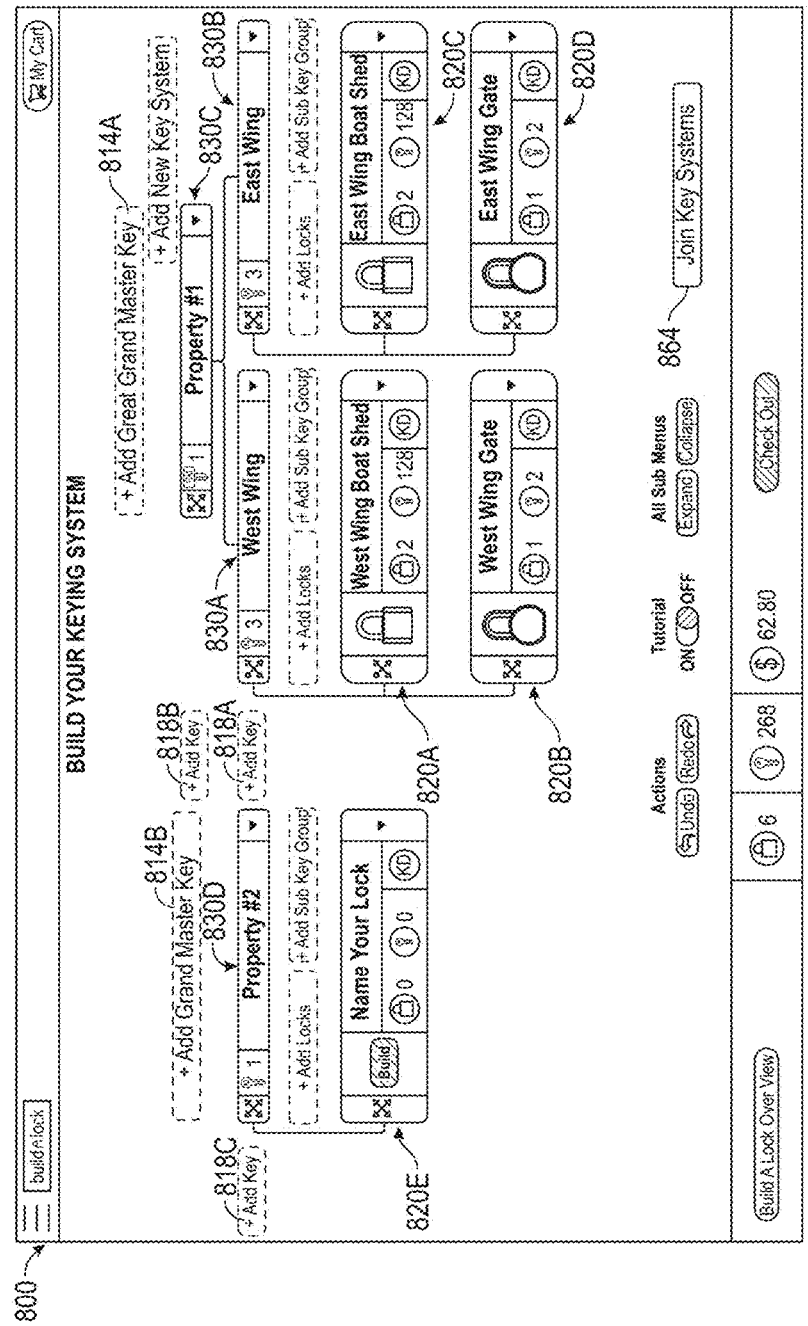
Figure 8M:
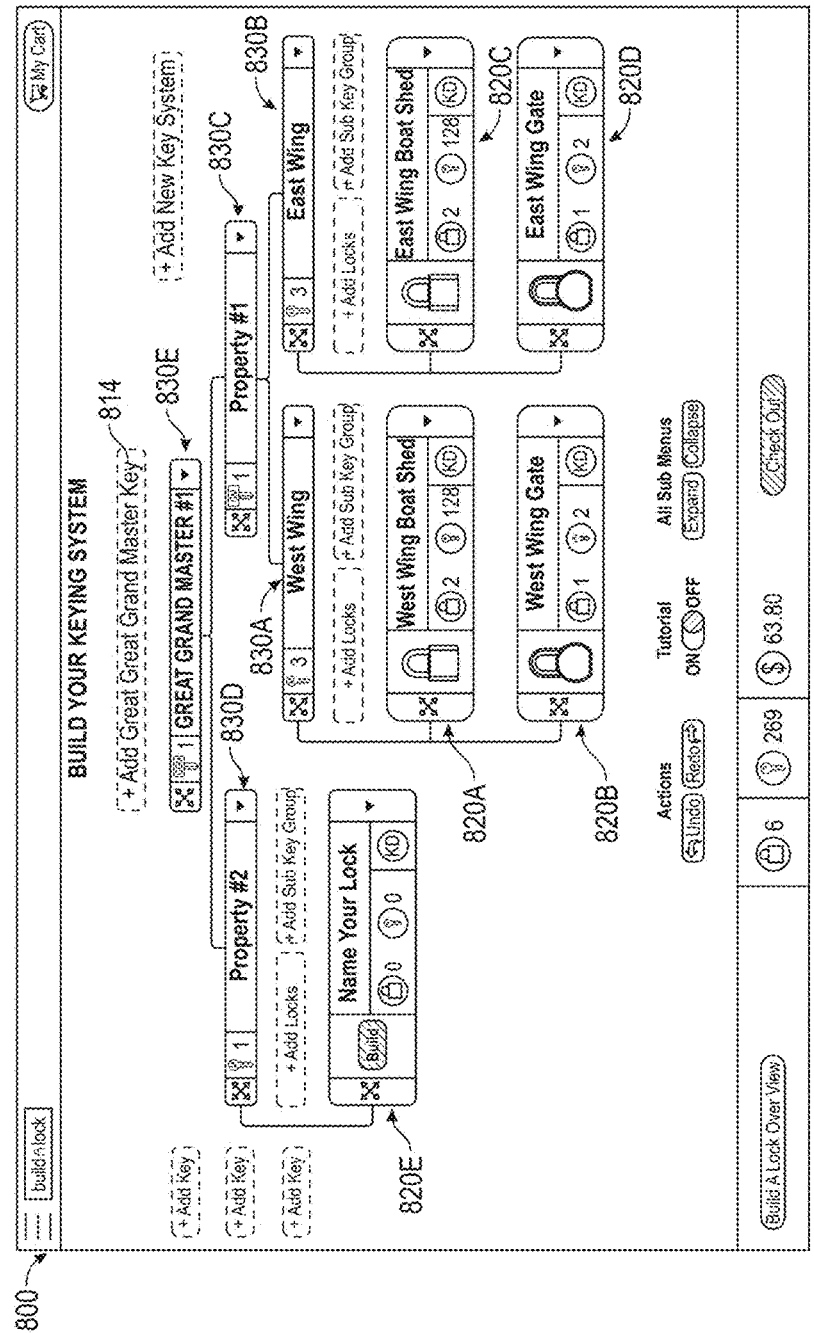
Figure 8N:
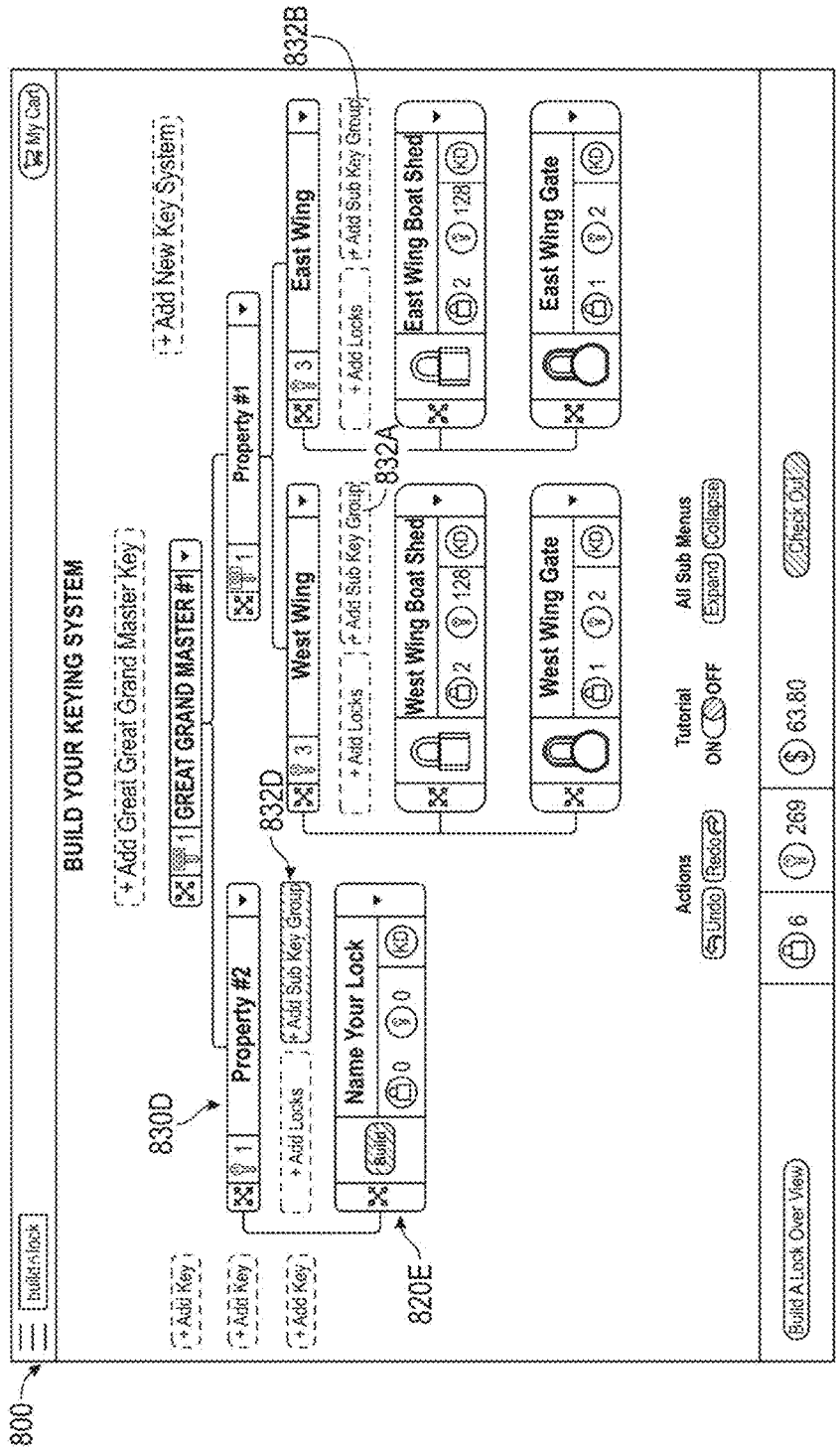
Figure 80:
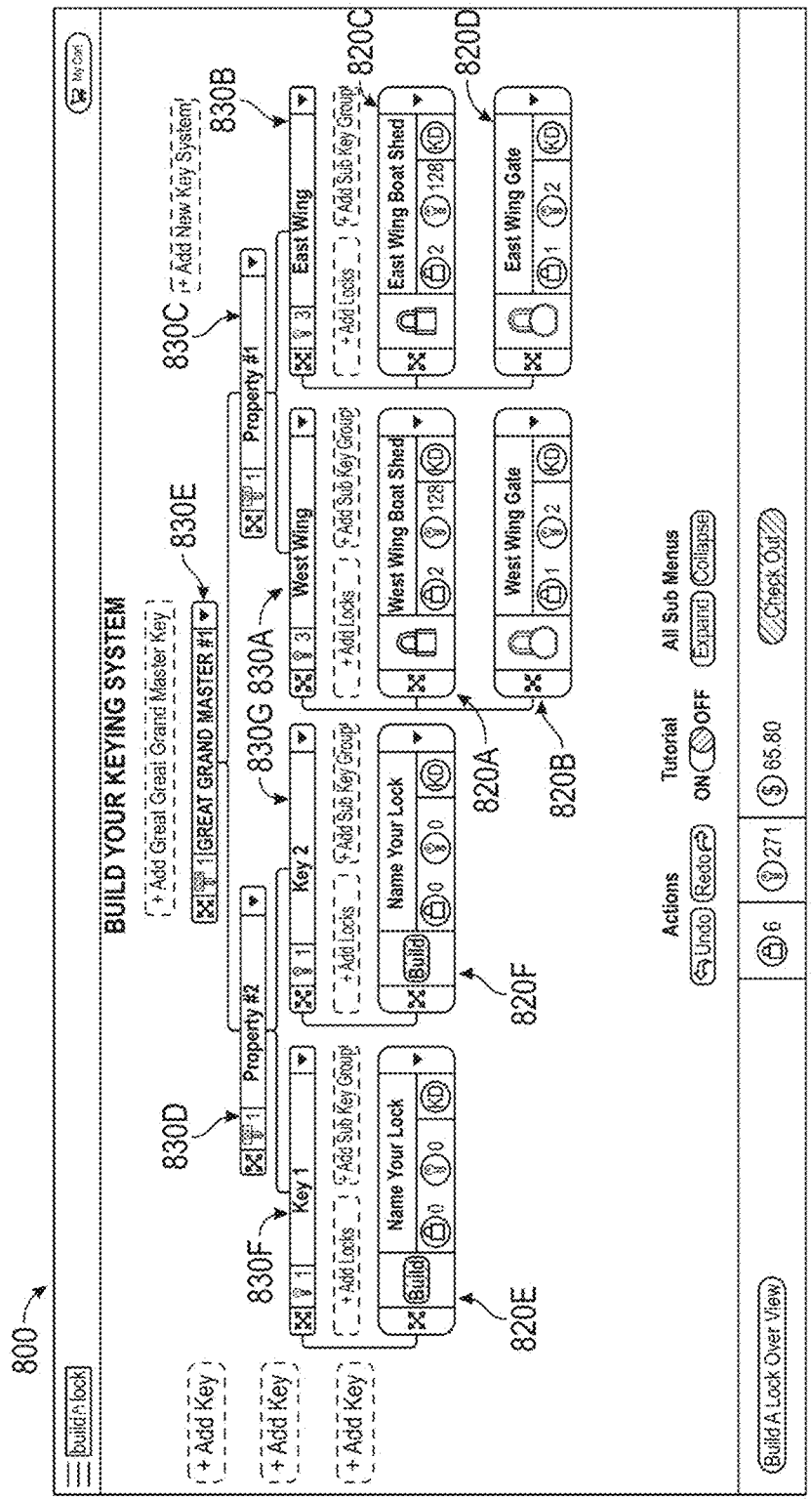
Figure 8P:
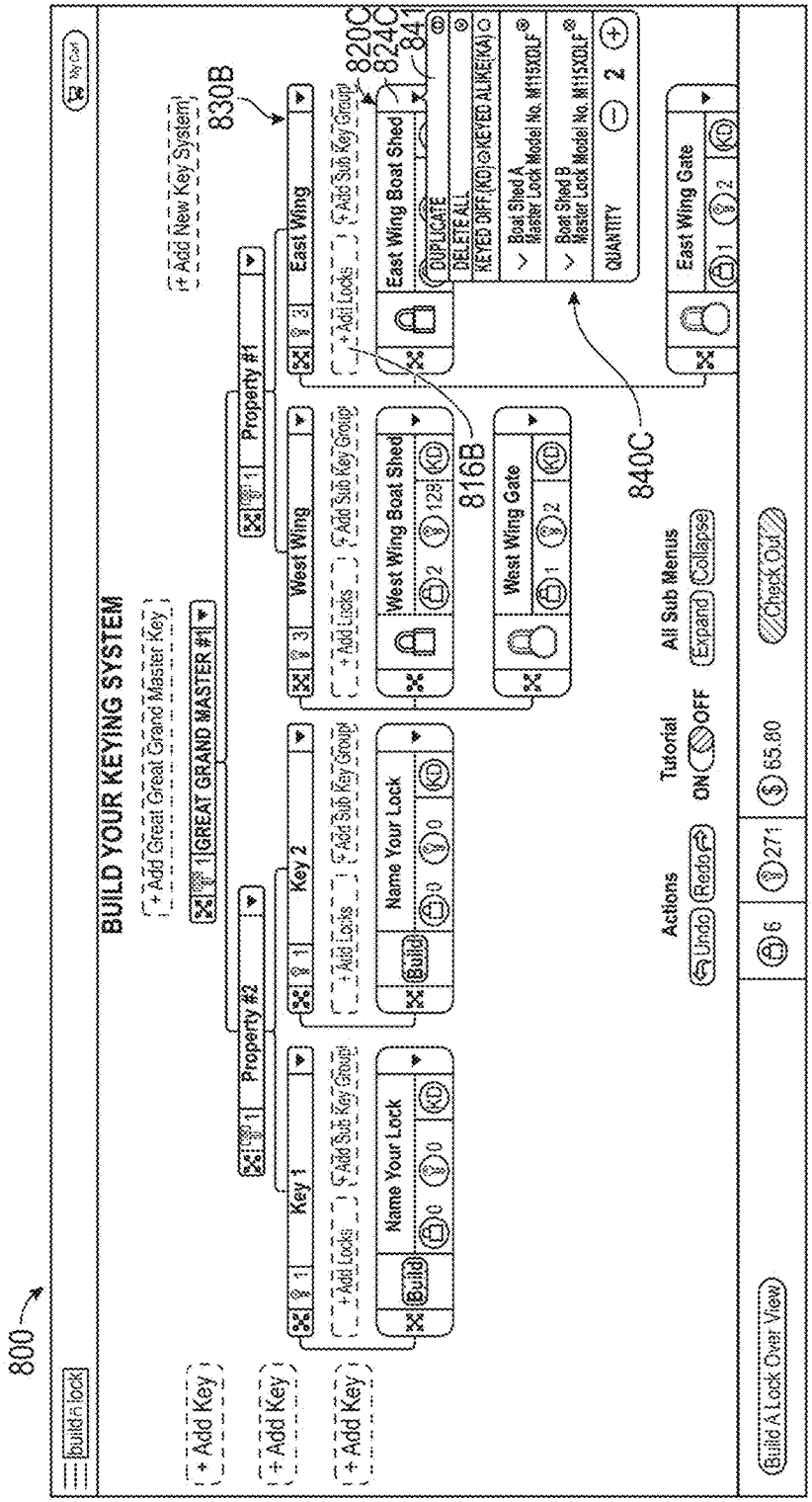
Figure 8Q:
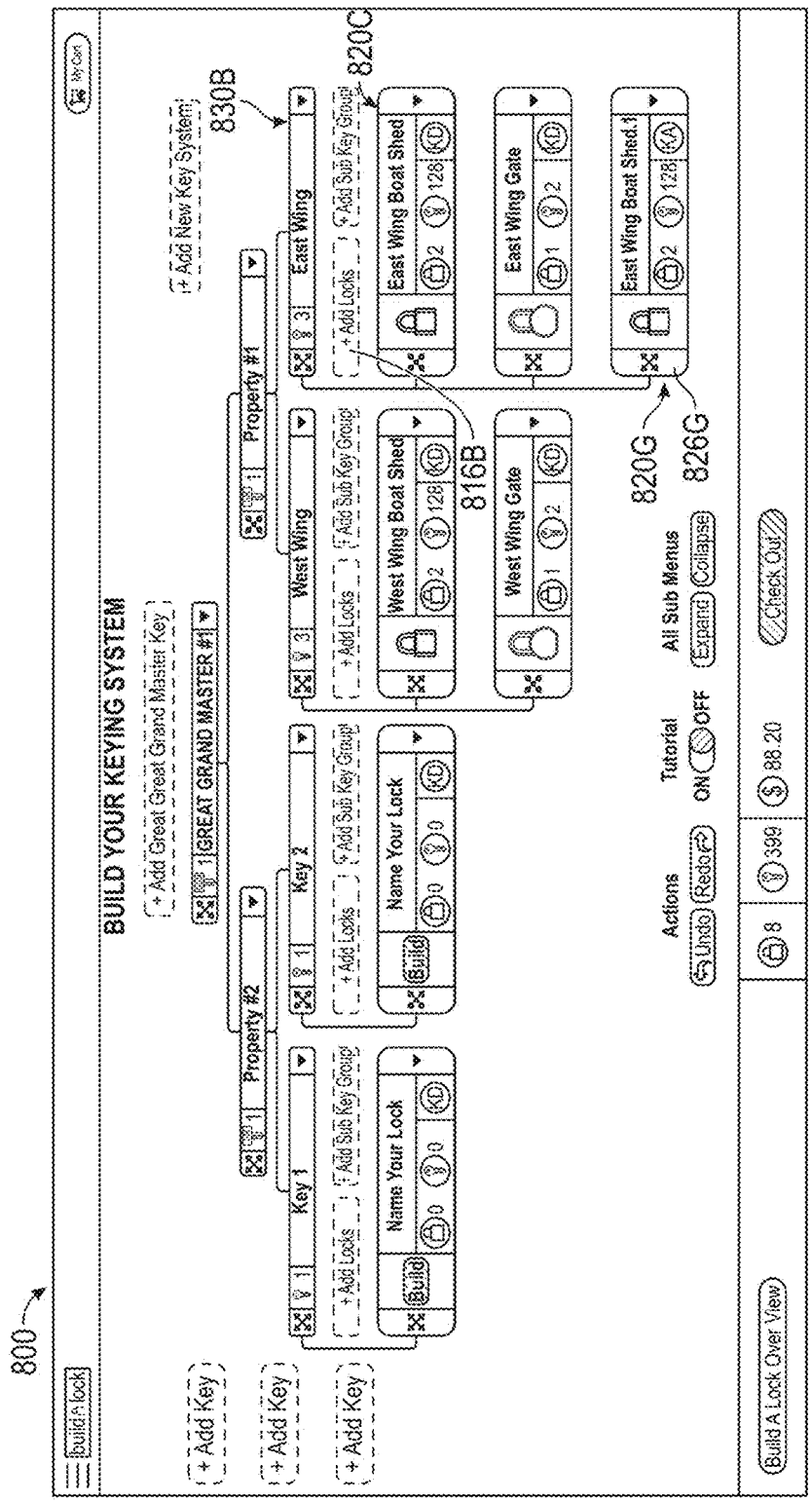
Figure 8R:
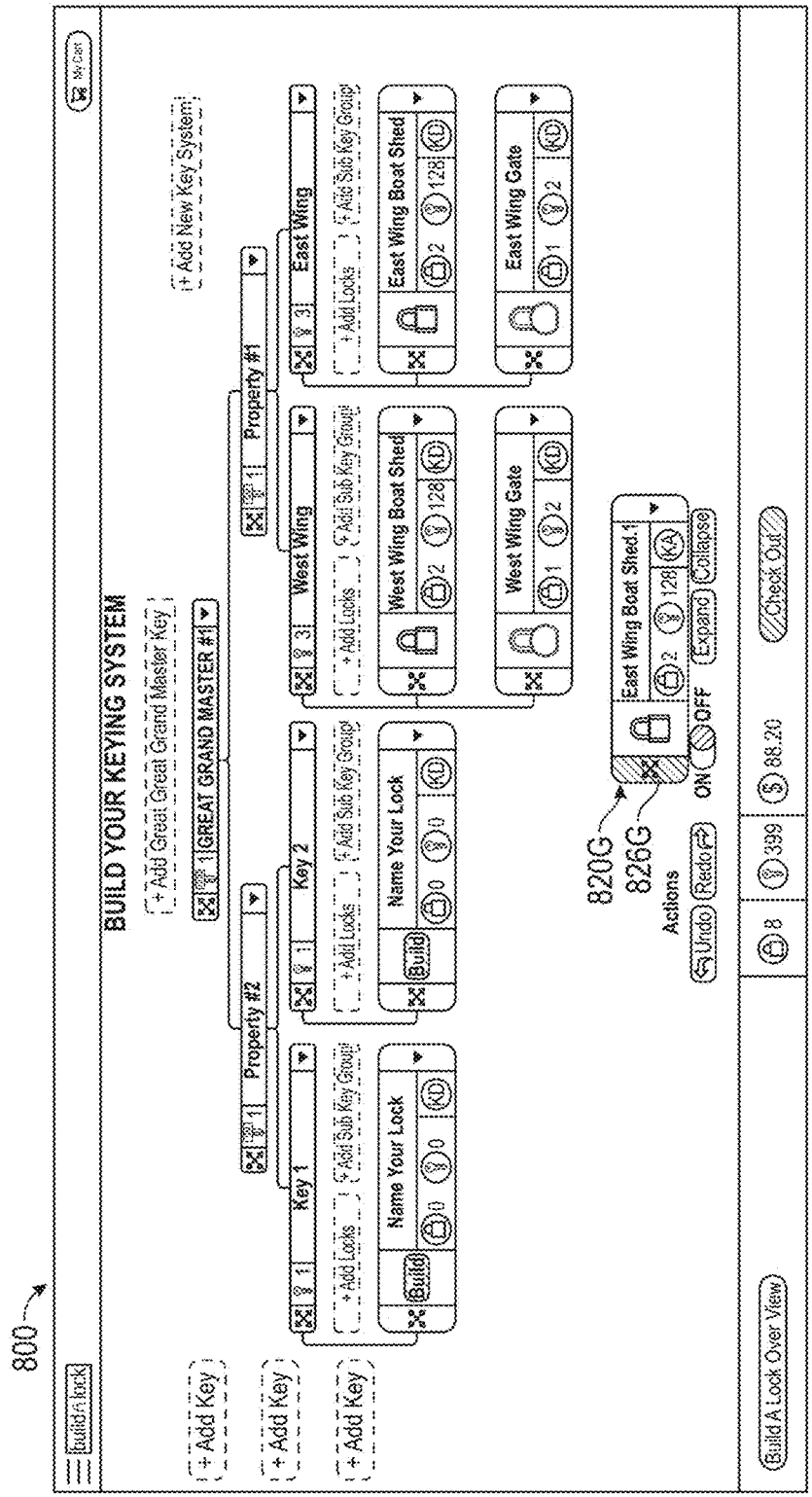
Figure 8S:
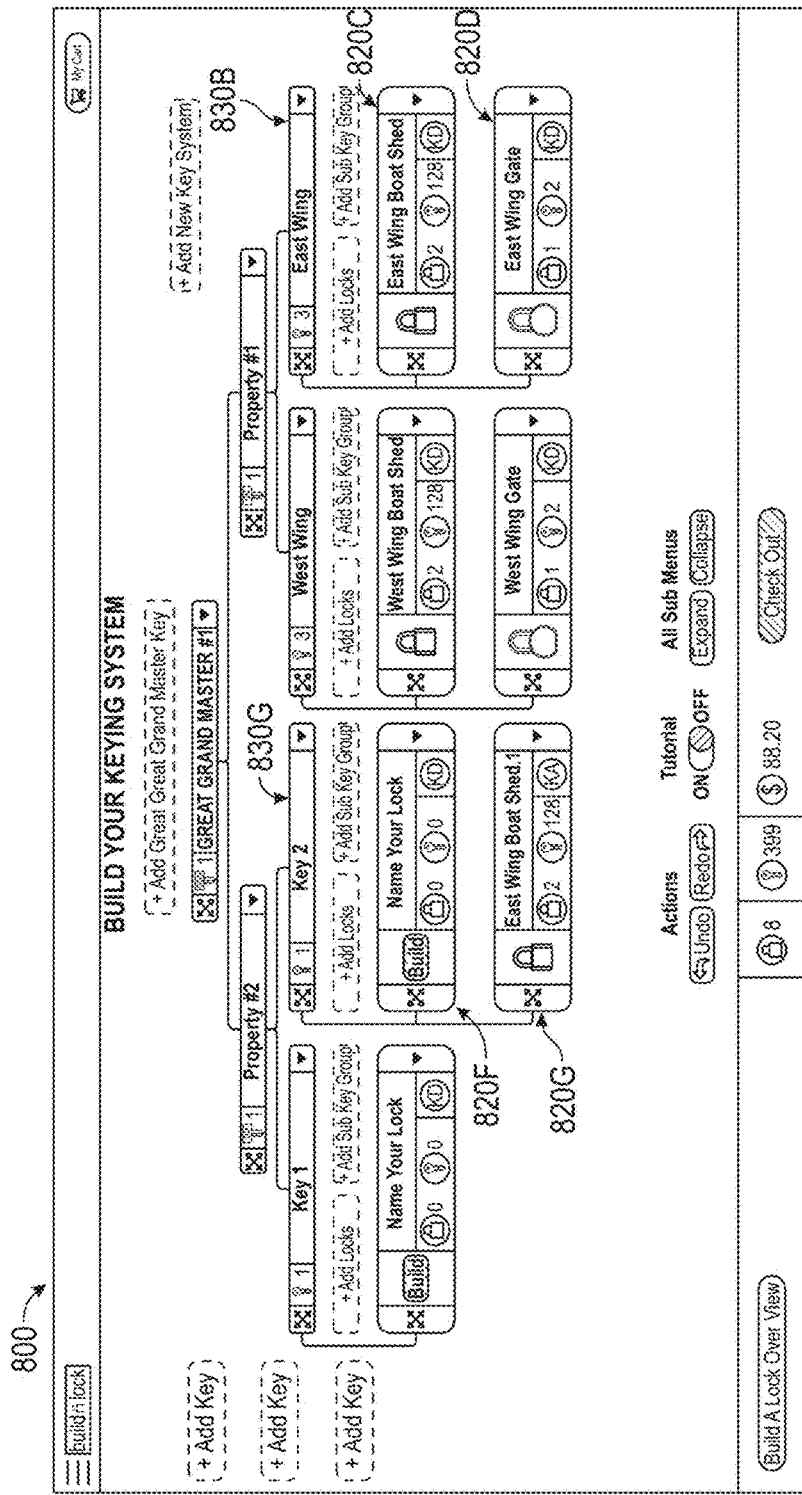
Figure 8T:
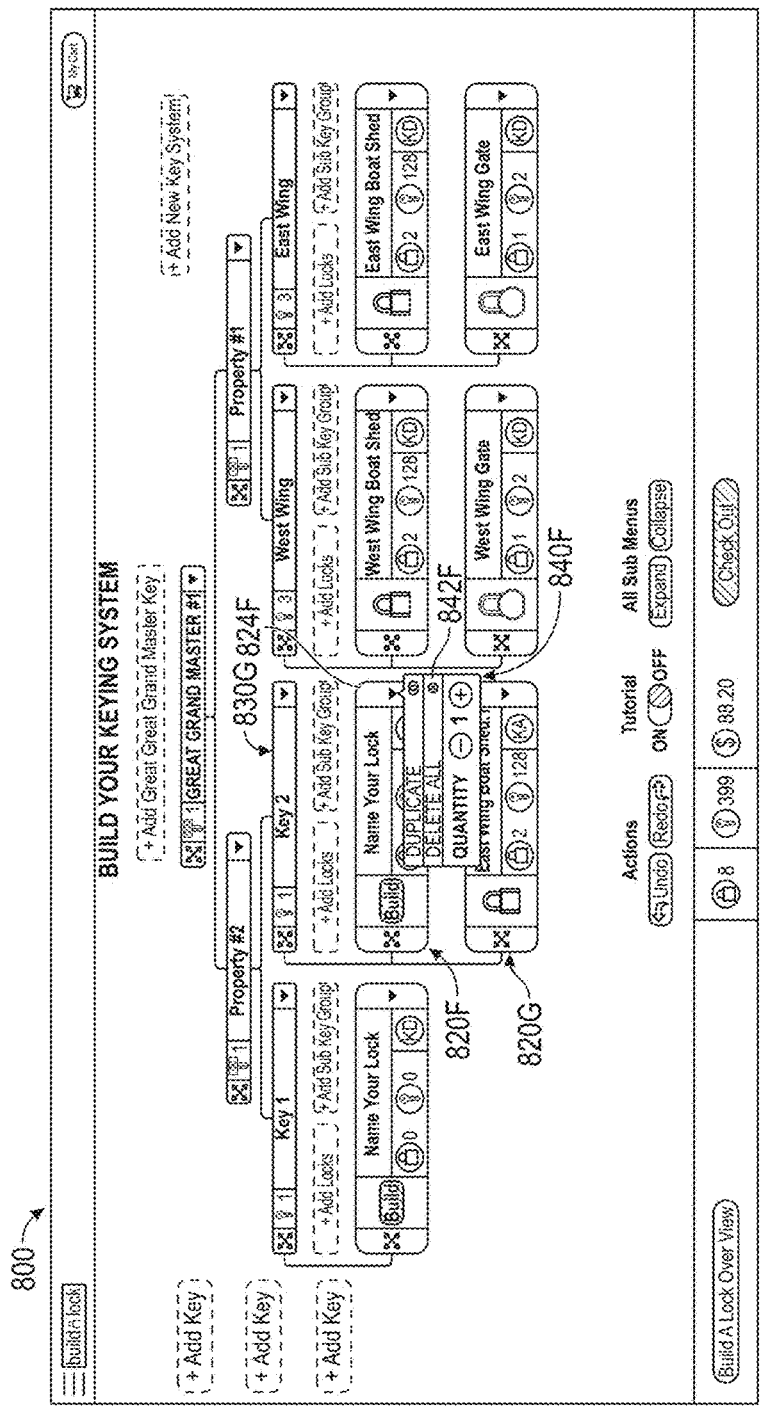
Figure 8U:
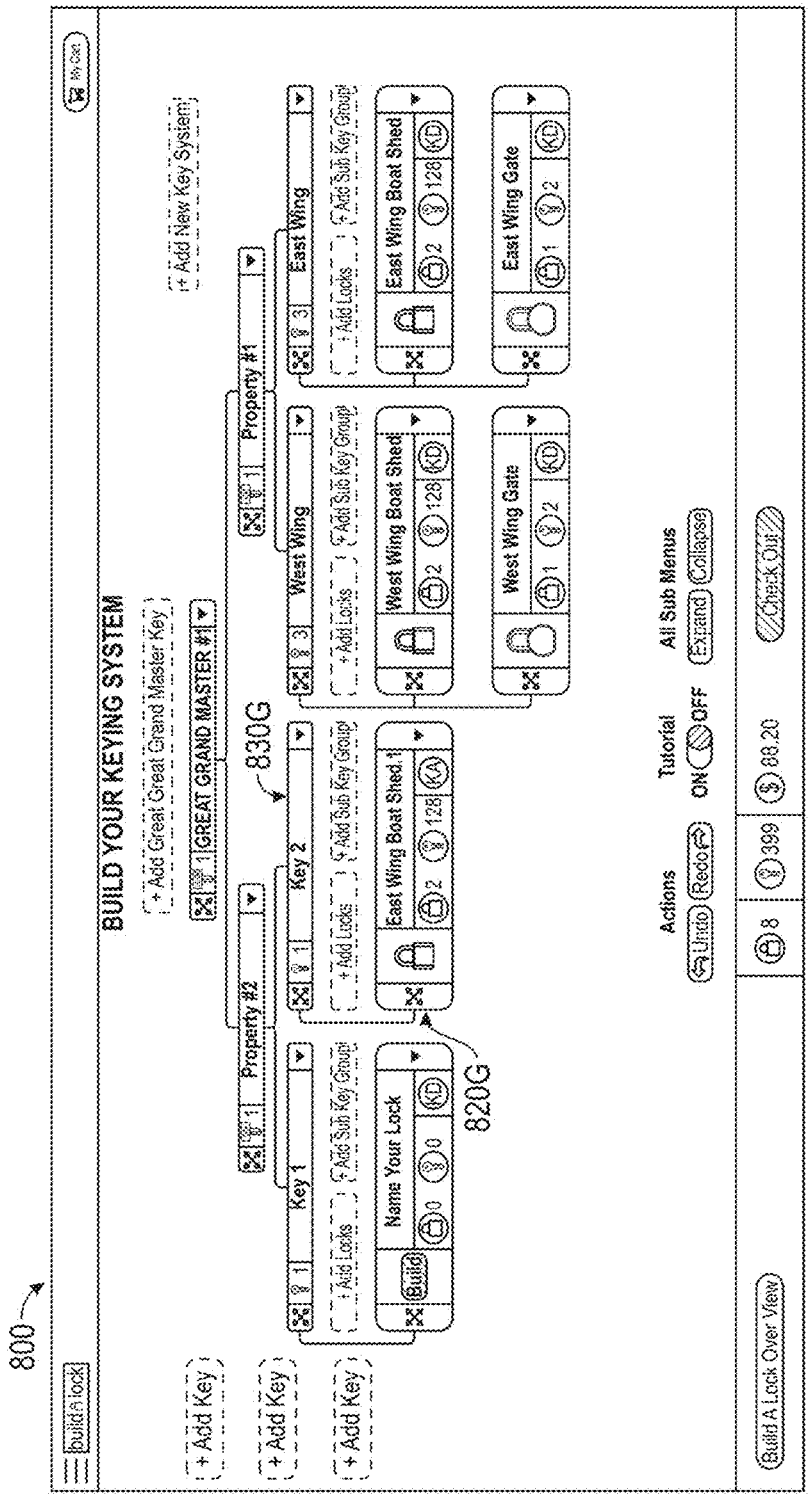
Figure 8V:
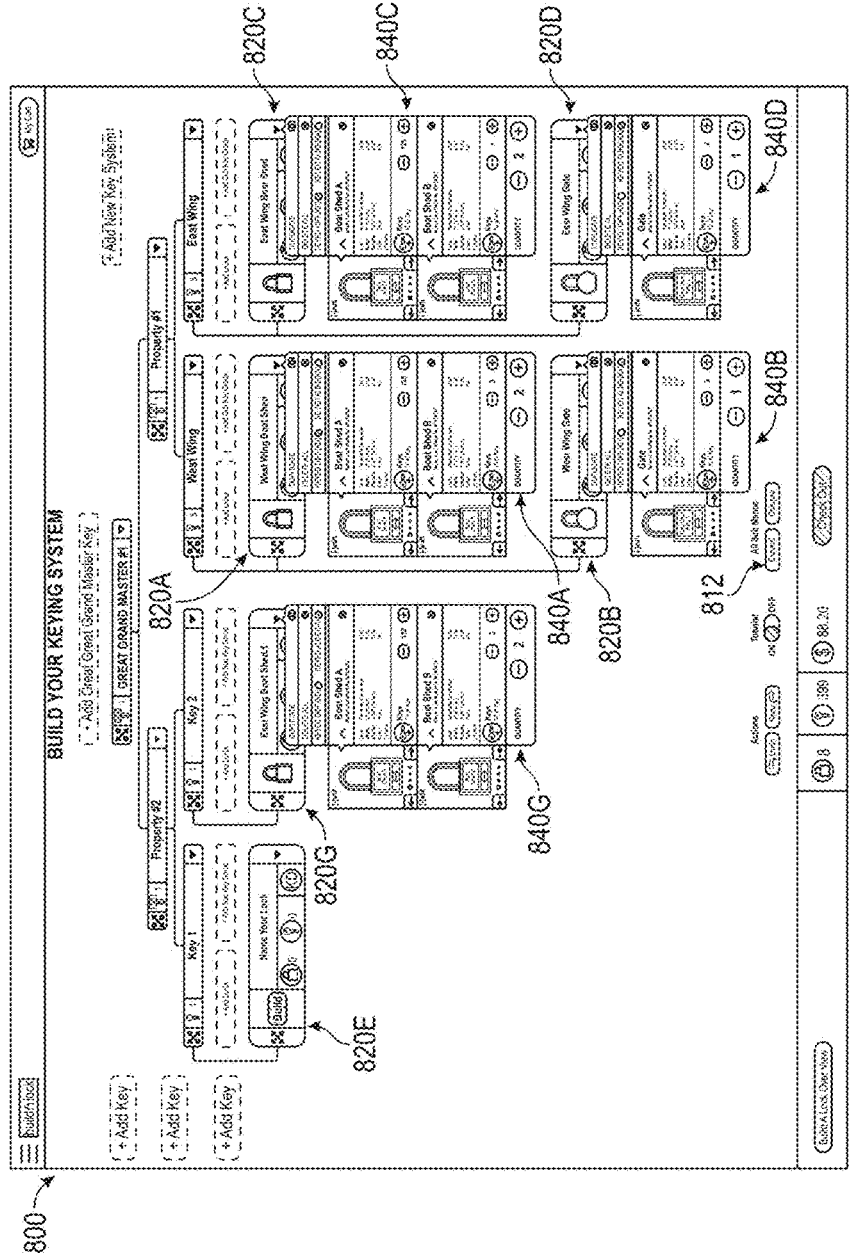

FIGS. 8A-8V illustrate an example embodiment of a key-tree screen 800 of the graphical user interface of the application, which implements the keying tree described elsewhere herein (e.g., with respect to FIG. 6). However, while illustrated with a certain arrangement of graphical elements, screen 800 may be implemented with more, fewer, or a different arrangement of graphical elements than those illustrated. As discussed elsewhere herein, screen 800 may be implemented as a single page that is updated in real time without page transitions. Alternatively, screen 800 could be implemented as multiple pages with page transitions in response to user interactions.

In an embodiment, screen 800 comprises a set of graphical elements that are maintained within screen 800 regardless of the users' actions within screen 800. For example, in the illustrated embodiment, screen 800 comprises a menu input 702, a cart input 704, a checkout panel 806, one or more action input(s) 808, a tutorial input 810, submenus input(s) 812, an add-root-key input 814, add-lock input(s) 816, and add-key input(s) 818.

In an embodiment, checkout panel comprises a summary of the keying tree, currently represented in screen 800, an input for checking out (i.e., completing a purchase transaction for the key system represented in the keying tree and/or the user's online shopping cart), an input for viewing tutorial tips and/or additional information for how to use screen 800 (e.g., a pop-up overlay that highlights the overarching capabilities and jargon of screen 800), and/or the like. The summary of the keying tree may comprise a total number of locks represented in the keying tree, a total number of keys represented in the keying tree, a price of the locks and keys represented in the keying tree, and/or the like.

In an embodiment, action input(s) 808 comprise an undo input for undoing the immediately preceding user action, and a redo input for redoing a user action that was undone in an immediately preceding user action. For example, if a user accidentally deletes a lock or key or group of locks or keys, represented in the keying tree, the user may select the undo input, and the application may responsively undo the deletion and update screen 800 to re-include the deleted content. Similarly, the user may select the redo input to redo a user action that was previously undone.

In an embodiment, tutorial input 810 comprises a toggle icon that, when selected by the user, toggles a tutorial on and off. For example, in response to the user's selection of tutorial input 810, while the tutorial is off, the application may toggle the tutorial on. Similarly, in response to the user's selection of tutorial input 810, while the tutorial is on, the application may toggle the tutorial off. When the tutorial is on, the tutorial may guide the user through the process of building a keying tree using appropriately placed arrows and/or pop-up text (e.g., text in a blue or other highly distinctive font) to highlight, describe, and/or guide the user (e.g., step-by-step) through features and functions of screen 800. In an embodiment, the application may automatically toggle the tutorial off (and update tutorial input 810 to reflect the change) in response to a trigger (e.g., indicating that the user is confident in using the graphical user interface), such as the user completing his or her first lock or key system.

In an embodiment, submenus input(s) 812 comprise an expand input for expanding all sub-menus in screen 800 (e.g., all submenus for each lock representation and/or key representation), and a collapse input for collapsing all sub-menus in screen 800. Alternatively, submenu input 812 may consist of a single input for toggling between the expanded and collapsed states. In either case, the user may expand and collapse all sub-menus using a single input (e.g., a single click or touch). This saves the user from having to expand and collapse each sub-menu individually, which may be very inefficient in the context of a large keying tree.

In an embodiment, add-root-key input 814 comprises an icon for adding a new key to the root of the keying tree. For example, in response to the user's selection of add-root-key input 814, the application may add a representation of a key as the root node at the top of the hierarchy of the keying tree (e.g., with an edge to each represented child node). In other words, add-root-key input 814 enables a user to vertically extend the keying tree upward (e.g., by adding a new root node). An embodiment of a key representation will be described elsewhere herein with respect to key representation 830.

In an embodiment, each add-lock input 816 comprises an icon for adding a new lock to the keying tree. For example, in response to the user's selection of add-lock input 816, the application may add a representation of a lock within the hierarchy of the keying tree (e.g., with an edge to any represented parent node). An embodiment of a lock representation will be described elsewhere herein with respect to lock representation 820.

In an embodiment, each add-key input 818 comprises an icon for adding a new key to an associated level of the keying tree. For example, an add-key input 818 may be associated with each level of the keying tree. In response to the user's selection of an add-key input 818 associated with a particular level of the keying tree, the application may add a representation of a key at that level in the hierarchy of the keying tree. In other words, add-key input 818 enables a user to horizontally extend the keying tree (e.g., by adding a sibling node). An embodiment of a key representation will be described elsewhere herein with respect to key representation 830. Although not shown, each add-key input 818 may be labeled according to the level with which it is associated. For example, the add-key input 818 for the first (i.e., lowest) level may be labeled "+ Add Master Key", the add-key input 818 for the second level may be labeled "+ Add Grand Master Key", the add-key input 818 for the third level may be labeled "+ Add Great Grand Master Key", and so on and so forth.

FIG. 8A illustrates screen 800 with one lock representation 820 in the keying tree and the tutorial toggled on (e.g., by default or via tutorial input 810), according to an embodiment. Lock representation 820 comprises a build input 822 for building the represented lock (e.g., selecting and customizing a lock model, for example, using one or more screens illustrated in FIGS. 7A-7S), a menu input 824 for viewing an expandable and collapsible menu of options and/or information about the represented lock, a move input 826 for moving (e.g., dragging and dropping) lock representation 820 within the hierarchy of the keying tree, and a name input 828 for specifying a name for the represented lock (e.g., enabling the user to tailor the key system(s) to their particular usage(s) using a custom naming scheme). Lock representation 820 may also comprise information about the represented lock, such as the quantity of units of the represented lock to be ordered, the number of keys to be ordered for the units of the represented lock, and whether the units of the represented lock will be keyed the same or differently (e.g., if more than one unit of the represented lock is to be ordered).

As shown in FIG. 8A, initially the tutorial uses text and an arrow, pointing to build input 822, to prompt the user to begin building the lock, represented by lock representation 820, by selecting build input 822. In response to the user selecting build input 822, the application may display a screen or pop-up overlay of the graphical user interface for selecting and customizing a lock (e.g., a pop-up overlay of one or more, including all, of screens 700C-700K in FIG. 7C-7S, or variations thereof). Once the user has selected a lock model and any customization options, the application may return the user to key-tree screen 800.

FIG. 8B illustrates screen 800 after the user has selected and customized a lock using build input 822 and has toggled the tutorial off, according to an embodiment. In this case, the application has changed the default "build" icon in build input 822 to an image of the customized lock. The image may be a composite image that has been generated, for example, by overlaying a base image of a lock with images of user-selected options. Example implementations for generating a composite image are described in the related patent applications which have been previously incorporated herein by reference. In an embodiment, the image may continue to act as build input 822, such that, if a user selects the image, the application may responsively display a screen or pop-up overlay for changing the model selection and/or customization options of the represented lock. In addition to the change in build input 822, the application may automatically update other information within or related to the particular lock representation 820, such as the quantity of locks and/or keys, the keying scheme, the addition of the first add-key input 818 (or alternatively add-key input 818 may always be present, even if no lock has been built yet), the information in checkout panel 806 (e.g., updating the quantity of locks and keys, the price, making the checkout input selectable and/or highlighted from an unselectable and/or grayed-out state), and/or the like.

FIG. 8C illustrates screen 800 after the user has changed the name of the lock, represented by lock representation 820, in name input 828, and expanded menu 840 using menu input 824, according to an embodiment. Menu 840 comprises a duplication input 841 for duplicating the associated lock representation 820, a delete input 842 for deleting the associated lock representation 820, quantity input(s) 848 for specifying the quantity of represented locks to be purchased (e.g., using inputs for decrementing and incrementing the quantity and/or a textbox for entering an integer quantity directly), and a list of lock entries 844 that each represent one unit within the specified quantity of the represented lock. In the illustrated example, since the specified unit quantity is one, only one lock entry 844 is shown. Notably, each lock entry 844 is expandable (e.g., to show more specific information about the particular lock) and collapsible, as illustrated elsewhere herein, and may be deleted using a respective deletion input (which will also result in a decrement to the quantity specified in quantity input(s) 848).

FIG. 8D illustrates screen 800 after the user has incremented the unit quantity of the represented lock by one, using quantity input(s) 848, according to an embodiment. Since the specified unit quantity is now two, a new lock entry 844B is added to the list of lock entries 844, in addition to existing lock entry 844A. For example, in response to the user incrementing the quantity of units by a number N (e.g., one), the application may automatically duplicate an existing lock entry (e.g., lock entry 844A), rename the duplicated lock entry (e.g., by adding a sequence number or letter to the name specified in name input 828 for lock representation 820, according to a predefined, standard, or user-specified naming scheme), and add the duplicated, renamed lock entry (e.g., lock entry 844B) to the list of lock entries 844. Conversely, in response to the user decrementing the quantity of units by a number N (e.g., one), the application may automatically remove an existing lock entry from the list of lock entries 844, such as the most recently added lock entry (e.g., lock entry 844B). Alternatively, the application may prompt the user to select an existing lock entry to remove from the list of lock entries 844. The exact logic for determining which lock entry to automatically remove may depend on the implementation. Although not shown, in an embodiment, information that is common to all lock entries 844 (e.g., the Model Number) may be consolidated in a common information area (e.g., above or below the list of entries 844), instead of being provided in each lock entry 844, so as to avoid cluttering menu 840 with redundant information.

In addition, since there are now a plurality of units of the represented lock specified, keying-type input(s) 843 appear. Keying-type input(s) 843 allow a user to select whether the plurality of units of the represented lock should be keyed alike (KA) or keyed differently (KD). For example, keying-type input(s) 843 may comprise a keyed-differently input for specifying that each unit, represented in lock entries 844, should be keyed differently (i.e., each lock unit is openable by a different key than any other lock unit), as well as a keyed-alike input for specifying that each unit, represented in lock entries 844, should be keyed the same (i.e., each lock unit is keyed the same as every other lock unit). In the illustrated example, by default, the keyed-differently input is selected, thereby specifying that each unit, represented in lock entries 844, should be keyed differently.

FIG. 8E illustrates screen 800 when a user selects add-root-key input 814, and FIG. 8F illustrates screen 800 after the user has selected add-root-key input 814 in FIG. 8E, according to an embodiment. In response to the user's selection of add-root-key input 814, the application adds a key representation 830, representing a master key and the new root node of the keying tree. Notably, lock representation 820 becomes a child node of newly added key representation 830 (e.g., visually indicated by an edge, represented by a line, connecting key representation 830 to lock representation 820). In addition, in an embodiment, since the user has added all of the elements necessary for an initial key system (i.e., a lock and a master key), the application adds an add-key-system input 862 to screen 800. As discussed elsewhere herein, add-key-system input 862 enables the user to start a new key system that is independent from any existing key systems represented within screen 800.

As illustrated, key representation 830 may comprise a menu input 834 for viewing an expandable and collapsible menu of options and/or information about the represented key, a move input 836 for moving (e.g., dragging and dropping) key representation 830 within the hierarchy of the keying tree, and a name input 838 for specifying a name for the represented key (e.g., enabling the user to tailor the key system(s) to their particular usage(s) using a custom naming scheme). Key representation 830 may also comprise information about the represented key, such as the unit quantity of the represented key to be ordered.

In an embodiment, the application moves add-lock input 816 from a position below lock representation 820 (e.g., as illustrated in FIG. 8E) to a position above lock representation 820 and below key representation 830 (e.g., as illustrated in FIG. 8F). Each key representation 830 may be associated with an add-lock input 816 that, when selected, causes the application to add a new lock representation 820 as a child node under that key representation 830. In other words, the user may select the add-lock input 816 associated with a particular key to insert a new lock under that key within the keying tree (i.e., a lock that is openable using that key as a master key). As illustrated in FIG. 8F, since a master key has been added, the text of add-root-key input 814 now prompts the addition of a "grand master key" instead of a "master key." In other words, the application automatically updates the label of add-root-key input 814 to properly reflect the relationship that the next root node to be added will have to the leaf nodes (i.e., the lock representations 820). In the particular case illustrated in FIG. 8F, it may not make sense to add a grand-master key at this point, since there is only a single master key. Thus, in an embodiment, add-root-key input 814 may be rendered unselectable and/or grayed out until another master key is added. Alternatively, add-root-key input 814 may remain selectable, but when the user selects add-root-key input 814, the application may prompt the user, using a pop-up overlay or other similar graphical element within the graphical user interface, to confirm that the user wishes to proceed with the selected action and/or to indicate one or more instances in which such a design choice would be reasonable for the user's key system.

In an embodiment, each key representation 830 may also be associated with an add-subgroup input 832. As is illustrated elsewhere herein, when a user selects the add-subgroup input 832 for a particular key representation 830, the application may automatically add two new key representations 830, representing two new sub-keys, under the particular key representation 830. In addition, each lock representation 820 that was previously under the particular key representation 830 may be added as child nodes underneath one of the two new key representations 830, while a new lock representation 820 is added as a child node underneath the other one of the two new key representations 830. Alternatively, each lock representation 820 that was previously under the particular key representation 830 may be duplicated and added as child nodes underneath both of the two new key representations 830.

FIG. 8G illustrates screen 800 after the user has expanded menu 850, using menu input 834, according to an embodiment. Menu 850 comprises a duplication input 851 for duplicating the associated key representation 830, a delete input 852 for deleting the associated key representation 830, and a quantity input 858 for specifying the quantity of units of the represented key to be purchased (e.g., via separate inputs for decrementing and incrementing the quantity and/ or a textbox for entering an integer quantity directly). When a key representation 830 is deleted (e.g., using delete input 852), the application may automatically adjust the represented and logical keying tree to eliminate the gap created by the deletion of the key representation 830 and the node it represents.

FIG. 8H illustrates screen 800 after the user has selected add-lock input 816, according to an embodiment. In response to the user's selection of add-lock input 816, the application has added a new lock representation 820B under key representation 830, in addition to existing lock representation 820A. The user may interact with new lock representation 820B in the same manner as discussed above. Notably, selection of add-lock input 816 vertically extends the graphical keying tree downward (i.e., by adding a new leaf node), but this does not necessarily reflect the manner in which the logical keying tree is being extended (which may be vertical or horizontal depending on whether or not there was a previously existing leaf node). Thus, it should be understood that, while lock representations 820A and 820B are illustrated as vertically stacked, this arrangement is merely used to more compactly represent the keying tree in the graphical user interface. With respect to the logical keying tree, lock representations 820A and 820B represent sibling leaf nodes, which would ordinarily be at the same level in a graphically represented tree (e.g., as illustrated in FIG. 6).

FIG. 8I illustrates screen 800 after the user has expanded menu 840, using menu input 824A, and expanded lock entry 844A, according to an embodiment. Expanded lock entry 844A describes one or more attributes of the represented lock. In the illustrated example, expanded lock entry 844A comprises image region 845 that shows images representing different views of the lock. These images may be composite images that show the customization options chosen by the user, including engravings, body choice (e.g., style, size, color, etc.), shackle choice (e.g., style, size, color, etc.), and/or the like. The user may switch or scroll between views (e.g., front, sides, top, back, and/or bottom) using inputs (e.g., left and right arrows) and/or swiping (e.g., if a touch sensor is available).

In an embodiment, expanded lock entry 844A also comprises textual information 846 about lock attributes, such as lock type or model (e.g., resettable combination), dimensions (e.g., width, shackle length, etc.), color, costs of each customization option, cost for each additional key, and/or the like. In addition, expanded lock entry 844A may comprise quantity input(s) 847 (e.g., comprising separate inputs for decrementing and incrementing the quantity and/or a textbox for entering an integer quantity directly) for specifying the number of keys to be ordered for the particular lock unit represented by expanded lock entry 844A.

In an embodiment, expanded lock entry 844A may also comprise one or more inputs for editing the described attributes and customization options of the represented lock. In response to the user's selection of an editing input, the application may provide the user with a separate screen or pop-up overlay for editing the attributes and/or customization options (e.g., screens 700F-700K in FIGS. 7H-7S). Once the user has finished editing the attributes and/or customization options, the application may return the user to screen 800 and update the edited lock entry 844.

FIG. 8J illustrates screen 800 after the user has expanded menu 850 of key representation 830, using menu input 834, and selected duplication input 851, and FIG. 8K illustrates screen 800 after the user has selected duplication input 851 in FIG. 8J, according to an embodiment. In response to the user's selection of duplication input 851 for key representation 830, the application duplicates the entire portion (i.e., "branch") of the keying tree that has key representation 830 as its root (i.e., the entire keying tree in this particular scenario). Thus, the application automatically adds a grand master key represented by key representation 830C, and adds two copies of the duplicated branch of the keying tree as descendants of the new key representation 830C. The previously existing key representation 830 is duplicated into key representations 830A and 830B, and each of key representations 830A and 830B have copies of the previously existing lock representations 820A and 820B. In other words, the duplicate branch of the keying tree inherits all of the nodes, features, and attributes of the original branch of the keying tree. In an alternative embodiment, the branch may be duplicated without automatically adding a grand master key representation (e.g., key representation 830C), as a root, to join the duplicate branches. In this case, the duplicate branches would simply exist as two independent key systems with separate logical keying trees. In either embodiment, certain information (e.g., the names in name input 828 of each lock representation 820 and/or the names in name input 838 in each key representation 830) may be automatically determined, for example, using a predetermined, standard, and/or user-specified naming scheme (e.g., by automatically adding and/or incrementing numeric suffixes in the names).

In an embodiment, since a new key level has been added to the keying tree (i.e., a grand master key represented by key representation 830C), a new add-key input 818B is also added for the new grand-master-key level, in addition to existing add-key input 818A for the master-key level. In other words, screen 800 comprises an add-key input 818 for each key level. In response to the user selecting an add-key input 818 for a particular key level, a new key representation 830 is added at that level. As discussed elsewhere, instead of simply being labeled "+ Add Key", each add-key input 818 may be labeled according to its associated level (e.g., "+ Add Master Key", "+ Add Grand Master Key", "+ Add Great Grand Master Key", "+ Add Great Great Grand Master Key", etc.). For example, screen 800 in FIG. 8K may be modified such that add-key input 818A is labeled "+ Add Master Key" and add-key input 818B is labeled "+ Add Grand Master Key".

FIG. 8L illustrates screen 800 after the user has selected add-key-system input 862 in FIG. 8K, according to an embodiment. In response to the user's selection of add-key-system input 862, the application adds a new key representation 830D at the same master-key level as key representations 830A and 830B. In addition, a new lock representation 820E is added as a child node to the new key representation 830D, since it is assumed in this embodiment that a user would not add a key for which no lock exists. Notably, the keying tree comprises two disconnected keying trees with key representations 830C and 830D representing root nodes of their respective keying trees. Thus, the user may utilize add-key-system input 862 to create a separate key system (i.e., with key representation 830D as the root node) from the existing key system (i.e., with key representation 830C as the root node). However, a user can select join-key-systems input 864 to add a new key representation 830, representing a new root node that connects the two disconnected keying trees, thereby combining the separate key systems into a single key system. Alternatively or additionally, the user may select an add-root-key input 814, and the application may responsively prompt the user to choose whether to extend the corresponding independent key system vertically or join two or more independent key systems by adding a key representation 830 representing a shared root node for those key systems. Notably, although the independent key systems are separate, they are vertically aligned, such that the levels of their separate hierarchies are at the same vertical positions within screen 800 (e.g., the master-key levels in each key system are at the same vertical position, grand-master-key levels in each key system would be at the same vertical position, etc.). Advantageously, this aids a user in simultaneously visualizing and comparing the hierarchies of both key systems (e.g., when deciding to join the key systems).

In an embodiment, each independent key system has its own set of add-key inputs 818, which enables the user to horizontally extend each key system independently from each other. For example, the key system rooted in key representation 830D and the key system rooted in key representation 830C are independent key systems, and therefore, each have an independent set of add-key inputs 818C and 818A-818B, respectively, for extending each of their respective levels (e.g., positioned to the left side of each key system). As illustrated, each set of add-key inputs 818 may be positioned adjacent to their respective key systems, and each add-key input 818 may be vertically aligned with its respective level. As illustrated, the sets of add-key inputs 818 for the independent key systems may have different numbers of add-key inputs 818, since each independent key system may have a different number of levels.

In an embodiment, whenever two separate and distinct key systems are represented in screen 800, the application adds a join-key-systems input 864 to screen 800, as illustrated in FIG. 8L, according to an embodiment. Join-key-systems input 864 enables a user to join two or more separate key systems by adding a key representation 830 as a root node that connects the two or more separate key systems as separate branches within the same key system. Join-key-systems input 864 may be removed or rendered unselectable and/or grayed out whenever there is only one key system represented in screen 800, since selection of join-key-systems input 864 does not make sense unless there are multiple key systems represented in screen 800. It should be understood that, while only two separate key systems are illustrated herein, screen 800 may comprise any number of separate key systems (e.g., three, four, five, etc.) that may be represented and joined in a similar manner. When three or more separate key systems are represented in screen 800, in response to the selection of join-key-systems input 864, the application may generate a pop-up or other graphical element(s) (e.g., a checkbox next to and corresponding to each representation of a key system's root node, making each key system selectable by selecting the represented root node, such as 830D and 830C in FIG. 8L, of that key system, etc.) that allow the user to select which two or more key systems are to be joined.

In an embodiment, whenever two separate and distinct key systems are represented in screen 800, the application adds an add-root-key input 814 above the representation of each key system, which enables the user to vertically extend each key system independently from the other(s). For example, as illustrated in FIG. 8L, add-root-key input 814A is above the key system with key representation 830C as its root, and add-root-key input 814B is above the key system with key representation 830D as its root. When either add-root-key input 814 is selected, the application will add a new key representation 830, representing a new root node, to the corresponding key system (e.g., in a similar manner as illustrated in FIGS. 8E and 8F).

FIG. 8M illustrates screen 800 after the user has selected join-key-systems input 864 in FIG. 8L, according to an embodiment. In response to the user's selection of join-key-systems input 864, the application adds a new key representation 830E, representing a great-grand-master key, as the root node of the keying tree. Thus, the previously separate key systems have been combined under one overarching great-grand-master key (i.e., that can open all locks in both of the previously separate key systems). Notably, the application has removed join-key-systems input 864 from screen 800, since there are no longer separate key systems that can be joined.

FIG. 8N illustrates screen 800 after the user has selected add-subgroup input 832D for key representation 830D, and FIG. 8O illustrates screen 800 after the application has responsively added the new subgroup, according to an embodiment. Specifically, in response to the user's selection of add-subgroup input 832D, the application automatically generated and added key representations 830F and 830G, both representing sub-master keys, as child nodes of previously existing key representation 830D. In addition, the application automatically added a new lock representation 820F underneath newly added key representation 830G. In other words, in response to the selection of add-subgroup input 832D for key representation 830D, the application automatically split the portion of the keying tree, that has key representation 830D as its root, into two branches with two new master keys as their respective roots.

FIG. 8P illustrates screen 800 after the user has expanded menu 840C for lock representation 820C, using menu input 824C, and selected duplication input 841C, and FIG. 8Q illustrates screen 800 after the application has responsively duplicated lock representation 820C and added the duplicate as new lock representation 820G, according to an embodiment. Notably, the duplicate lock representation 820G is added as a child node under the same key representation 830B as the original lock representation 820C, thereby becoming a sibling of the original lock representation 820C. It should be understood that duplicate lock representation 820G inherits all of the same attributes as duplicated lock representation 820C. This duplication represents another way of adding a new lock representation 820 (e.g., in addition to add-lock input 816B), but without the user having to build the lock from scratch.

FIGS. 8Q-8S illustrate the movement of a lock representation, using move input 826, according to an embodiment. Specifically, as illustrated in FIG. 8Q, the user may select move input 826G of lock representation 820G. In response to the user's selection of move input 826G, the application renders associated lock representation 820G to be draggable within screen 800 via user input (e.g., moving a pointer device, moving a contact point on a touch sensor, etc.). Thus, as illustrated in FIG. 8R, the user may drag lock representation 820G across screen 800 to any desired position. As illustrated in FIG. 8S, the user has dragged lock representation 820G from its initial position as a child node of key representation 830B to a new position as a child node of key representation 830G. In an embodiment, when a lock representation 820 (e.g., lock representation 820G) is dropped, the application may determine the closest key representation 830 to the position at which the lock representation 820 was dropped, and automatically "snap" the dropped lock representation 820 as a child to that closest key representation 830. It should be understood that, logically, prior to the move, key representation 830B represented a master key that is configured to open locks represented by lock representations 820C, 820D, and 820G, whereas key representation 830G represented a master key that is configured to open locks represented by lock representation 820F. After the move, key representation 830B now represents a master key that is configured to open locks represented by lock representations 820C and 820D, whereas key representation 830G now represents a master key that is configured to open locks represented by lock representations 820F and 820G.

FIG. 8T illustrates screen 800 after the user has expanded menu 840F of lock representation 820F, using menu input 824F, and selected deletion input 842F, and FIG. 8U illustrates screen 800 after the application has responsively deleted lock representation 820F from the represented and logical keying tree, according to an embodiment. As illustrated, lock representation 820G is moved up as the only remaining child node of key representation 830G within keying tree. More generally, if a particular lock representation 820 is deleted in screen 800, the application automatically updates screen 800 to shift any sibling lock representations 820, previously represented underneath the deleted lock representation 820, vertically upwards to fill the gap created by the deleted lock representation 820 and to ensure that the represented keying tree remains compact within screen 800. In this manner, any lock representation 820 may be easily deleted from the keying tree by the user.

FIG. 8V illustrates screen 800 after the user has selected to expand all menus 840 using the expand input of submenus input 812. As illustrated, in response to the user selecting the expand input of submenus input 812, the application expands every menu 840 (i.e., menus 840A, 840B, 840C, 840D, and 840G) for every lock representation 820 (e.g., except for lock representation 820E, for which the lock has not yet been built). Alternatively or additionally, the application may expend every menu 850 for every key representation 830. Similarly, in response to the user selecting the collapse input of submenus input 812, the application may collapse every expanded menu for every lock representation 820 and/or key representation 830. Thus, a user may easily expand and collapse all of the menus with a single input (e.g., click or touch).

In an embodiment, expanded overlay menus 840 and/or 850 are never overlaid over a lock representation 820 and/or key representation 830. Rather, as illustrated in FIG. 8V, any representations 820 or 830 that would be covered by an overlay menu 840 or 850 are shifted downward within screen 800 to provide sufficient space to accommodate the overlay menu 840 or 850. Thus, lock representations 820 and key representations 830 are never covered up within screen 800. Conversely, when expanded overlay menus 840 and/or 850 are collapsed, any downward-shifted representations 820 or 830 are shifted upward (e.g., to the original location prior to expansion if all ancestors and intervening siblings remain unchanged, or to a higher location if ancestor(s) or intervening sibling(s) were deleted in the interim) to recompress the represented keying tree into a more compact form.

In an embodiment, the application may offer one or more templates (e.g., stored in database 114) of a keying tree to be used by the user to construct his or her own key system. For example, these template(s) may define commonly utilized keying trees. Thus, the user may select a template, and the application may responsively populate screen 800 with lock representation(s) 820 and key representation(s) 830 arranged in the hierarchical structure of the keying tree predefined by the selected template. Each lock representation 820 and key representation 830, populated into a node of the predefined keying tree, may be a default representation or may be a representation specifically defined by the template. Advantageously, templates prevent users from having to build an entire keying tree from scratch. This can be especially useful for commonly used, complex key systems (e.g., representing a common key system used by a particular type of business). In an embodiment, these templates may be imported and exported into and out of the application, using one or more suitable file formats, including open file formats (e.g., plain text, comma-separated values (CSV), etc.) or proprietary file formats (e.g., Excel™, custom-application formats, etc.).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising:
by at least one hardware processor, generating a graphical user interface comprising a single page that comprises a graphical representation of an entire keying tree with one or more leaf nodes, representing one or more locking devices, connected in a hierarchy to one or more ancestor nodes, representing one or more keys, wherein the graphical representation of the keying tree comprises
a key representation, representing at least one master key, as a root node of the keying tree, wherein the key representation comprises a key-name input, a key-quantity input, and a key-deletion input, and
at least one lock representation, representing at least one locking device, as at least one leaf node of the keying tree, wherein the at least one lock representation comprises a lock-name input, a lock-build input, a lock-quantity input, and a lock-deletion input;
by the at least one hardware processor, serving at least the single page of the graphical user interface to a user system over at least one network; and,
by the at least one hardware processor,
after the key-name input of the key representation is operated, receiving a name of the key representation, and associating the received name of the key representation with the key representation,
after the key-quantity input of the key representation is operated, receiving an order quantity of the at least one master key, and associating the received order quantity with the key representation,
after the key-deletion input of the key representation is operated, deleting the key representation from the graphical representation of the keying tree,
after the lock-name input of the at least one lock representation is operated, receiving a name of the at least one lock representation, and associating the received name of the at least one lock representation with the at least one lock representation, after the lock-build input of the at least one lock representation is operated, receiving a specification of the at least one locking device, and associating the received specification of the at least one locking device with the at least one lock representation, after the lock-quantity input of the at least one lock representation is operated, receiving an order quantity of the at least one locking device, and associating the received order quantity with the at least one lock representation, and, after the lock-deletion input of the at least one lock representation is operated, deleting the at least one lock representation from the graphical representation of the keying tree.

2. The method of claim 1, wherein one or both of the key representation and the at least one lock representation comprises a duplication input for duplicating the respective representation within the graphical representation of the keying tree.

3. The method of claim 1, wherein one or both of the key representation and the at least one lock representation comprises a move input for moving the respective representation between different positions within the graphical representation of the keying tree.

4. The method of claim 1, wherein receiving the specification of the at least one locking device comprises, in response to a user selection of the lock-build input of the at least one lock representation, generating a graphical user interface comprising one or more inputs for selecting and customizing the at least one locking device represented by the at least one lock representation.

5. The method of claim 4, further comprising, after receiving a selection and customization of the at least one locking device, updating the at least one locking representation to comprise an image of the selected and customized at least one locking device.

6. The method of claim 5, further comprising replacing a default icon of the lock-build input with the image of the selected and customized at least one locking device.

7. The method of claim 1, wherein the key representation further comprises an expandable and collapsible menu that comprises one or more of the key-name input, the key-quantity input, and the key-deletion input.

8. The method of claim 1, wherein the at least one lock representation further comprises an expandable and collapsible menu that comprises one or more of the lock-name input, the lock-build input, the lock-quantity input, and the lock-deletion input.

9. The method of claim 8, wherein the expandable and collapsible menu further comprises a list of one or more lock entries, wherein each of the one or more lock entries represents a separate unit of the at least one locking device, and wherein the one or more lock entries are equal in number to the specified order quantity of the at least one locking device.

10. The method of claim 9, wherein each of the one or more lock entries is expandable and collapsible, and wherein, when expanded, each of the one or more lock entries comprises a description of one or more attributes of the unit represented by that lock entry and a key-quantity input for changing an order quantity of keys for the unit represented by that lock entry.

11. The method of claim 9, wherein each of the one or more lock entries is expandable and collapsible, and wherein, when expanded, each of the one or more lock entries comprises a scrollable image region with one or more inputs by which a user can scroll through a plurality of images of the unit represented by that lock entry.

12. The method of claim 9, further comprising:

in response to a user interaction with the lock-quantity input to increment the order quantity of the at least one locking device, automatically adding a new lock entry to the list and naming the new lock entry according to a predefined naming scheme; or, in response to a user interaction with the lock-quantity input to decrement the order quantity of the at least one locking device, automatically removing an existing lock entry from the list.

13. The method of claim 1, wherein the at least one lock representation comprises a plurality of lock representations as a plurality of leaf nodes of the keying tree.

14. The method of claim 13, wherein the graphical representation of the keying tree comprises a plurality of key representations, including two or more key representations as child nodes of the key representation as the root node.

15. The method of claim 14, wherein the graphical user interface further comprises an add-lock input for each of the plurality of key representations, and wherein the method further comprises, in response to a user interaction with the add-lock input for one of the plurality of key representations, adding a lock representation as a child node of the one key representation within the graphical representation of the keying tree.

16. The method of claim 14, wherein the graphical user interface further comprises an add-subgroup input for each of the plurality of key representations, and wherein the method further comprises, in response to a user interaction with the add-subgroup input for one of the plurality of key representations, adding first and second new key representations as child nodes of the one key representation, moving any existing lock representations that are child nodes of the one key representation to child nodes of the first new key representation within the graphical representation of the keying tree, and adding a new lock representation as a child node of the second new key representation within the graphical representation of the keying tree.

17. The method of claim 14, wherein the graphical user interface further comprises an add-key input for each of a plurality of levels of key representations in the graphical representation of the keying tree, and wherein the method further comprises, in response to a user interaction with the add-key input for one of the plurality of levels of key representations, adding a new key representation within the one level of key representations, and adding a new lock representation as a child node of the new key representation within the graphical representation of the keying tree.

18. The method of claim 1, wherein the graphical user interface further comprises a checkout input, and wherein the method further comprises:

in response to a user interaction with the checkout input, generating a graphical user interface comprising one or more inputs for purchasing all of the keys and locks represented in the graphical representation of the keying tree; and, in response to completion of the purchase, initiating manufacture of one or more keys for each key representation and one or more locks for each lock representation, in the graphical representation of the keying tree, according to an access-control hierarchy indicated by the keying tree.

19. A system comprising:
at least one hardware processor; and
one or more software modules that, when executed by the at least one hardware processor,
generate a graphical user interface comprising a single page that comprises a graphical representation of an entire keying tree with one or more leaf nodes, representing one or more locking devices, connected in a hierarchy to one or more ancestor nodes, representing one or more keys, wherein the graphical representation of the keying tree comprises
a key representation, representing at least one master key, as a root node of the keying tree, wherein the key representation comprises a key-name input, a key-quantity input, and a key-deletion input, and
at least one lock representation, representing at least one locking device, as at least one leaf node of the keying tree, wherein the at least one lock representation comprises a lock-name input, a lock-build input, a lock-quantity input, and a lock-deletion input,
serve at least the single page of the graphical user interface to a user system over at least one network,
after the key-name input of the key representation is operated, receive a name of the key representation, and associate the received name of the key representation with the key representation,
after the key-quantity input of the key representation is operated, receive an order quantity of the at least one master key, and associate the received order quantity with the key representation,
after the key-deletion input of the key representation is operated, delete the key representation from the graphical representation of the keying tree,
after the lock-name input of the at least one lock representation is operated, receive a name of the at least one lock representation, and associate the received name of the at least one lock representation with the at least one lock representation,
after the lock-build input of the at least one lock representation is operated, receive a specification of the at least one locking device, and associate the received specification of the at least one locking device with the at least one lock representation,
after the lock-quantity input of the at least one lock representation is operated, receive an order quantity of the at least one locking device, and associate the received order quantity with the at least one lock representation, and,
after the lock-deletion input of the at least one lock representation is operated, delete the at least one lock representation from the graphical representation of the keying tree.

20. A non-transitory computer-readable medium having instructions stored therein, wherein the instructions, when executed by a processor, cause the processor to:
generate a graphical user interface comprising a single page that comprises a graphical representation of an entire keying tree with one or more leaf nodes, representing one or more locking devices, connected in a hierarchy to one or more ancestor nodes, representing one or more keys, wherein the graphical representation of the keying tree comprises
a key representation, representing at least one master key, as a root node of the keying tree, wherein the key representation comprises a key-name input, a key-quantity input, and a key-deletion input, and
at least one lock representation, representing at least one locking device, as at least one leaf node of the keying tree, wherein the at least one lock representation comprises a lock-name input, a lock-build input, a lock-quantity input, and a lock-deletion input;
serve at least the single page of the graphical user interface to a user system over at least one network;
after the key-name input of the key representation is operated, receive a name of the key representation, and associate the received name of the key representation with the key representation;
after the key-quantity input of the key representation is operated, receive an order quantity of the at least one master key, and associate the received order quantity with the key representation;
after the key-deletion input of the key representation is operated, delete the key representation from the graphical representation of the keying tree;
after the lock-name input of the at least one lock representation is operated, receive a name of the at least one lock representation, and associate the received name of the at least one lock representation with the at least one lock representation;
after the lock-build input of the at least one lock representation is operated, receive a specification of the at least one locking device, and associate the received specification of the at least one locking device with the at least one lock representation;
after the lock-quantity input of the at least one lock representation is operated, receive an order quantity of the at least one locking device, and associate the received order quantity with the at least one lock representation; and,
after the lock-deletion input of the at least one lock representation is operated, delete the at least one lock representation from the graphical representation of the keying tree.

21. The method of claim 1, wherein each of the key representation and the at least one lock representation are draggable and droppable within the single page of the graphical user interface.

* * * * *